(12) United States Patent
Tanaka et al.

(10) Patent No.: US 8,554,973 B2
(45) Date of Patent: Oct. 8, 2013

(54) STORAGE DEVICE AND METHOD FOR MANAGING SIZE OF STORAGE DEVICE

(75) Inventors: Katsuya Tanaka, Kokubunji (JP); Masanori Takada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 717 days.

(21) Appl. No.: 12/741,788

(22) PCT Filed: Apr. 23, 2010

(86) PCT No.: PCT/JP2010/002952
§ 371 (c)(1),
(2), (4) Date: May 6, 2010

(87) PCT Pub. No.: WO2011/132234
PCT Pub. Date: Oct. 27, 2011

(65) Prior Publication Data
US 2012/0059966 A1    Mar. 8, 2012

(51) Int. Cl.
*G06F 13/14* (2006.01)
(52) U.S. Cl.
USPC .......................................... 710/305; 710/316
(58) Field of Classification Search
USPC ................. 710/300, 302, 305, 306, 312, 313, 710/316, 317
See application file for complete search history.

(56) References Cited

U.S. PATENT DOCUMENTS

| 7,506,094 | B2 * | 3/2009 | Boyd et al. ..................... 710/316 |
| 7,783,818 | B1 * | 8/2010 | Sardella et al. ............... 710/313 |
| 7,836,332 | B2 * | 11/2010 | Hara et al. .................... 714/5.11 |
| 7,979,592 | B1 * | 7/2011 | Pettey et al. ....................... 710/3 |
| 2006/0239287 | A1 * | 10/2006 | Johnsen et al. ................ 370/412 |
| 2006/0253676 | A1 * | 11/2006 | Tanaka et al. .................. 711/168 |
| 2008/0147937 | A1 | 6/2008 | Freimuth et al. |
| 2008/0239945 | A1 * | 10/2008 | Gregg ........................... 370/217 |
| 2009/0276773 | A1 * | 11/2009 | Brown et al. ...................... 718/1 |
| 2010/0036995 | A1 | 2/2010 | Nakayama et al. |
| 2010/0082874 | A1 | 4/2010 | Baba et al. |
| 2010/0125653 | A1 * | 5/2010 | Cherian et al. ................ 709/223 |
| 2011/0185163 | A1 * | 7/2011 | Hidaka .............................. 713/2 |
| 2011/0252176 | A1 * | 10/2011 | Tanaka et al. .................. 710/313 |
| 2012/0096192 | A1 * | 4/2012 | Tanaka et al. ................... 710/20 |

FOREIGN PATENT DOCUMENTS

JP    2008-152787 A    7/2008

OTHER PUBLICATIONS

PCT International Search Report on application No. PCT/JP2010/002952 dated Jan. 25, 2011; 3 pages.

* cited by examiner

*Primary Examiner* — Khanh Dang
(74) *Attorney, Agent, or Firm* — Foley & Lardner LLP

(57) ABSTRACT

The invention relates to a storage device in which MR-IOV is applied to the internal network of a storage controller, whereby the size of the storage device can be easily expanded. The storage device is expanded on the basis of a network having processor-connected RPs, FE I/F, BE I/F, and CM I/F that are connected with a switch. In the switch, a plurality of ports other than those connected to the RPs, FE I/F, BE I/F, and CM I/F are connected with a cross-link. Each processor is allowed to control the FE I/F, BE I/F, or CM I/F either via a path that passes through the cross-link or via a path that does not pass through the cross-link within the unit device. When unit devices are connected to expand the size of a storage device, the cross-link is removed first and then the unit devices are connected with a new cross-link (see FIG. 4).

13 Claims, 34 Drawing Sheets

| Logical Unit Number | Primary Function Number | case1 | case2 |
|---|---|---|---|
| 0 | FF0 | FF2 | FF0 |
| 1 | FF1 | FF3 | FF1 |
| 2 | FF2 | FF2 | FF0 |
| 3 | FF3 | FF3 | FF1 |

| | | | |
|---|---|---|---|
| Number of SW Ports | For Connection to RP | Nrp | 2101 |
| | For Connection to EP | Nep | 2102 |
| | For Connection to Cross-Link | Ncr = (N−1) x Nrp | 2103 |
| Number of Virtual Switches | For Connection to RP | Nrp | 2104 |
| | For Connection to Cross-Link | Ncr = (N−1) x Nrp | 2105 |
| Number of Downstream Bridges | For Connection to RP | Nep + Ncr/2 = Nep + (N−1) x Nrp/2 | 2106 |
| | For Connection to Cross-Link | Nep | 2107 |

FIG. 39

| Logical Unit Number | Primary Function Number | case1 | case2 | case3 | case4 |
|---|---|---|---|---|---|
| 0 | F0 | F2 | F0 | F0 | F4 |
| 1 | F1 | F3 | F1 | F1 | F5 |
| 2 | F2 | F2 | F0 | F2 | F6 |
| 3 | F3 | F3 | F1 | F3 | F7 |
| 4 | F4 | F6 | F4 | F0 | F4 |
| 5 | F5 | F7 | F5 | F1 | F5 |
| 6 | F6 | F6 | F4 | F2 | F6 |
| 7 | F7 | F7 | F5 | F3 | F7 |

FIG. 40

Start MR-PCIM Fail-over

↓

Change Internal Switch Path — S4001

↓

Change Setting of Management VS — S4002

↓

Reset MR-PCIM — S4003

↓

Change Internal Switch Path — S4004

↓

End MR-PCIM Fail-over

STORAGE DEVICE AND METHOD FOR MANAGING SIZE OF STORAGE DEVICE

TECHNICAL FIELD

The present invention relates to a storage device and a method for managing the size (scalability) of the storage device.

BACKGROUND ART

Storage devices typically have a storage controller and a nonvolatile storage medium that can be accessed randomly. Such a storage medium is, for example, a disk array with a number of hard disk drives (HDDs) or nonvolatile semiconductor memory drives (SSDs). The storage controller has a front-end interface (hereinafter abbreviated as FE I/F) for connection to a host system, a back-end interface (hereinafter abbreviated as BE I/F) for connection to the disk array, cache memory (hereinafter abbreviated as CM) for temporarily storing data that is read from or written to the disk array by the host system, and its interface (hereinafter, CM I/F). The storage controller also has a processor for controlling data transfer between the host system and CM I/F and between the disk array and CM I/F.

As a communication network standard specification for connecting the processor to the EF I/F, BE I/F, and the like, there is known "PCI Express." Meanwhile, as an extended standard of the PCI Express, there is also known "Multi-Root I/O Virtualization and Sharing Specification" (hereinafter, "MR-IOV") that is the standard to enable sharing of an I/O device among a plurality of processors. For example, Patent Literature 1 discloses a technique related to a communication network that uses the MR-IOV. As the MR-IOV is the standard specification, it is considered that components such as switches that comply with the MR-IOV can be commoditized. That is, it is expected that constructing the internal network of a storage controller using the MR-IOV that is the standard specification allow cost reduction of the storage controller.

In the MR-IOV, a communication network includes, for example, a plurality of root complexes (hereinafter, "RCs"), to each of which is connected a processor, a plurality of root ports (hereinafter, "RPs") provided in the RCs, a plurality of endpoints (hereinafter, "EPs") that serve as the base points for data input/output, and a plurality of switches for connecting the RPs and EPs. Each EP is configured to be capable of, when accessed from a processor via an RP, providing its function (a data transfer function with which input data is transferred to another device, for example) to the processor (so that the processor can control data transfer on the each EP). With such a configuration, a plurality of processors can share each EP and can independently access each EP via an RP (each processor can independently control data transfer on each EP). Accordingly, the plurality of processors can independently perform data transfer operations without the need of increasing the number of EPs, whereby the performance of the data transfer processing can be improved.

When focus is placed on a single RP in the MR-IOV, a tree-like topology that has the RP, and EPs and switch logically connected to the RP, is referred to as a "virtual hierarchy" (hereinafter, "VH"). In a communication network that complies with the MR-IOV (hereinafter, "MR-IOV network"), VHs exist in the same number as a plurality of RPs that reside in the MR-IOV network. A single VH represents an address space used for data transfer controlled by a processor for each RP. Assume, for example, that there exist the first VH that has an RP1, EP1, and EP2 and the second VH that has an RP2, EP1, and EP2 in the MR-IOV network. It is also assumed that the RP1 is provided in an RC1 connected to a processor 1, and the RP2 is provided in a RC2 connected to a processor 2. In such a case, the processor 1 and processor 2 can independently control data transfer from the EP1 to the EP2 (or in the reverse direction) via the RP1 on the first VH and via the RP2 on the second VH, respectively.

CITATION LIST

Patent Literature

PTL 1: JP Patent Publication (Kokai) No. 2008-152787 A

SUMMARY OF INVENTION

Technical Problem

As can be understood from the aforementioned example, an EP (the EP 1 and EP2 in the aforementioned example) is, when there exist a plurality of VHs to which the EP belongs (VHs that the EP supports), shared among the plurality of VHs (the first VH and second VH in the aforementioned example). That is, in the MR-IOV, each EP needs to provide data transfer functions for more than one VH that the EP supports. In the PCI Express, such data transfer functions provided by each EP are referred to as PCI functions.

In the MR-IOV network, when the number of processors is increased to enhance the performance, each EP needs to support VHs corresponding to the number of RPs to which the processors are connected. That is, in order to realize a data transfer function for each VH, each EP needs to have PCI functions corresponding to the number of RPs to which the processors are connected. Typically, an EP is implemented with a solid-state integrated circuit, and the upper limit of the number of PCI functions provided in each EP is determined in the design phase of the solid-state integrated circuits. Thus, each EP should be provided in advance with PCI functions in a number corresponding to a case in which the maximum allowable number of processors are connected.

However, when the number of the connected processors is less than the maximum allowable number, some of the PCI functions of the EP will not be used. In order to enhance the performance of the storage device, however, it is desirable that all of the PCI functions of each EP can be used even when a few processors are connected.

The present invention has been made in view of the foregoing circumstances, and provides a technique for efficiently using PCI functions of each EP (Endpoint) in a storage device that uses the MR-IOV.

Solution to Problem

In order to solve the aforementioned problem, the present invention relates to a storage device (or system) with an internal network of a storage controller in which components (RPs, FE I/F, BE I/F, and CM I/F) are connected with a switch. The storage device is expanded on the basis of a network having processor-connected RPs, FE I/F, BE I/F, and CM I/F that are connected with a switch. A plurality of switch ports other than those connected to the RPs, FE I/F, BE I/F, and CM I/F are connected with a cross-link. Each processor is allowed to control the FE I/F, BE I/F, or CM I/F either via a path that passes through the cross-link or via a path that does not pass through the cross-link. In such a case, the connection relationship between the downstream bridges of virtual switches in the switch and each interface device (FE I/F, BE I/F, and CM I/F) will not be changed by the change in the number of unit devices to be connected or by the attachment/detachment of the cross-link.

When networks of unit devices are to be connected in order to expand the size of a storage device, the cross-link is removed first, and then the unit devices are connected with a new cross-link.

Further features of the present invention will become apparent from the following embodiments and accompanying drawings for carrying out the present invention.

Advantageous Effects of Invention

According to the present invention, PCI functions of each EP (Endpoint) can be efficiently used without changing the internal connection configuration (mapping) of the MR-IOV switching device. In addition, the size of the storage device can be easily expanded. As a result of the size expansion of the storage device, processing efficiency of the entire device can be improved, that is, the performance of the storage device can be enhanced.

BRIEF DESCRIPTION OF DRAWINGS

FIG. 39 is a diagram showing the content of a table for managing the switching of a data transfer path in the interface device in accordance with the ninth embodiment.

FIG. 40 is a flow chart for describing the fail-over processing of an MR-PCIM in accordance with the ninth embodiment.

DESCRIPTION OF EMBODIMENTS

The present invention relates to a storage device and a method for managing the size (scalability) of the storage device. In particular, the invention relates to a technique of expanding or reducing the size of a storage device by changing switch connections within the internal network of a storage controller.

Hereinafter, embodiments of the present invention will be described with reference to the accompanying drawings. It should be noted that the following embodiments are only illustrative for carrying out the invention. Thus, it is obvious that various modifications and variations can be made without departing from the scope and the spirit of the invention. In addition, structures that are common throughout the drawings are assigned the same reference numbers.

Embodiment 1

First, a brief summary of the MR-IOV network will be described (FIGS. 1 to 3) for an understanding of the basic knowledge that forms the basis of this embodiment, and then this embodiment will be described on the basis of such knowledge.

<Basic Summary of the MR-IOV Network>

Figure 1:
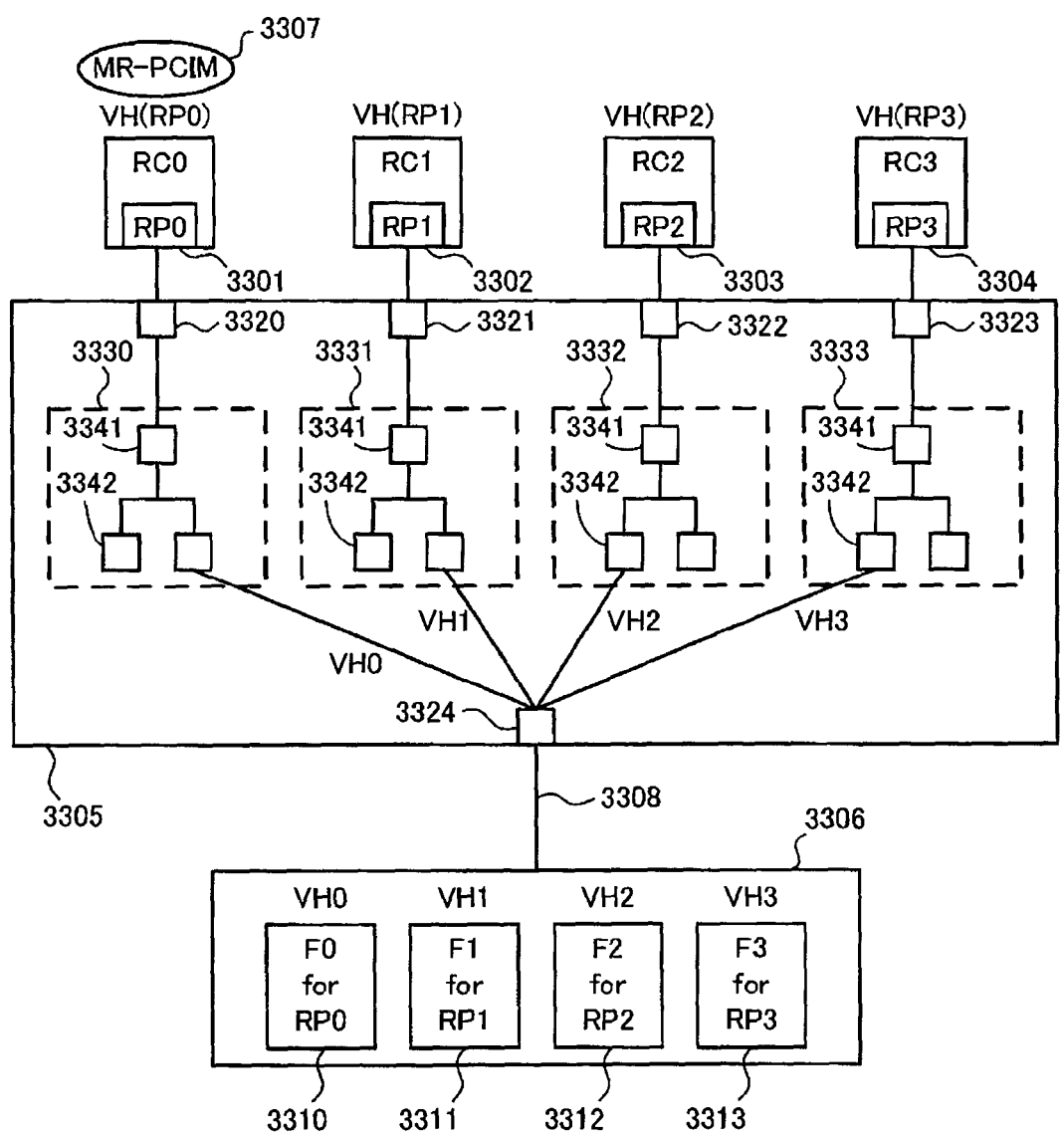
FIG. 1 is a diagram showing the concept and operation of an MR-IOV network.

FIG. 1 is a diagram for describing the topology of the MR-IOV network. In the MR-IOV network, a plurality of root ports (3301 to 3304) is connected to an endpoint 3306 via a switch 3305. In the MR-IOV network, a tree structure that corresponds to the topology of the PCI Express Base Specification, starting at each RP is referred to as a virtual hierarchy (VH). In this specification, a virtual hierarchy that has the RP0 (3301) as the root port, for example, is represented by VH(RP0).

The switch 3305 is an MRA (Multi-Root Aware) switch that complies with the MR-IOV specification. The switch 3305 includes a plurality of virtual switches (3330 to 3333) corresponding to the virtual hierarchies that the switch supports. An upstream bridge 3341 of the virtual switch 3330 is connected to a switch port 3320. Likewise, an upstream bridge 3341 of the virtual switch 3331 is connected to a switch port 3321; an upstream bridge 3341 of the virtual switch 3332 is connected to a switch port 3322; and an upstream bridge 3341 of the virtual switch 3333 is connected to a switch port 3323. One of a pair of downstream bridges (3342) of each virtual switch is connected to a switch port 3324.

A link 3308 is an MR-link shared as a data transfer path among the plurality of virtual hierarchies. On the MR-link, each virtual hierarchy is identified using a VH number. In the VH(RP0), a VH number "VH0" is set in a data packet header, and the data is transferred over the link 3308. Likewise, in the VH(RP1), VH(RP2), and VH(RP3), "VH1," "VH2," and "VH3" are respectively set in data packet headers, and the data is transferred over the link 3308.

The endpoint (EP) 3306 has a plurality of PCI functions (3310 to 3313). The endpoint that complies with the MR-IOV should have PCI functions corresponding to the virtual hierarchies that the endpoint supports. That is, the EP 3306 has a PCI function F0 corresponding to the VH(RP0), a PCI function F1 corresponding to the VH(RP1), a PCI function F2 corresponding to the VH(RP2), and a PCI function F3 corresponding to the VH(RP3). The PCI function F0 is accessed with the VH number "VH0," the PCI function F1 is accessed with the VH number "VH1," the PCI function F2 is accessed with the VH number "VH2," and the PCI function F3 is accessed with the VH number "VH3."

An MR-PCIM (Multi-Root PCI Manager) 3307 is a computer program having functions of setting and managing the MR-IOV network. Functions of the MR-PCIM include setting and management of the number and configuration of the virtual switches in the switch 3305 and the connection relationship between the switch ports (3320 to 3324) and bridges (3341 and 3342) of each virtual switch. It should be noted that the functions of the MR-PCIM can either be executed by a CPU in accordance with a program or be implemented as a module.

The EP in the aforementioned internal network of the storage controller should have four PCI functions corresponding to the maximum number (e.g., four) of processors connected to the internal network of the storage controller. As each of the four PCI functions is basically assigned for each individual VH, it would be necessary, in order to use all of the four PCI functions, to connect four processors to the internal network of the storage controller. However, when only two processors are connected to the internal network of the storage controller, only two of the PCI functions will be used, whereas the other two PCI functions will remain unused. In order to enhance the performance of the storage device, it is desired to efficiently utilize all of the PCI functions of the EP even when a few processors are connected to the internal network of the storage controller.

Meanwhile, in the MR-IOV network, even when only two processors are connected to the internal network of the storage controller, it is possible to configure the switch such that all of the four PCI functions in each EP that are assigned to the four VHs can be used.

In such a case, however, it would be necessary, when a total of four processors are connected later to the internal network of the storage controller by adding two more processors, to reconfigure the switch so that each processor can use its associated PCI function in the EP. Further, in the configuration of FIG. 1, it would also be necessary for the MR-PCIM, in order to change the correspondence relationship between each RP and PCI function accessed by the RP, to change the mapping between the switch ports and downstream bridges of each virtual switch. Such change of the mapping will require very complex operations. Thus, eliminating the need for such operations allows a very user-friendly MR-IOV network to be realized.

The present invention relates to a storage device in which the MR-IOV is applied to the internal network of a storage controller, wherein PCI functions, which are provided by an endpoint when the internal network of the storage controller has the maximum configuration, can be used even when the internal network has the minimum configuration (when a few processors are connected thereto), and that allows the size of the internal network of the storage controller to be easily expanded.

Figure 2:
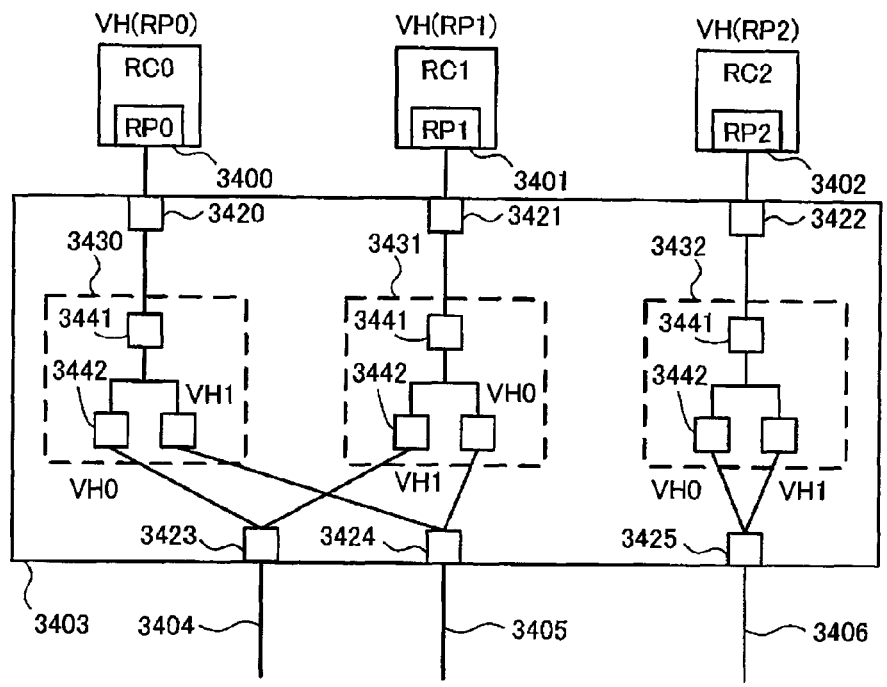
FIG. 2 is a diagram showing the concept of VH numbers.

Next, VH numbers will be described. FIG. 2 is a diagram for describing the assignment (example) of VH numbers. In FIG. 2, three RPs (3400 to 3402) are connected to a switch 3403. The RP 3400 is connected to an upstream bridge 3441 of a virtual switch 3430 via a port 3420. The RP 3401 is connected to an upstream bridge 3441 of a virtual switch 3431 via a port 3421. The RP 3402 is connected to an upstream bridge 3441 of a virtual switch 3432 via a port 3422. One of a pair of downstream bridges 3442 of the virtual switch 3430 is connected to a port 3423, and the other downstream bridge 3442 is connected to a port 3424. One of a pair of downstream bridges 3442 of the virtual switch 3431 is connected to the port 3423, and the other downstream bridge 3442 is connected to the port 3424. Both of downstream bridges 3442 of the virtual switch 3432 are connected to a port 3425.

In the MR-IOV specification, a VH number is defined as information to identify each VH. However, as the VH number is assigned on each link, there may be cases in which the VH number assigned to the same VH differ on different links (that is, the same VH numbers do not necessarily indicate the same VH). For example, in the VH(RP0) in FIG. 2, a VH number "VH0" is used on a link 3404, but a VH number "VH1" is used on a link 3405. Meanwhile, in the VH(RP1) in FIG. 2, a VH number "VH1" is used on a link 3404, but a VH number "VH0" is used on a link 3405. As an alternative method of using VH numbers, for example, in the VH(RP2), two VH numbers "VH0" and "VH1" are used on a link 3406.

It should be noted that in the MR-IOV specification, a "global key" is defined as information to uniquely identify the VH across the entire MR-IOV network. The global key is set for each of the MRA switch, MR-IOV-compliant endpoint, and the like.

Figure 3:
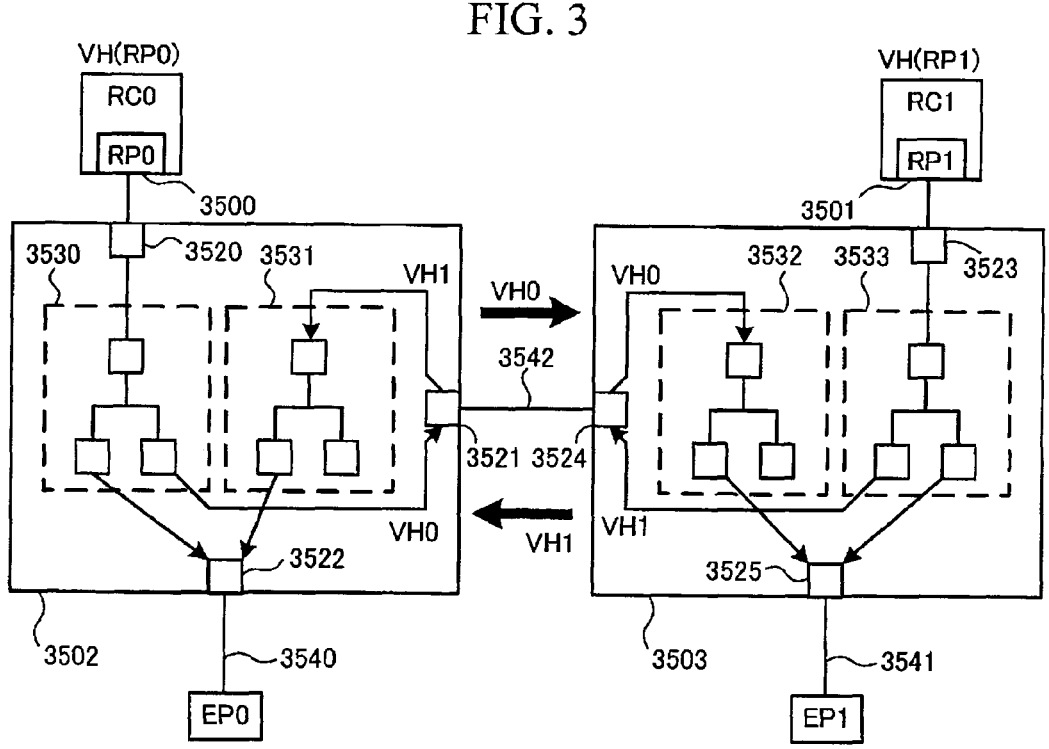
FIG. 3 is a diagram showing the concept of a cross-link.

Next, a cross-link will be described. FIG. 3 is a diagram for describing a cross-link. Two RPs (3500 and 3501) are connected to switches 3502 and 3503, respectively. The RP 3500 is connected to an upstream bridge of a virtual switch 3530 via a port 3520 of the switch 3502. In the switch 3502, one of a pair of downstream bridges of the virtual switch 3530 is connected to a port 3522, and the other downstream bridge is connected to a port 3521. An upstream bridge of a virtual switch 3531 is connected to the port 3521, and one of a pair of downstream bridges of the virtual switch 3531 is connected to the port 3522. The RP 3501 is connected to an upstream bridge of a virtual switch 3533 via a port 3523 of the switch 3503. In the switch 3503, one of a pair of downstream bridges of the virtual switch 3533 is connected to a port 3525, and the other downstream bridge is connected to a port 3524. An upstream bridge of a virtual switch 3532 is connected to the port 3524, and one of a pair of downstream bridges of the switch 3532 is connected to the port 3525. The port 3521 of the switch 3502 and the port 3524 of the switch 3503 are connected with a link 3542. As a result of the aforementioned setting, the RP 3500 (RP0) and RP 3501 (RP1) can access an end-point EP0 via a link 3540 and an EP1 via a link 3541.

The link 3542 is a cross-link having different upstream and downstream directions depending on the virtual hierarchy. In the switch 3502 or 3503, a port that is closer to the RP is an upstream port, and a port that is closer to the EP is a downstream port. Thus, in the VH(RP0) on the link 3542, the ports 3521 and 3524 are a downstream port and upstream port, respectively. In such a case, a VH number "VH0" is used to transfer data. Meanwhile, in the VH(RP1) on the link 3542, the ports 3524 and 3521 are a downstream port and upstream port, respectively. In such a case, a VH number "VH1" is used to transfer data. As described above, in the MR-IOV network, a cross-link can be used in which a plurality of VH numbers are assigned to the single link, and upstream and downstream directions differ depending on the VH.

<Configuration and Operation of the Storage Device of the First Embodiment>

Figure 4:
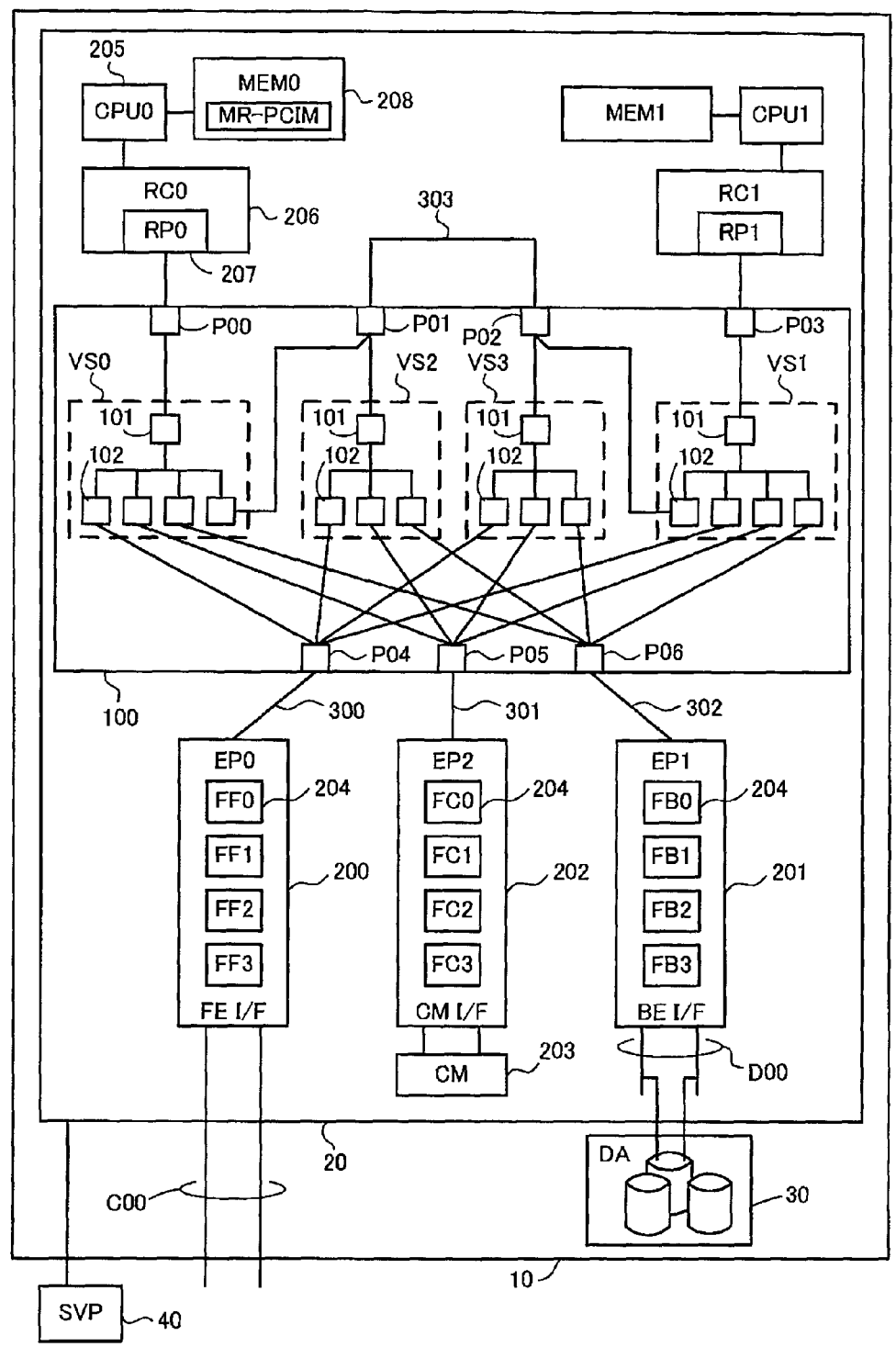
FIG. 4 is a diagram showing an exemplary schematic configuration of the storage device in accordance with the first embodiment.

FIG. 4 is a diagram showing the schematic configuration of a storage device 10 in accordance with the first embodiment of the present invention. The storage device 10 has, for example, a controller 20 and a DA (Disk Array) 30. The DA 30 has a group of storage devices such as a plurality of HDDs (Hard Disk Drives) or SSDs (Solid-State Drives). An external host system is connected to the controller 20 is via a channel C00, and an SVP 40, which is an administrative terminal, is also connected to the controller 20.

The controller 20 has, for example, two processors 205 (CPU0 and CPU1), two pieces of memory 208 (MEM0 and MEM1), two RCs (Root Complexes) 206 (RC0 and RC1), three EPs (Endpoints) (EP0, EP1, and EP2), cache memory CM 203, and a switch 100. The three EPs correspond to a front-end interface (FE I/F) 200, cache memory interface (CM I/F) 202, and back-end interface (BE I/F) 201. In the internal network of the controller 20, two root ports (RP0 and RP1) 207, switch 100, and three EPs are mutually connected. It should be noted that the number of the components that constitute the controller 20 is not limited to that exemplarily shown in FIG. 4.

The processor 205 performs various processing by executing various computer programs stored in the memory 208 (MEM0 for CPU0 and MEM1 for CPU1). For example, the processor 205 controls data transfer between the host system (not shown) and CM 203 and between the CM 203 and DA 30. The memory 208 has stored therein various programs executed by the processor 205, various table information referred to by the processor 205, and the like.

The administrator can set or change the values of the table information. For example, the administrator can perform operations such as the maintenance or management of the storage device 10 which include setting of the table information and the like by operating the SVP 40. The administrator, when setting the table information by operating the SVP 40, enters information to be set as the table information (setting information) into the SVP 40. The SVP 40, upon receipt of the entry, sends the entered setting information to the processor 205 via a management network (not shown) in the controller 20. The processor 205, upon receipt of the setting information, sets or changes the target table information based on the received setting information. The SVP 40 has an input device such as a keyboard for the administrator to perform the management operation of the storage device, and a display device such as a display.

The RC0_206 is connected to the CPU0, and has a single RP (Root Port) 207. The RP 207 is a root port that complies with the PCI Express specification. Meanwhile, the RC1 is connected to the CPU1, and has an RP1.

The RP0_207 is connected to the EP0 (FE I/F 200), EP1 (BE I/F 201), and EP2 (CM I/F 202) via the switch 100. Likewise, the RP1 is connected to the EP0 (FE I/F 200), EP1 (BE I/F 201), and EP2 (CM I/F 202) via the switch 100.

The switch 100 is a switch (an MRA (Multi-Root Aware) switch) that complies with the MR-IOV (Multi-Root I/O Virtualization and Sharing) specification. In addition, each EP (the FE I/F 200, CM I/F 202, and BE I/F 201) is a device (an MRA device) that complies with the MR-IOV specification.

The switch 100 has, for example, ports (P00 to P06) for connection to other components and a management port (not shown) for connection to the management network in the controller 20. The SVP 40, for example, is connected to the management port of the switch 100.

The RP0 and RP1 are connected to the ports P00 and P03 of the switch 100, respectively. The port P04 of the switch 100 is connected to the EP0 via a link 300. The port P05 of the switch 100 is connected to the EP2 via a link 301. The port P06 of the switch 100 is connected to the EP1 via a link 302. The ports P01 and P02 of the switch 100 are connected with a link 303. The links 300 to 303 are MR-links that are shared as data transfer paths among a plurality of virtual hierarchies.

The switch 100 includes a plurality of virtual switches (VS0 to VS3). Each virtual switch is a switch that physically exists, but its switching configuration is virtual. An upstream bridge 101 of the virtual switch VS0 is connected to the port P00 of the switch 100. Likewise, an upstream bridge 101 of the VS1 is connected to the port P03; an upstream bridge 101 of the VS2 is connected to the port P01; and an upstream bridge 101 of the VS3 is connected to the port P02. Three of downstream bridges 102 of each virtual switch are connected to the ports P04 to P06, respectively, of the switch 100. One of the downstream bridges 102 of the VS0 is connected to the port P01. One of the downstream bridges 102 of the VS1 is connected to the port P02. The P01 is a downstream port when seen from the VS0 and is an upstream port when seen from the VS2. The P02 is a downstream port when seen from the VS1 and is an upstream port when seen from the VS3. Thus, the link 303 that connects the P01 and P02 is a cross-link.

The FE I/F 200 corresponding to the EP0 is connected to a host system via a channel C00. The host system is, for example, a computer that issues I/O requests (write requests or read requests) to the storage device 10. The FE I/F 200 mutually converts the data transfer protocol used on the channel C00 and the data transfer protocol used in the internal network of the controller 20.

The EP0 has PCI functions 204 (FF0, FF1, FF2, and FF3) that are accessible from the RP0 or RP1. Such PCI functions are hardware modules to implement the function (a data transfer function) of the EP having the PCI functions. The phrase "to access a PCI function" refers to an event in which the PCI function 204 is accessed so that data transfer is controlled with the use of a function realized by the PCI function 204. Although the "RP" is described as "accessing the PCI function" in this embodiment, what actually accesses the PCI function 204 (controls data transfer) is the processor 205 connected to the RC 206 with the RP 207, via the RP 207.

The BE I/F 201 corresponding to the EP1 is connected to the DA 30 via a channel D00. The BE I/F 201 mutually converts the data transfer protocol used on the channel D00 and the data transfer protocol used in the internal network of the controller 20. The EP1 has PCI functions 204 (FB0, FB1, FB2, and FB3) that are accessible from the RP0 or RP1.

The CM 203 is connected to the CM I/F 202 corresponding to the EP2. In the CM 203, data received from the EP0, EP1, or the like is temporarily stored. In addition, control information or the like that is referred to within the controller 20 is also stored in the CM 203. The EP2 has PCI functions 204 (FC0, FC1, FC2, and FC3) that are accessible from the RP0 or RP1.

Each EP is connected to the SVP 40 via the management network in the controller 20. The SVP 40 can transmit setting information entered by the administrator to each EP.

It should be noted that the FE I/F 200 and BE I/F 201 can be implemented as a single EP. In that case, the single EP implements both the functions of the FE I/F 200 and BE I/F 201.

The MR-PCIM (Multi-Root PCI Manager) is a computer program having functions of setting and managing the internal network of the controller 20 (e.g., network components such as the switch 100 and EPs). In this embodiment and the following embodiments, the MR-PCIM is stored in the memory 208 provided in the controller 20, and is executed by the processor 205 connected to the memory 208. Using the MR-PCIM, the administrator can set or manage the mapping between the RP 207 and PCI functions 204 of each EP (i.e., correspondence relationship between the RP 207 and PCI functions 204 that are accessible from the RP 207 (or the EP with the PCI functions 204)). For example, the administrator can set the mapping by entering setting information into the MR-PCIM operating on the processor 205 in the controller 20 via the SVP 40 so that the MR-PCIM, upon receipt of the entry, sends the setting information to each EP or the switch 100. It should be noted that the MR-PCIM can be incorporated in the SVP 40. If the MR-PCIM is incorporated in the SVP 40, the MR-PCIM operating on the SVP 40 can set the mapping by receiving entry from the administrator and sending setting information directly from the SVP 40 to each EP or the switch 100.

Figure 5:
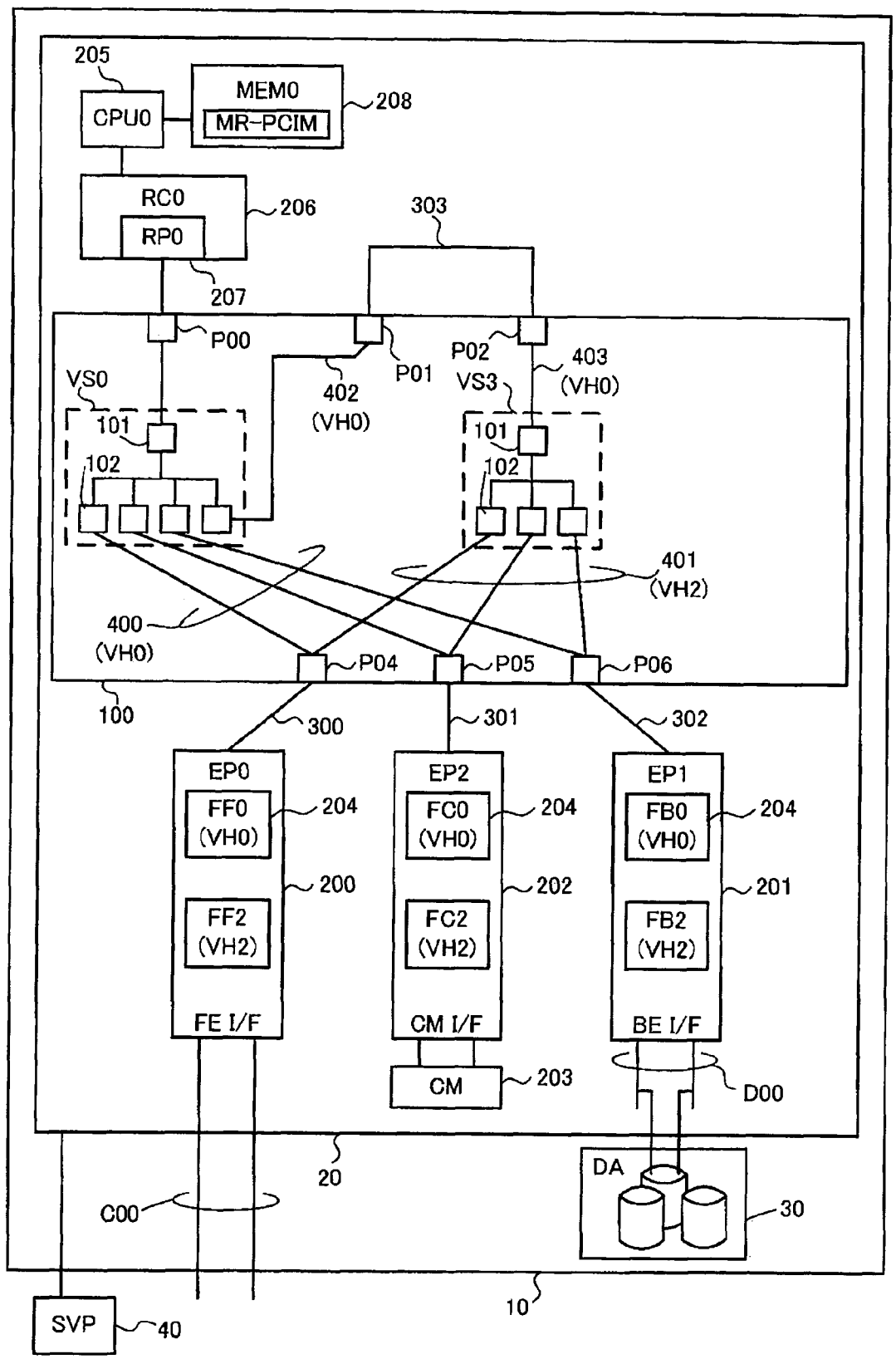
FIG. 5 is a diagram for describing a virtual hierarchy (VH (RP0)) of the storage device in accordance with the first embodiment.

FIG. 5 is a diagram showing only the components related to the virtual hierarchy VH(RP0) having the RP0 as the root port, in the storage device 10 in FIG. 4. Described below is a path in which the processor 205 (CPU0) accesses the PCI function in each endpoint (EP0 to EP2) from the RP0. The RP0 is connected to the upstream bridge 101 of the virtual switch VS0 via the port P00 of the switch 100. Three of the downstream bridges 102 of the VS0 are connected to the ports P04 to P06, respectively, of the switch 100. The ports P04 to P06 are connected to the EP0 to the EP2 via the links 300 to 302. In the VH(RP0), when an EP is accessed only via the VS0, data is transferred using the VH number "VH0" on the links 300 to 302 (400 in FIG. 5).

One of the downstream bridges 102 of the VS0 is connected to the port P01 of the switch 100. In the VH(RP0), the port P01 functions as a downstream port and the port P02 functions as an upstream port, and they are connected with the link 303. In the VH(RP0), data is transferred using the VH number "VH0" on the link 303 (402 in FIG. 5).

The upstream bridge 101 of the virtual switch VS3 is connected to the port P02, and data is transferred using the VH number "VH0" on the link 303 (403 in FIG. 5). The three downstream bridges 102 of the VS3 are connected to the ports P04 to P06, respectively, of the switch 100. The ports P04 to P06 are connected to the EP0 to the EP2 via the links 300 to 302. In the VH(RP0), when an EP is accessed via the VS0, cross-link 303, and VS3, data is transferred using the VH number "VH2" on the links 300 to 302 (401 in FIG. 5).

As described above, the RP0 accesses the PCI functions 204 (FF0, FB0, and FC0) in the EP0 to the EP2 using the VH number "VH0" on the links 300 to 302. In addition, the RP0 accesses the PCI functions 204 (FF2, FB2, and FC2) in the EP0 to the EP2 using the VH number "VH2" on the links 300 to 302.

Figure 6:
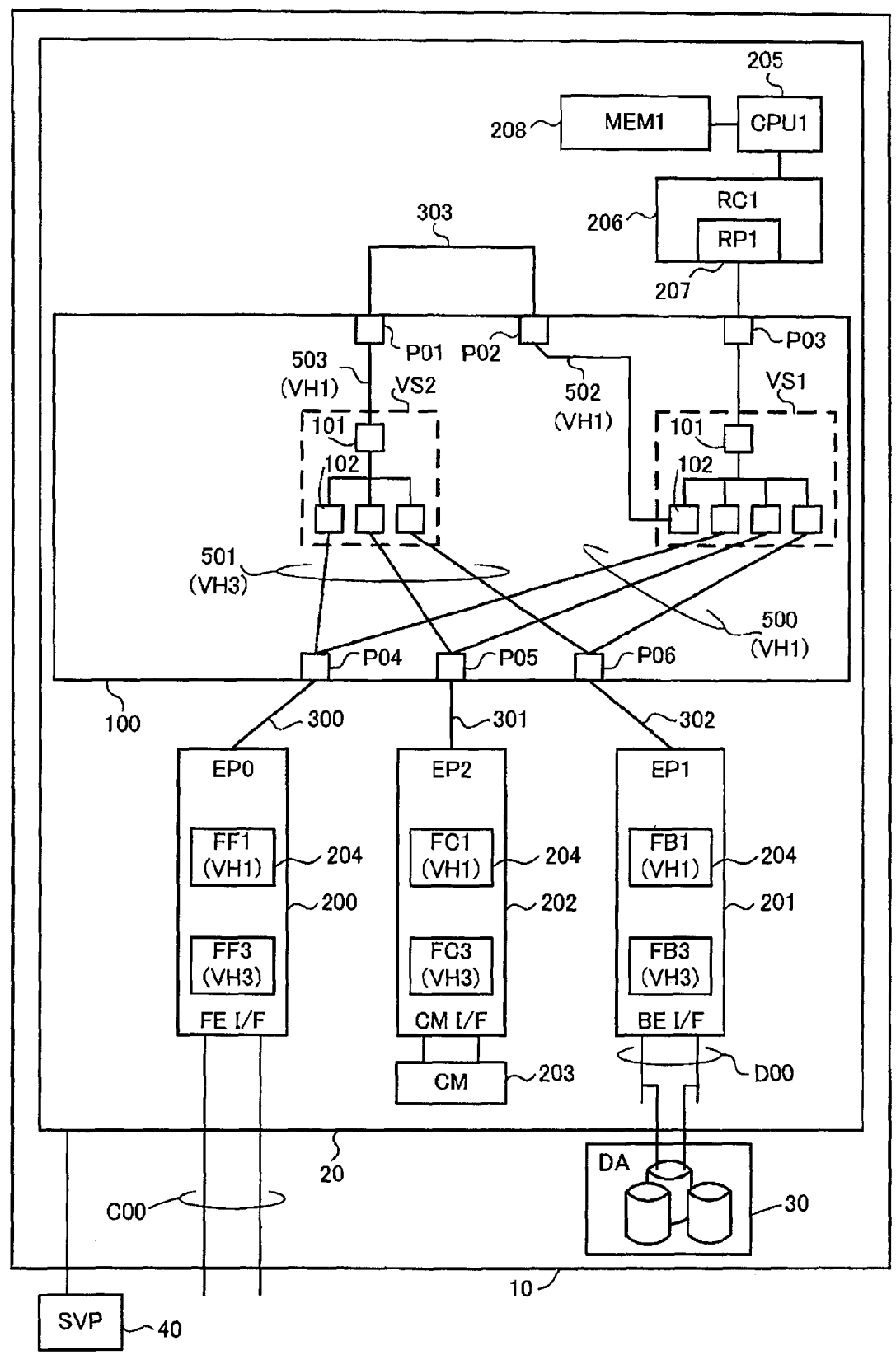
FIG. 6 is a diagram for describing a virtual hierarchy (VH (RP1)) of the storage device in accordance with the first embodiment.
Figure 7:
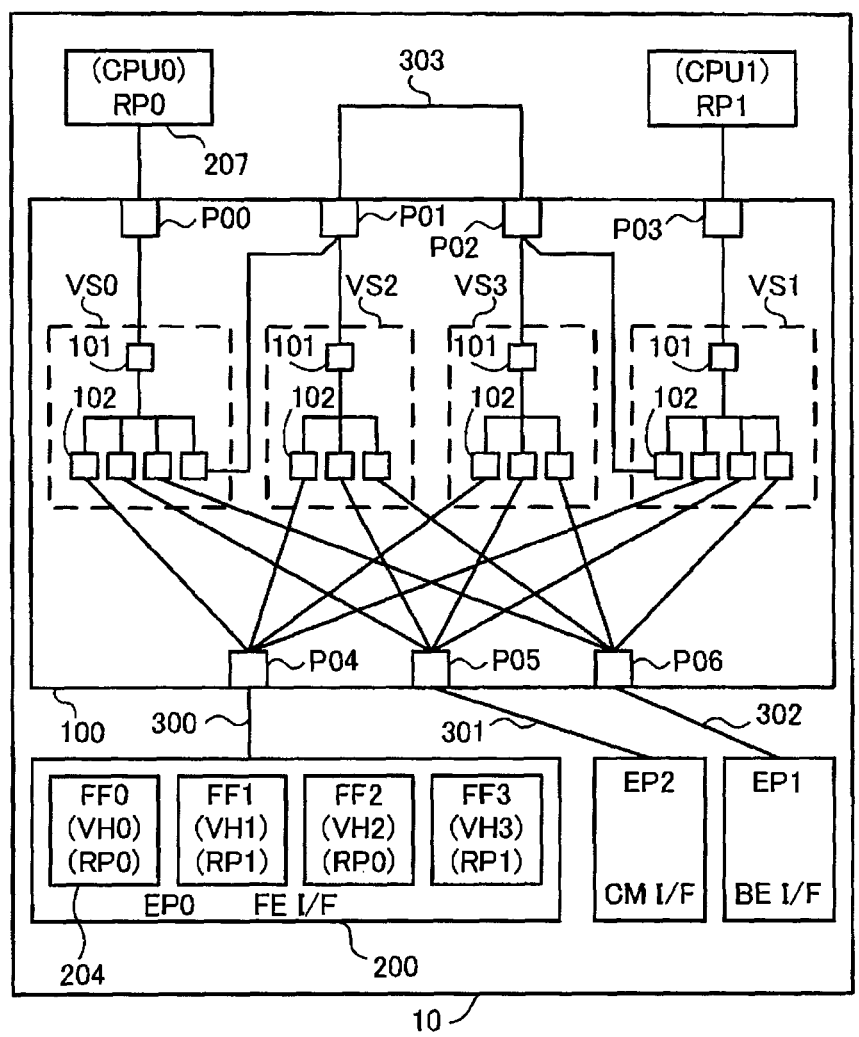
FIG. 7 is a diagram showing the unit of the initial operation of the storage device (a storage device to be expanded) in accordance with the first embodiment.

FIG. 6 is a diagram showing only the components related to the virtual hierarchy VH(RP1) having the RP1 as the root port, in the storage device 10 in FIG. 4. Described below is a path in which the processor 205 (CPU1) accesses the PCI function in each endpoint (EP0 to EP2). The RP1 is connected to the upstream bridge 101 of the virtual switch VS1 via the port P03 of the switch 100. Three of the downstream bridges 102 of the VS1 are connected to the ports P04 to P06, respectively, of the switch 100. The ports P04 to P06 are connected to the EP0 to the EP2 via the links 300 to 302. In the VH(RP1), when an EP is accessed only via the VS1, data is transferred using the VH number "VHF" on the links 300 to 302 (500 in FIG. 6).

One of the downstream bridges 102 of the VS1 is connected to the port P02 of the switch 100. In the VH(RP1), the port P02 functions as a downstream port and the port P01 functions as an upstream port, and they are connected with the link 303. In the VH(RP1), data is transferred using the VH number "VH1" on the link 303 (502 in FIG. 6).

The upstream bridge 101 of the virtual switch VS2 is connected to the port P01, and data is transferred using the VH number "VH1" on the link 303 (503 in FIG. 6). The three downstream bridges 102 of the VS2 are connected to the ports P04 to P06, respectively, of the switch 100. The ports P04 to P06 are connected to the EP0 to the EP2 via the links 300 to 302. In the VH(RP1), when an EP is accessed via the VS1, cross-link 303, and VS2, data is transferred using the VH number "VH3" on the links 300 to 302 (501 in FIG. 6).

As described above, the RP1 accesses the PCI functions 204 (FF1, FB1, and FC1) in the EP0 to the EP2 using the VH number "VH1" on the links 300 to 302. In addition, the RP1 accesses the PCI functions 204 (FF3, FB3, and FC3) in the EP0 to the EP2 using the VH number "VH3" on the links 300 to 302.

As described above, in this embodiment, the switch 100 has a configuration in which the ports P01 and P02 of the plurality of ports (P00 to P03) are connected with a cross-link. Each VS of the switch 100 has a single upstream bridge and a plurality of downstream bridges. The internal connection of each downstream bridge and each of the plurality of downstream ports (P04 to P06) to be linked to each EP is fixed. Accordingly, when the cross-link is connected, the resident RPs (RP0 and RP1) can use all of the PCI functions in each EP. Meanwhile, even when the cross-link is removed and the RP (CPU) is connected to each port (P00 to P03), it is also possible for the RP to use all of the PCI functions. In such a case, there is no need to change the mapping between each VS and the downstream port to be linked to each EP. That is, RPs can be easily added or removed only by attaching or detaching a cross-link without changing the internal configuration of the switch 100, whereby the PCI functions in each EP can be efficiently used (there will be no unusable PCI functions).

<Size Expansion of the Storage Device>

FIGS. 7 to 10 are diagrams for describing a connection configuration when the size of the storage device is expanded by connecting two storage devices 10 in accordance with this embodiment. Although FIG. 7 has the same configuration as FIG. 4, FIG. 7 only shows the principal parts of the storage device 10 for the sake of simplicity of the description. In this embodiment, the size of the storage device is expanded by adding to the storage device 10 another storage device 10 with the same configuration, as an expansion unit. The storage device 10 is configured as a stand-alone storage device.

In the storage device 10, the processor CPU0 accesses the PCI functions FF0, FB0, and FC0 in the EP0 to the EP2 via the RP0, using the VH0 on the links 300 to 302. The processor CPU0 also accesses the PCI functions FF2, FB2, and FC2 in the EP0 to the EP2 via the RP0, using the VH2 on the links 300 to 302. Meanwhile, the processor CPU1 accesses the PCI functions FF1, FB1, and FC1 in the EP0 to the EP2 via the RP1, using the VH1 on the links 300 to 302. The processor CPU1 also accesses the PCI functions FF3, FB3, and FC3 in the EP0 to the EP2 via the RP1, using the VH3 on the links 300 to 302.

Figure 8:
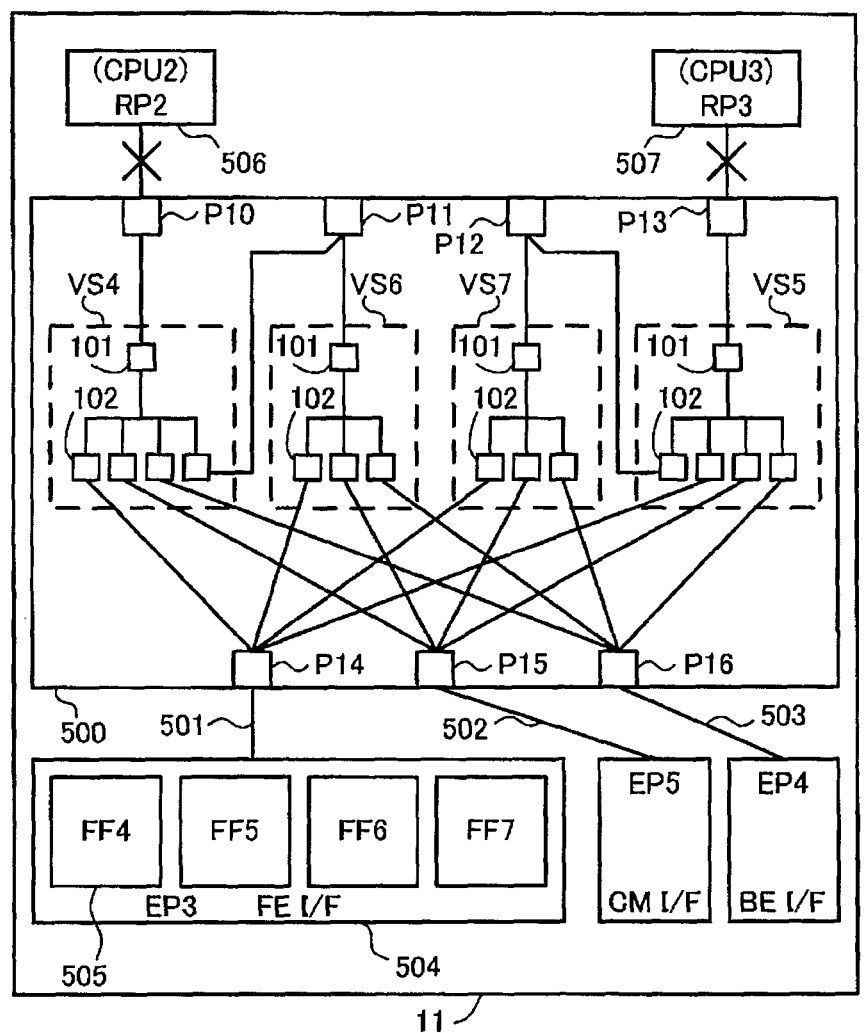
FIG. 8 is a diagram showing a storage device that is an expansion unit in accordance with the first embodiment.

FIG. 8 is a diagram showing an exemplary configuration of a storage device 11 that is connected to the storage device 10. Although the storage device 11 has the same configuration as the storage device 10 in FIG. 4, FIG. 8 shows only the principal parts of the storage device 11 for the sake of simplicity of the description.

The storage device 11 has an RP 506 and RP 507 (RP2 and RP3) to which two processors (CPU2 and CPU3) are connected, respectively, three EPs (Endpoints) (EP3, EP4, and EP5), and a switch 500. The three EPs correspond to a front-end interface (FE I/F), cache memory interface (CM I/F), and back-end interface (BE I/F).

The RP2 and RP3 are connected to the EP3 (FE I/F), EP4 (BE I/F), and EP5 (CM I/F) via the switch 500.

The switch 500 is an MRA switch that complies with the MR-IOV specification. In addition, each EP is a device (an MRA device) that complies with the MR-IOV specification.

The switch 500 has ports (P10 to P16) for connection to other components and a management port (not shown) for connection to the management network in the controller 20. The RP2 and RP3 are connected to the ports P10 and P13, respectively, of the switch 500. The port P14 of the switch 500 is connected to the EP3 via a link 501. The port P15 of the switch 500 is connected to the EP5 via a link 502. The port P16 of the switch 500 is connected to the EP4 via a link 503. The ports P11 and P12 of the switch 500 are not connected. The links 501 to 503 are MR-links.

The switch 500 includes a plurality of virtual switches (VS4 to VS7). An upstream bridge 101 of the virtual switch VS4 is connected to the port P10. Likewise, an upstream bridge 101 of the VS5 is connected to the port P13; an upstream bridge 101 of the VS6 is connected to the port P11; and an upstream bridge 101 of the VS7 is connected to the port P12. Three of downstream bridges 102 of each virtual switch are connected to the ports P14 to P16, respectively. One of the downstream bridges 102 of the VS4 is connected to the port P11. One of the downstream bridges 102 of the VS5 is connected to the port P12.

The EP3 to the EP5 have PCI functions 505 (the EP3 has FF4, FF5, FF6, and FF7; the EP4 has FB4, FB5, FB6, and FB7; and the EP5 has FC4, FC5, FC6, and FC7) that are accessible from the RP2 or RP3 when the P11 and P12 are connected with a cross-link.

In the storage device 11 when the ports P11 and P12 are connected with a cross-link as with the storage device 10, the processor CPU2 accesses the PCI functions FF4, FC4, and FB4 in the EP3 to the EP5 via the RP2, using the VH0 on the links 501 to 503. The processor CPU 2 also accesses the PCI functions FF6, FC6, FB6 in the EP3 to the EP5 via the RP2, using the VH2 on the links 501 to 503. Meanwhile, the processor CPU3 accesses the PCI functions FF5, FC5, and FB5 in the EP3 to the EP5 via the RP3, using the VH1 on the links 501 to 503. The processor CPU3 also accesses the PCI functions FF7, FC7, and FB7 in the EP3 to the EP5 via the RP3, using the VH3 on the links 501 to 503. On the cross-link that connects the ports P11 and P12, data is transferred using the VH0 for the VH(PR2) and using the VH1 for the VH(RP3).

Before the storage device 11 is connected to the storage device 10, the MR-IOV network is already initialized and set. However, the storage device 11 is configured such that it will not operate as a stand-alone device. For example, the processor CPU2 and processor CPU3 can be prevented from accessing the switch 500 by initially setting the ports P10 and P13, to which the RP2 and RP3 are connected, respectively, to function as downstream ports.

Figure 9:
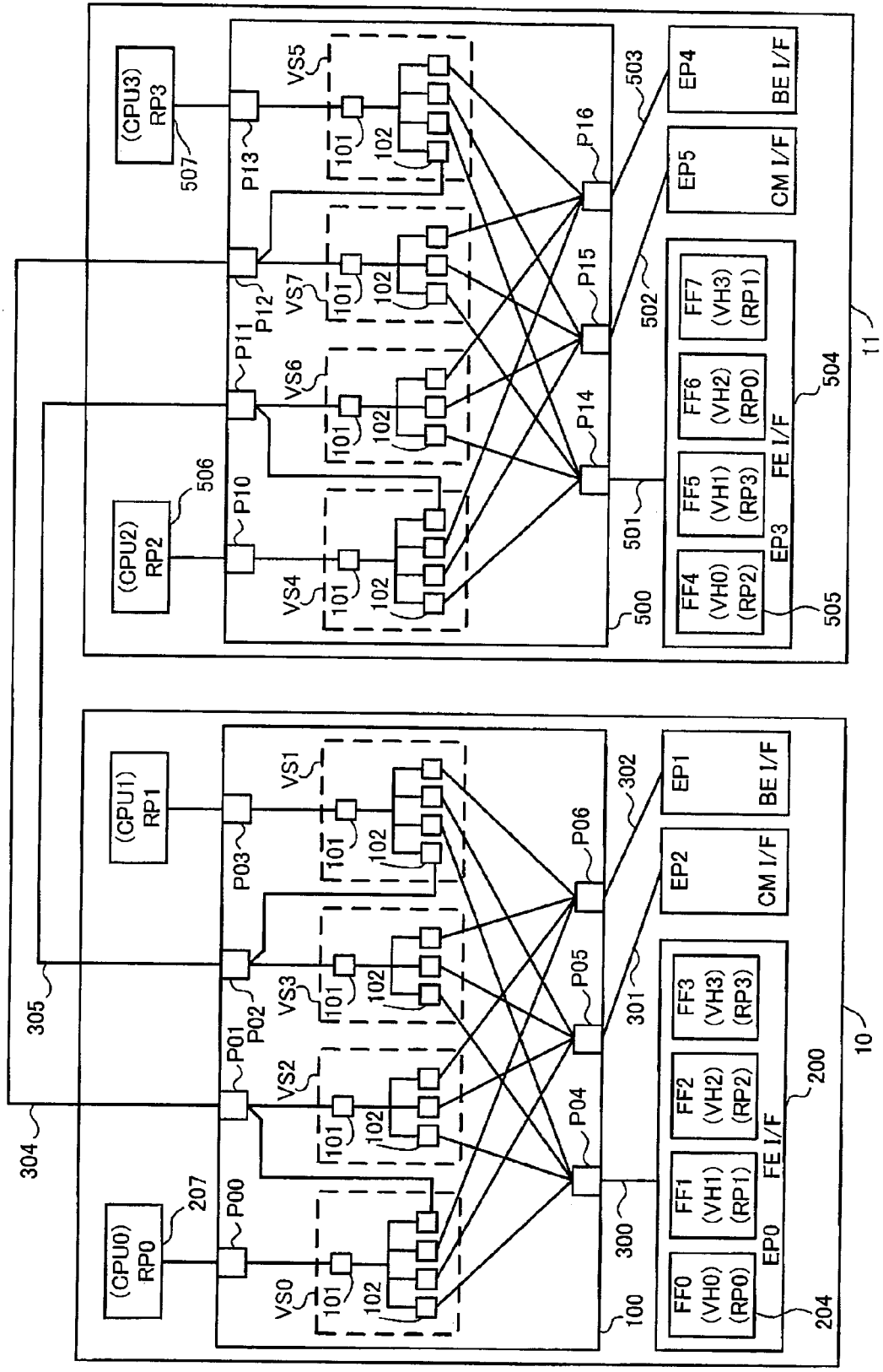
FIG. 9 is a diagram showing the schematic configuration of the expanded storage device in accordance with the first embodiment.

FIG. 9 is a diagram showing a configuration with a total of two storage devices which is obtained by adding the storage device 11 to the storage device 10. First, the cross-link 303 between the ports P01 and P02 of the storage device 10 that has been operating before the storage device 11 is added is removed. Next, the port P01 of the storage device 10 and the port P12 of the storage device 11 are connected with a cross-link 304. Further, the port P02 of the storage device 10 and the port P11 of the storage device 11 are connected with a cross-link 305. Accordingly, a total of two storage devices can be mutually connected. It should be noted that the connection conditions are described below with reference to FIG. 13.

Figure 10:
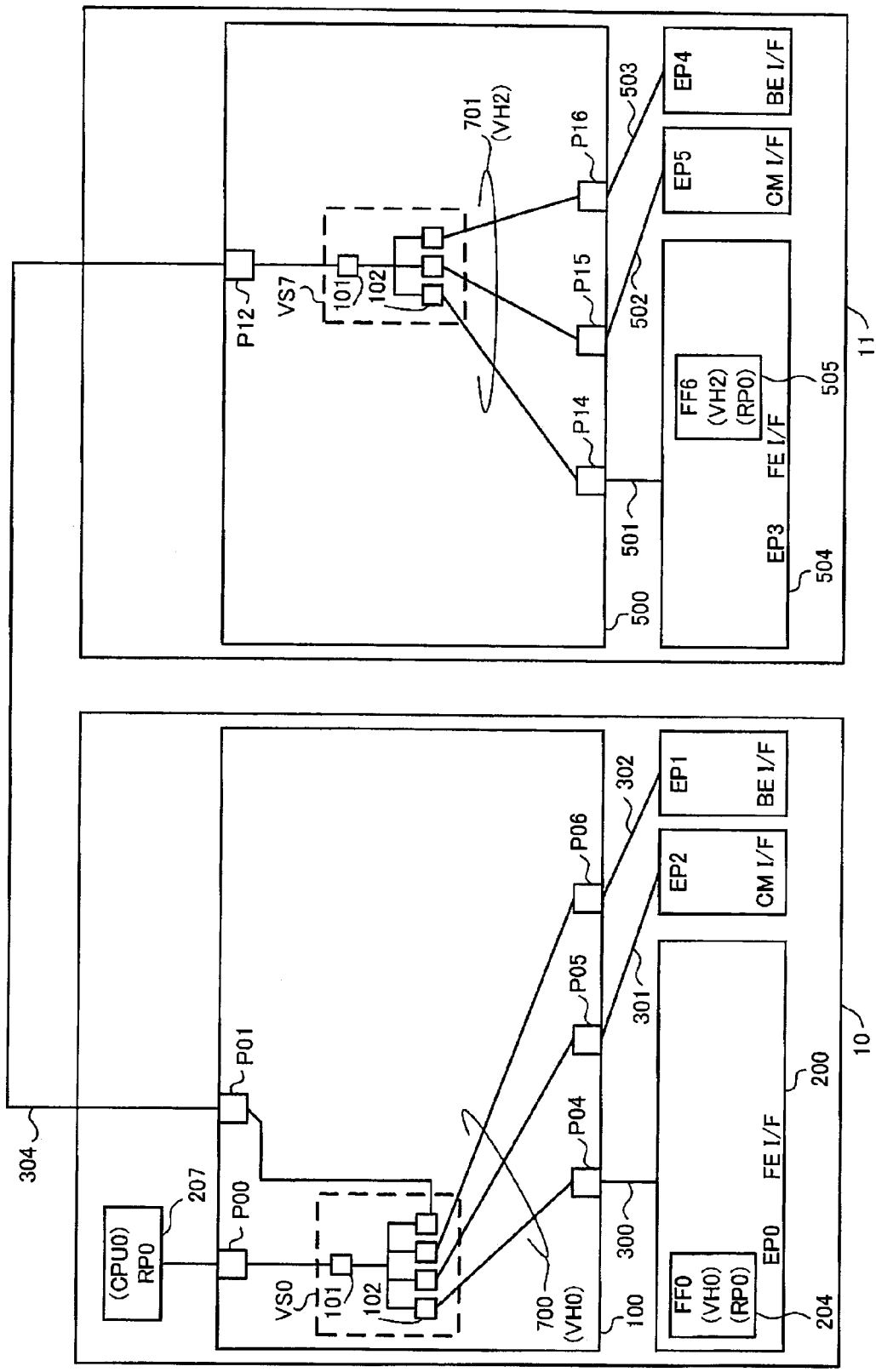
FIG. 10 is a diagram showing a virtual hierarchy (VH (RP0)) of the storage device in accordance with the first embodiment.

FIG. 10 is a diagram showing only the components related to the virtual hierarchy VH(RP0) having the RP0 as the root port, in the (expanded) storage device in FIG. 9. Described below is a path in which the processor 205 (CPU0) accesses the PCI function in each endpoint (EP0 to EP2) from the RP0. The RP0 is connected to the upstream bridge 101 of the virtual switch VS0 via the port P00 of the switch 100. Three of the downstream bridges 102 of the VS0 are connected to the ports P04 to P06, respectively, of the switch 100. The ports P04 to P06 are connected to the EP0 to the EP2 via the links 300 to 302. In the VH(RP0), when an EP is accessed only via the VS0, data is transferred using the VH number "VH0" on the links 300 to 302 (700 in FIG. 10). Such operation is the same as that when the storage device 10 operates alone.

One of the downstream bridges 102 of the VS0 is connected to the port P01 of the switch 100. In the VH(RP0), the port P01 of the switch 100 functions as a downstream port, and the port P12 of the switch 500 functions as an upstream port, and they are connected with the link 304. In the VH(RP0), data is transferred using the VH0 on the link 304.

In the storage device 11, the upstream bridge 101 of the virtual switch VS7 of the switch 500 is connected to the port P12, and data is transferred using the VH0 on the link 304. In addition, the three downstream bridges 102 of the VS7 are connected to the ports P14 to P16, respectively, of the switch 500. The ports P14 to P16 are connected to the EP3 to the EP5 via the links 501 to 503. In the VH(RP0), when an EP is accessed via the VS0, cross-link 304, and VS7, data is transferred using the VH2 on the links 501 to 503 (701 in FIG. 10).

As described above, the RP0 accesses the PCI functions 204 (FF0, FC0, and FB0) in the EP0 to the EP2 using the VH0 on the links 300 to 302. Further, the RP0 accesses the PCI functions 505 (FF6, FC6, and FB6) in the EP3 to the EP5 using the VH0 on the cross-link 304 and using the VH2 on the links 501 to 503.

The other RPs can access each EP in a similar way. For example, the RP1 accesses the PCI functions 204 (FF1, FC1, and FB1) in the EP0 to the EP2 using the VH1 on the links 300 to 302. Further, the RP1 accesses the PCI functions 505 (FF7, FC7, and FB7) in the EP3 to the EP5 using the VH1 on the cross-link 305 and using the VH3 on the links 501 to 503.

The RP2 accesses the PCI functions 204 (FF2, FC2, and FB2) in the EP0 to the EP2 using the VH0 on the cross-link 305 and using the VH2 on the links 300 to 302. Further, the RP2 accesses the PCI functions 505 (FF4, FC4, and FB4) in the EP3 to the EP5 using the VH0 on the links 501 to 503.

The RP3 accesses the PCI functions 204 (FF3, FC3, and FB3) in the EP0 to the EP2 using the VH1 on the cross-link 304 and using the VH3 on the links 300 to 302. Further, the RP3 accesses the PCI functions 505 (FF5, FC5, and FB5) in the EP3 to the EP5 using the VH1 on the links 501 to 503.

The storage device 10, when operating alone before the storage device 11 is added thereto, was configured such that each processor can use two PCI functions in each EP. The storage device shown in FIG. 9 that has been expanded by connecting the storage device 10 and storage device 11 is also configured such that each processor can use two PCI functions in each EP. Thus, according to this embodiment, the size of the storage device can be expanded with the number of PCI functions in each EP that can be used by each processor kept constant.

As described above, when the storage device 10 and storage device 11 are connected with the two cross-links 304 and 305, it becomes possible to construct the internal network of the storage device in which all of the RPs in the storage device can access any EP in the storage device.

According to this embodiment, processors in the storage controller can use asymmetrical (an equal number of) PCI functions regardless of from which root port each endpoint is seen. In other words, when the numbers of RPs and EPs are increased in the same proportion with the expansion of the storage device, all of the processors can equally use the PCI functions in each interface of the storage device. What is more, the number of the PCI functions that can be used by each processor can be kept constant relative to the size of the storage device (the number of the processors), and I/O processing associated with each PCI function can equally be performed regardless of the size of the storage device. As a result of the size expansion of the storage device, processing efficiency of the entire device can be improved, that is, the performance of the storage device can be enhanced.

Further, as there is no need to change the mapping between the switch ports and virtual switch bridges in connecting an additional storage device, the processing of expanding the size of the storage device can be simple.

<Configuration of the Cross-Link>

Figure 11:
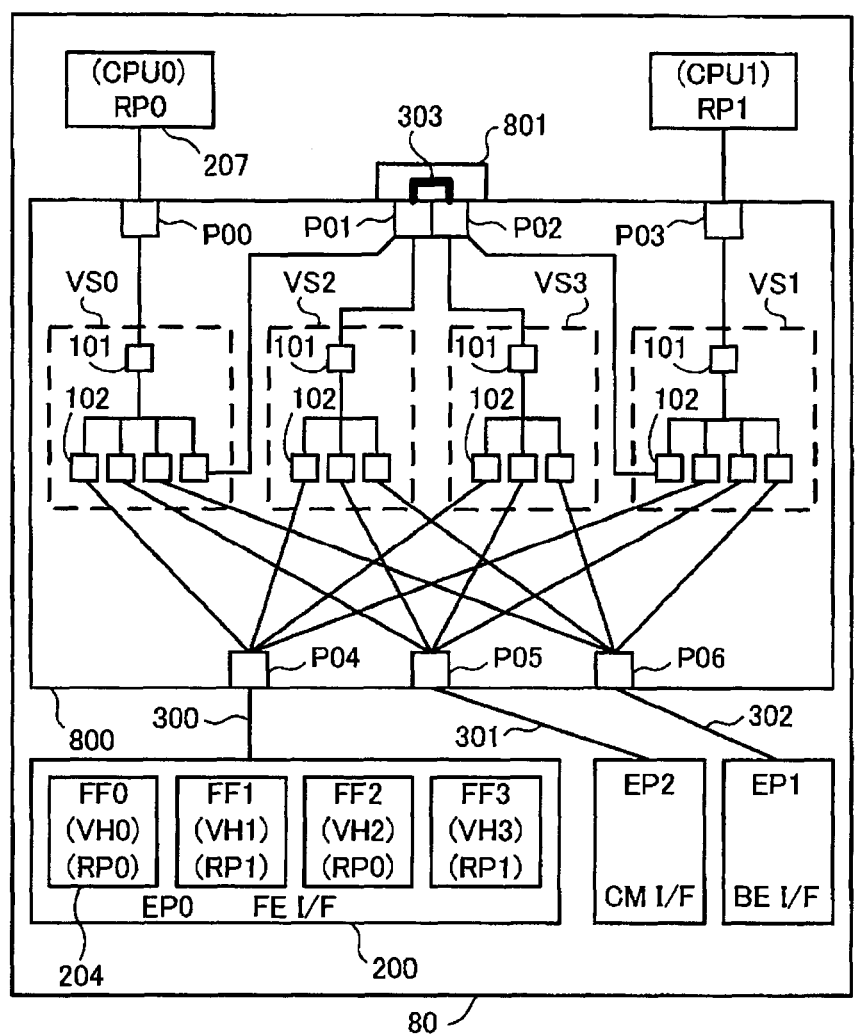
FIG. 11 is a diagram showing an exemplary connection (connector type) of switch ports of the storage device in accordance with the first embodiment.

FIG. 11 is a diagram showing an exemplary configuration of a cross-link in the storage device. A storage device 80 has a similar configuration to the storage device 10 in FIG. 4. Ports P01 and P02 of the switch 800 are arranged adjacent to each other. Further, a single plug 801 is connected to the ports P01 and P02. The plug 801 includes a wire for cross-link (303) connecting the ports P01 and P02. In this manner, arranging the switch ports adjacent to each other and cross-link connecting them with a single plug (a connector-type plug) allows the internal space of the storage device to be reduced and the cabling operation to be simplified.

Figure 12:
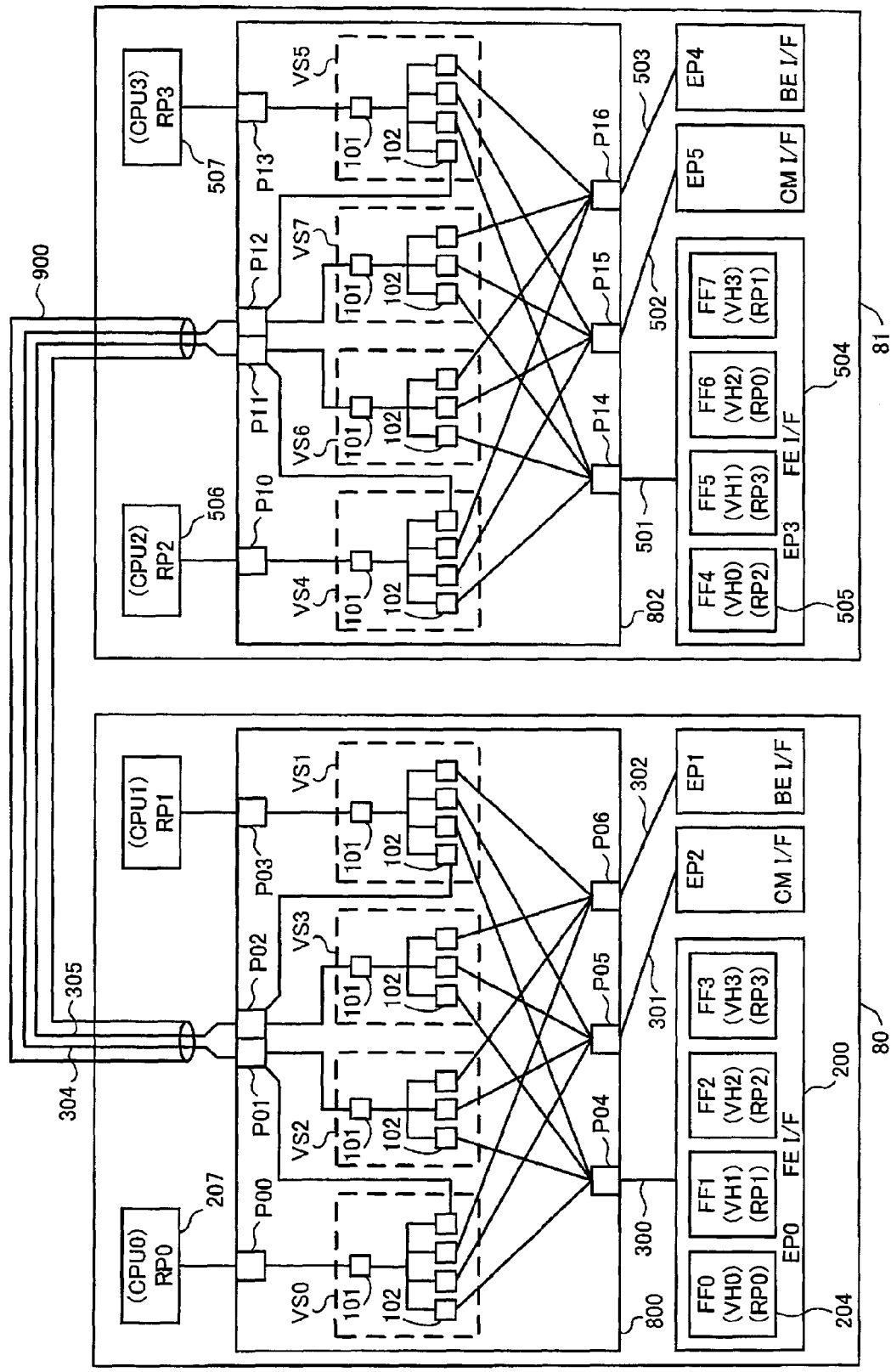
FIG. 12 is a diagram showing an exemplary cable connection of the (expanded) storage device in accordance with the first embodiment.

FIG. 12 shows another exemplary configuration of a cross-link between storage devices. A storage device 81 has a similar configuration to the storage device 11 in FIG. 8. Ports P11 and P12 of a switch 802 are arranged adjacent to each other. The port P01 of the switch 800 and the port P12 of the switch 802 are connected with a cross-link 304. Likewise, the port P02 of the switch 800 and the port P11 of the switch 802 are connected with a cross-link 305. The cross-links 304 and 305 are packaged in a single cable. In this manner, arranging the switch ports adjacent to each other and cross-link connecting them with a single cable 900 allows the internal space of the storage device to be reduced and the cabling operation to be simplified.

<Arrangement of the MR-PCIM and Fail-Over Processing>

Figure 13:
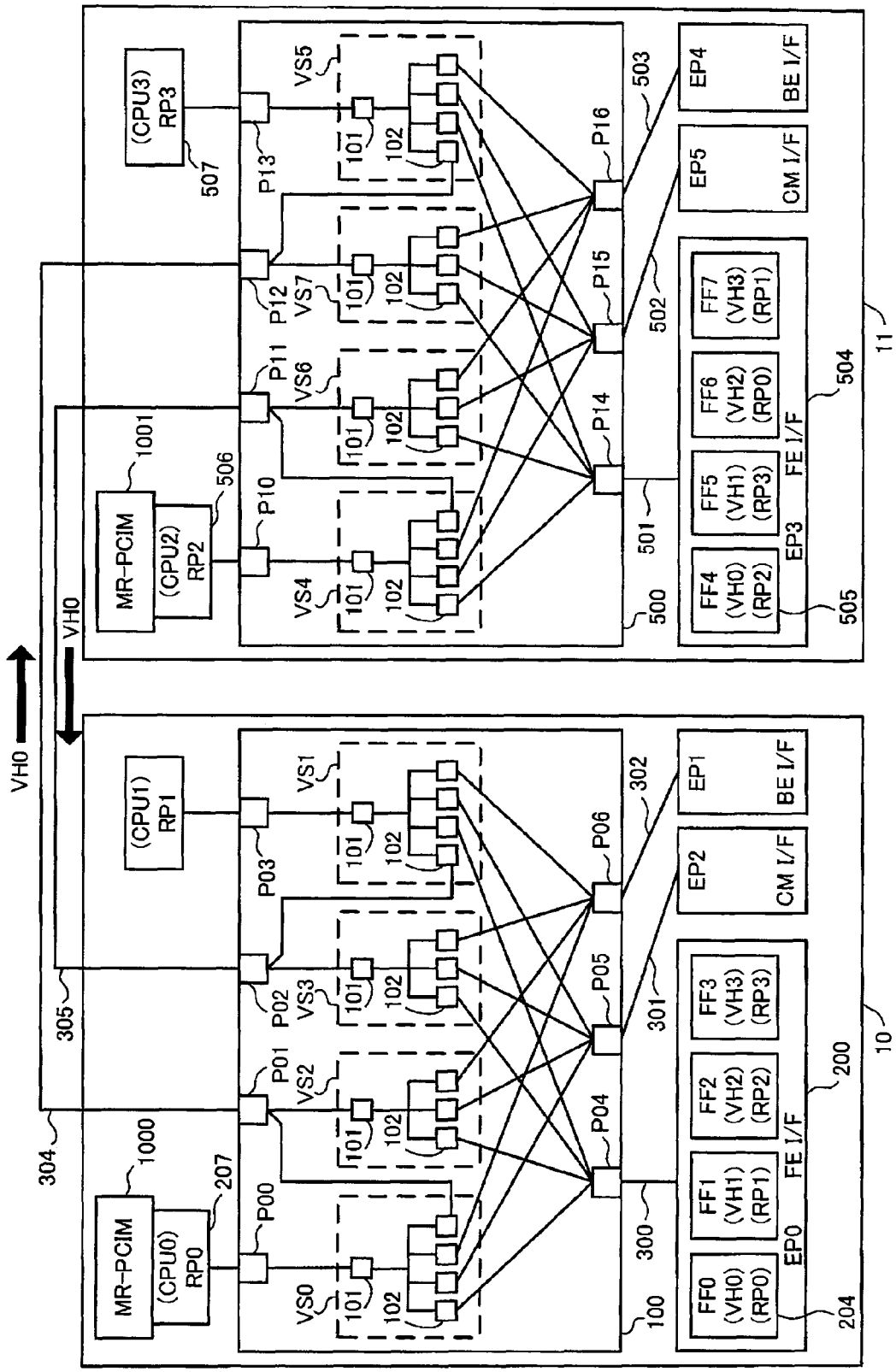
FIG. 13 is a diagram illustrating the arrangement of MR-PCIMs in the storage device in accordance with the first embodiment.

FIG. 13 is a diagram illustrating the arrangement of the MR-PCIM in accordance with this embodiment. An MRA switch typically includes a plurality of virtual switches (VSs). Some of the VSs are authorized VSs. An authorized VS refers to a VS having functions of setting and managing the MRA switch when the VS is accessed from the MR-PCIM. Further, one of the plurality of authorized VSs is a management VS. The MR-PCIM operates on a processor connected to an RP that is associated with the virtual hierarchy to which the management VS belongs. That is, the MR-PCIM sets and manages the MRA switch by accessing one of the plurality of authorized VSs that is specified as a management VS. It should be noted that the setting of the management VS can be changed by accessing any of the authorized VSs from the MR-PCIM.

The MRA device has a base function (BF) that is a PCI function for setting and managing the MR-IOV capability. The BF belongs to the virtual hierarchy in which each device is accessed with the VH0. The MR-PCIM, which operates on a processor connected to an RP associated with the virtual hierarchy in which the MRA device is accessed with the VH0, sets and manages the device by accessing the BF.

In this embodiment, an MR-PCIM is arranged in each storage device that is an expansion unit. Management of EPs in each storage device is executed by the MR-PCIM in each storage device, and management of mutual connection between the storage devices (e.g., the MRA switch and links) is executed by an MR-PCIM (1000) in the storage device 10. The MR-PCIM (1000) and MR-PCIM (1001) can communicate with each other via a shared memory area provided in the cache memory of the storage device or via the management network.

When the storage device 10 is operating alone before the storage device 11 is added thereto (before the size expansion), the processor CPU0 executes the MR-PCIM (1000). In the switch 100, the VS0 and VS3 are set as the authorized VSs and the VS0 is set as the management VS. The MR-PCIM (1000) sets and manages the switch 100 by accessing the VS0. In addition, for the VS0, VS Suppress Reset Propagation is set active so that the switch 100, the EP0 to the EP2, and the like will be prevented from, even when the MR-PCIM (1000) is reset for rebooting purposes, being reset concurrently.

The MR-PCIM (1000) initializes and manages the MR-IOV network using resources in the MR-IOV network that are assigned to the VH0. For example, as the processor CPU0 in the storage device 10 can access the BF in each EP using the VH0 on the links 300 to 302, the MR-PCIM (1000) can set and manage each EP in the storage device 10.

The processor CPU2 of the storage device 11 executes the MR-PCIM (1001). In the switch 500, the VS4 and VS7 are set as the authorized VSs, and the VS7 is set as the management VS. The MR-PCIM (1000) in the storage device 10 sets and manages the switch 500 by accessing the VS7 via the link 304. In addition, for the VS4, VS Suppress Reset Propagation is set active so that the switch 500 and the EP3 to the EP5 will be prevented from, even when the MR-PCIM (1001) is reset for rebooting purposes, being reset concurrently.

In the storage device 11, the processor CPU2 can access the BF in each EP using the VH0 on the links 501 to 503. Thus, the MR-PCIM (1001) can manage the setting of each EP in the storage device 11.

The MR-PCIM (1001), upon occurrence of an error in the MR-PCIM (1000), takes over the management of the MR-IOV network (e.g., the MRA switch and links). Hereinafter, a fail-over operation in which the MR-PCIM (1000) is switched over to the MR-PCIM (1001) when a need arises to reset and reboot the MR-PCIM (1000) upon occurrence of a software error will be described.

The MR-PCIM (1001), upon detection of an error in the MR-PCIM (1000), first accesses the VS4 that is the authorized VS of the switch 500, and changes the management VS of the switch 500 from the VS7 to the VS4. Next, the MR-PCIM (1001) accesses the VS3 that is the authorized VS of the switch 100 via the link 305, and changes the management VS of the switch 100 from the VS0 to the VS3. Thereafter, the MR-PCIM (1001) instructs the processor (CPU0) to reset and reboot the MR-PCIM (1000). After the reboot, the MR-PCIM (1000) sets and manages the EP0 to the EP2 in the storage device 10. The MR-PCIM (1001) sets and manages the EP3 to the EP5 in the storage device 11, switch 100, switch 500, links, and the like. That is, the functions of the MR-PCIM (1000) and MR-PCIM (1001) are switched after the execution of the MR-PCIM fail-over.

The MR-PCIM initializes the MR-IOV network using resources assigned to the VH0. In this embodiment, two storage devices are connected using two links. The two links are assigned VH0 one by one in opposite directions. That is, the MR-PCIM (1000) that operates on the processor CPU0 can use the VH0 on the link 304, and the MR-PCIM (1001) that operates on the processor CPU2 can use the VH0 on the link 305. As described above, as the VH0 can be used in both directions using the two links, either the MR-PCIM in the storage device 10 or in the storage device 11 can execute initialization and management of the MR-IOV network (e.g., the MRA switch and links) using the VH0.

The aforementioned description is concluded as follows. Each of the two MR-PCIMs 1000 and 1001 has its own defined function. Examples of tasks of the MR-PCIM include setting and management of the switch and setting and management of the EPs. In this embodiment, each of the storage devices 10 and 11 has an MR-PCIM, and such an MR-PCIM manages the EPs included in each storage device. That is, the MR-PCIM 1000 manages the EP0 to the EP2 and the MR-PCIM 1001 manages the EP3 to the EP5. Meanwhile, the switches 100 and 500 are managed by the MR-PCIM 1000. When an error occurs in the MR-PCIM 1000 under such circumstances, the function of the MR-PCIM 1000 that manages the switches 100 and 500 is failed over to the MR-PCIM 1001 that is operating normally. It should be noted that in this embodiment, the 0th VH (VH0) is very important as the network is initialized using the VH0. VHs that follow the 0th VH are assigned only after the VH0 has operated satisfactorily. In addition, the VH0 is assigned to both the links 304 and 305 as described above. In this manner, when the storage device is configured such that the VH0 can be used in the two directions, the network can be managed regardless of which storage device has an MR-PCIM.

<Processing of Adding another Storage Device>

Figure 14:
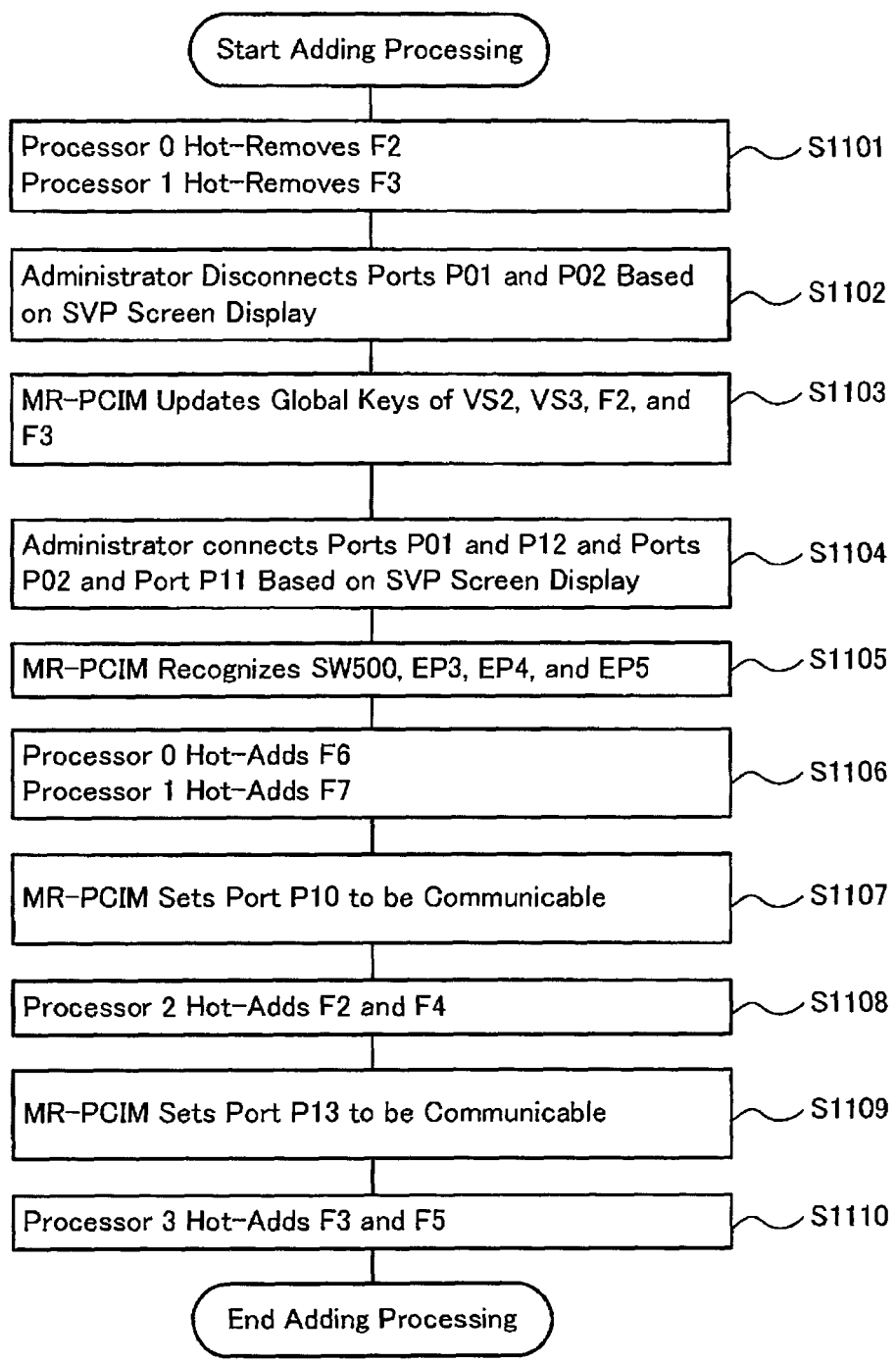
FIG. 14 is a flow chart for describing the processing of adding another storage device in accordance with the first embodiment.

FIG. 14 is a flow chart for describing the details of the processing of adding another storage device. Procedures for constructing the storage device in FIG. 9 by connecting the storage device 10 and storage device 11 will be described. It should be noted that the connection state of each port of the storage device when another storage device is added thereto is displayed as needed on the screen of the display device of the SVP 40 so that the administrator can check the connection state on the display.

First, it is assumed that the storage device 10 operates alone. The processor CPU0 of the storage device 10, upon receipt of an instruction to add another storage device, hot-removes the FF2, FC2, and FB2 in the EP0 to the EP2. In addition, the processor CPU1, upon receipt of the instruction to add another storage device, also hot-removes the FF3, FC3, and FB3 in the EP0 to the EP2 (S1101). At this time, as each processor in the storage device 10 can use the PCI functions F0 (FF0, FC0, and FB0) and PCI functions F1 (FF1, FC1, and FB1) in the EP0 to the EP2, it can continue the data processing as the storage device.

Next, an operation of removing the cross-link 303 is carried out. The administrator of the storage device 10, in accordance with an instruction displayed on the SVP screen, disconnects the ports 01 and P02 (S1102). At this time, information that can identify switch ports connected to the target link to be removed, e.g., positional information on the ports is displayed on the SVP screen.

Next, the MR-PCIM 1000 (see FIG. 13) updates the global key of each of the VS2, VS3, PCI functions F2 (FF2, FC2, and FB2), and PCI functions F3 (FF3, FC3, and FB3) (S1103). The global key is the information defined to uniquely identify the virtual hierarchy in the MR-IOV specification. As RPs connected to the upstream ports of the VS2 and VS3 are changed with the change of the cross-link connection along with the adding processing, the virtual hierarchy to which each of the VS2, VS3, PCI functions F2 (FF2, FC2, and FB2), and PCI functions F3 (FF3, FC3, and FB3) belongs is also changed. As a global key is assigned for each virtual hierarchy, it is necessary to, when the virtual hierarchy to which each VS belongs is changed with the change of the cross-link connection, update the global key in the VS. That is, the global key is updated in order to maintain the integrity after the change of the cross-link connection.

Next, the administrator, in accordance with the screen display (not shown) of the SVP40, connects the ports P01 and P12 and the ports P02 and P11 (S1104). On the SVP screen, information that can identify switch ports connected to the target link to be attached, e.g., positional information the ports is displayed as in step S1102.

Thereafter, the MR-PCIM 1000 recognizes the switch 500, EP3, EP4, and EP5 that are added to the MR-IOV network (S1105).

Next, the processor CPU0 hot-adds the FF6, FB6, and FC6 in the EP3 to the EP5 of the storage device 11. In addition, the processor CPU1 hot-adds the FF7, FB7, and FC7 in the EP3 to the EP5 of the storage device 11 (S1106).

Then, the MR-PCIM 1001 sets the port P10 of the switch 500 to be communicable. For example, it changes the port P10, which has been set as a downstream port, to an upstream port (S1107). As a result, the processor CPU2 hot-adds the PCI functions F2 (FF2, FC2, and FB2) in the EP0 to the EP2 and the PCI functions F4 (FF4, FC4, and FB4) in the EP3 to the EP5 (S1108).

Next, the MR-PCIM 1001 sets the port P13 of the switch 500 to be communicable. For example, it changes the port P13, which has been set as a downstream port, to an upstream port (S1109). As a result, the processor CPU3 hot-adds the PCI functions F3 (FF3, FC3, and FB3) in the EP0 to the EP2 and the PCI functions F5 (FF5, FC5, and FB5) in the EP3 to the EP5 (S1110).

Through the aforementioned procedures for adding another storage device, it becomes possible for all of the processors (CPU0 to CPU3) in the whole storage device with the expanded size to access each EP (EP0 to EP5) in the storage device. In this embodiment, during the adding processing, PCI functions in a number corresponding to the number of the added RPs becomes unusable as a result of the hot-remove processing. However, as the other usable PCI functions remain in each EP, the operation of the storage device can be continued without difficulty.

It should be noted that the aforementioned adding processing can also be applied to cases in which a generalized configuration of a storage device (FIGS. 26 and 27) or a redundant network configuration (FIG. 33) is used.

<Processing of Removing Storage Device>

Figure 15:
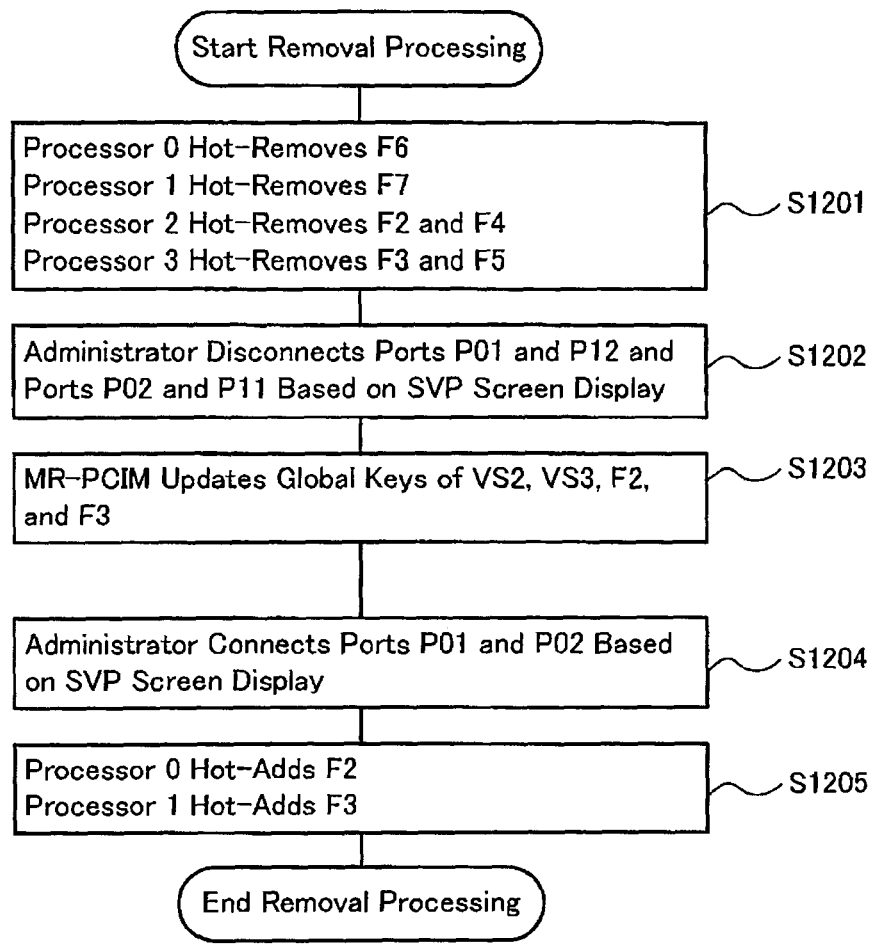
FIG. 15 is a flow chart for describing the processing of removing a storage device in accordance with the first embodiment.

FIG. 15 is a flow chart for describing the processing procedures for removing (detaching) a storage device from two storage devices that are connected together. Specifically, procedures for removing the storage device 11 from the connected storage device 10 and storage device 11 shown in FIG. 9 will be described. It should be noted that the connection state of each port of the storage device in removal of the storage device is displayed as needed on the screen of the display device of the SVP 40 as in the adding processing so that the administrator can check the connection state on the display.

First, the processor CPU0 hot-removes the PCI functions F6 (FF6, FC6, and FB6) in the EP3 to the EP5 of the storage device 11. The processor CPU1 also hot-removes the PCI functions F7 (FF7, FC7, and FB7) in the EP3 to the EP5 of the storage device 11. Further, the processor CPU2 hot-removes the PCI functions F2 (FF2, FC2, and FB2) in the EP0 to the EP2 of the storage device 10, and the PCI functions F4 (FF4, FC4, and FB4) in the EP3 to the EP5 of the storage device 11. In addition, the processor CPU3 hot-removes the PCI functions F3 (FF3, FC3, and FB3) in the EP0 to the EP2 of the storage device 10, and the PCI functions F5 (FF5, FC5, and FB5) in the EP3 to the EP5 of the storage device 11 (S1201).

Thereafter, the administrator, in accordance with the SVP screen display, removes the cross-link connections between the port P01 of the switch 100 and the port P12 of the switch 500 and between the port P02 of the switch 100 and the port P11 of the switch 500 (S1202). At this time, information that can identify switch ports connected to the target link to be removed, e.g., positional information on the ports is displayed on the SVP screen.

Next, the MR-PCIM 1000 updates the global key of each of the VS2, VS3, and PCI functions F2 (FF2, FC2, and FB2) and PCI functions F3 (FF3, FC3, and FB3) in the EP0 to the EP2 (S1203).

Then, the administrator connects the ports P01 and P02 of the switch 100 with a cross-link in accordance with the SVP screen display (S1204). At this time, information that can identify switch ports connected to the target link to be attached, e.g., positional information on the ports is displayed on the SVP screen.

Thereafter, the processor CPU0 detects the cross-link connection and hot-adds the PCI functions F2 (FF2, FC2, and FB2) in the EP0 to the EP2. Likewise, the processor CPU1 detects the cross-link connection and hot-adds the PCI functions F3 (FF3, FC3, and FB3) in the EP0 to the EP2 (S1205).

Through the aforementioned procedures of the removal processing, it becomes possible for the processors (CPU0 and CPU1) in the storage device 10, after the removal processing, to access the EP0 to the EP2 in the same manner as when the storage device 10 operates alone. In this embodiment, during the removal processing, PCI functions in a number corresponding to the number of the removed RPs becomes unusable as a result of the hot-remove processing. However, as the other usable PCI functions remain in each EP, the operation of the storage device can be continued without difficulty.

It should be noted that the aforementioned removal processing can also be applied to cases in which a generalized configuration of a storage device (FIGS. 26 and 27) or a redundant network configuration (FIG. 33) is used.

<Internal Configuration of the Front-End Interface>

Figures 16, 17:
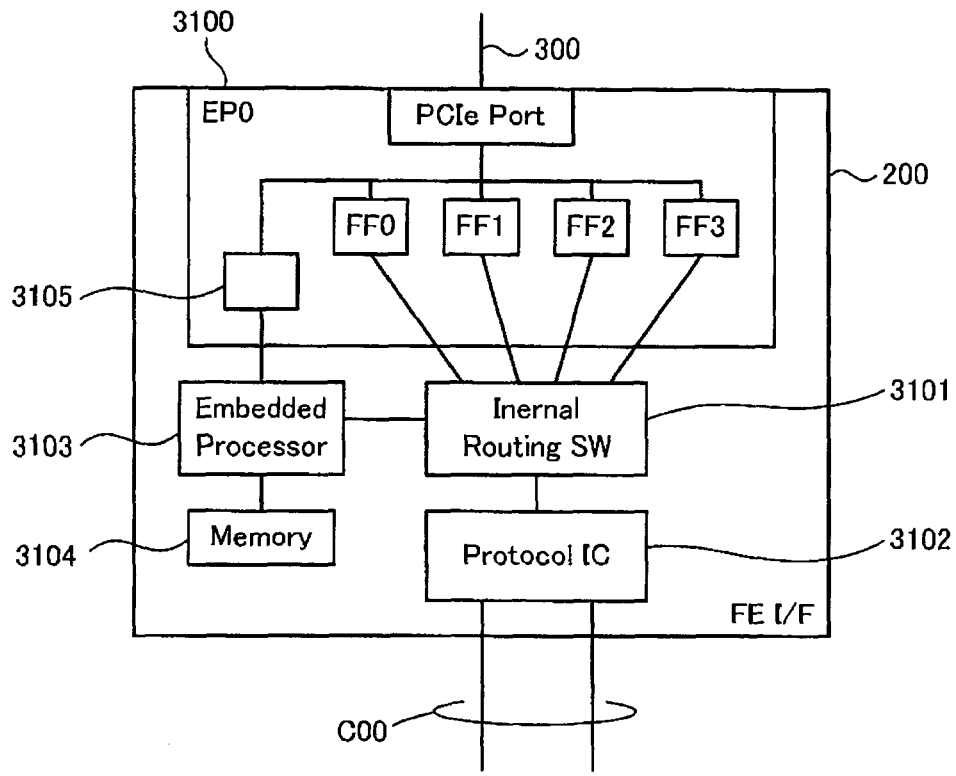
FIG. 16 is a diagram showing an exemplary configuration of a front-end interface of the storage device in accordance with the first embodiment.
FIG. 17 is a diagram showing a management table which the front-end interface of the storage device refers to in accordance with the first embodiment.

FIG. 16 is a diagram showing the internal configuration of the front-end interface (FE I/F) 200. The FE I/F 200 has a PCI Express (PCIe) I/F unit 3100 corresponding to the EP (EP0) that complies with the MR-IOV specification, an embedded processor 3103, and memory 3104 accessed by the processor 3103. Further, the FE I/F 200 includes a protocol IC 3102 that controls data transfer over the channel C00, and an internal switch 3101.

The PCIe I/F unit 3100 has, in addition to the PCI functions (FF0 to FF3) for controlling data transfer between the EPs in the storage controller, a PCI function 3105 for setting and managing the FE I/F 200. The PCI function 3105 can be accessed from both the processor (e.g., CPU0) on the MR-IOV network side and the embedded processor 3103 in the FE I/F 200. The processor (e.g., CPU0) in the storage controller accesses the PCI function 3105 using the VH0 on the link 300, and sets and manages sections other than the PCIe I/F unit of the FE I/F 200.

When the FE I/F 200 controls a management program (e.g., MR-PCIM) by communicating with the processor in the storage controller, the embedded processor 3103 communicates with the processor (e.g., CPU0) in the storage controller via the PCI function 3105. The internal switch 3101 switches a data transfer path of data transmitted/received by the protocol IC 3102, specifically, data transferred between the protocol IC 3102 and the PCI functions (FF0 to FF3) for transferring data in the PCIe I/F unit 3100. The change of the data transfer path with the internal switch 3101 is controlled by the embedded processor 3103 based on a management table stored in the memory 3104.

<Management Table for Switching Data Transfer Path>

FIG. 17 shows a management table 3200 for controlling the switching of a data transfer path with the internal switch 3101. This management table 3200 is stored in the memory 3104, and is referred to by the embedded processor 3103. Accessing the management table 3200 from the processor (e.g., CPU0) in the internal network of the storage controller or from the administrative terminal SVP 40 allows the setting of the table to be changed.

The management table 3200 has stored therein information 3201 on the data write target or data read target included in a packet header transmitted/received over the channel C00, and setting of the PCI function (3202 to 3204) in the PCIe I/F unit 3100 that is the transmission source/destination of the data. As the information 3201, a logical unit number is stored, for example. The PCI function setting 3202 is the setting when the storage device operates normally. The PCI functions FF0 to FF3 (herein, only the PCI functions of the FE I/F are shown) are assigned to the logical unit numbers 0 to 3, respectively. The PCI function setting 3203 is the setting when only the two PCI functions FF2 and FF3 are used. The PCI function setting 3204 is the setting when only the two PCI functions FF0 and FF1 are used. Which of the PCI function settings 3202 to 3204 is to be used is determined by the embedded processor 3103 based on an instruction from the processor (e.g., CPU0) in the storage controller or from the SVP 40.

In the storage device of the present invention, part of the PCI functions is, during the processing of adding or removing a storage device, temporarily hot-removed and thus becomes unusable in that period. In such a case, if the PCI functions FF2 and FF3 are hot-removed, for example, information on the change of the data transfer path with the internal switch 3101 is changed from 3202 to 3204 of the management table. As a result, data transmitted/received by the protocol IC 3102 can be processed by the PCI functions FF0 and FF1, and thus, the data processing of the storage device can be continued even during the adding processing. It should be noted that each of the other BE I/F 201 and CM I/F 202 also has a function capable of switching the PCI functions for handling the data processing according to circumstances.

(2) Second Embodiment

A storage device in accordance with the second embodiment of the present invention will be described with reference to FIGS. 18 to 22. The second embodiment relates to scalable storage device to which a maximum of two additional storage devices can be connected, and each storage device that is an expansion unit has a single RP.

<Configuration of each Storage Device>

Figure 18:
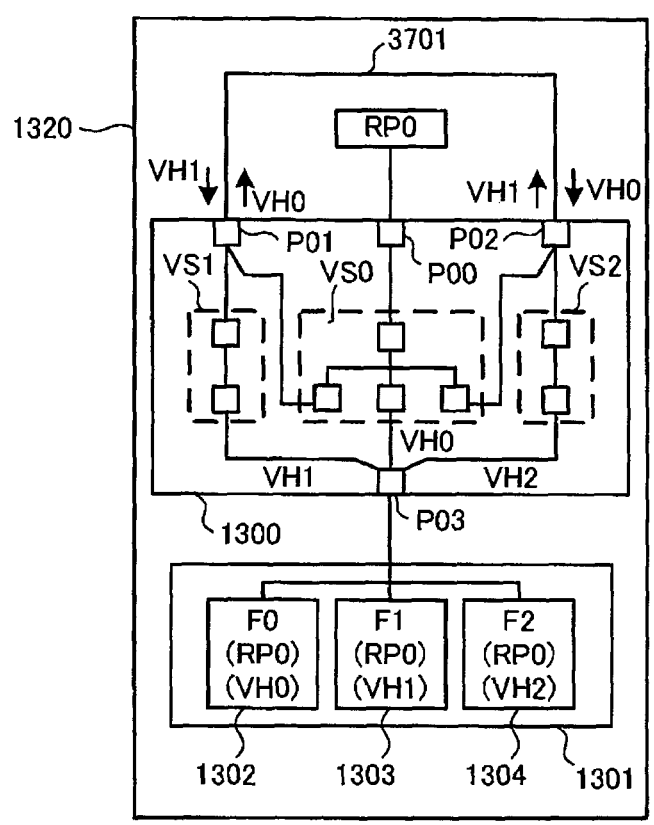
FIG. 18 is a diagram showing an exemplary schematic configuration of the storage device in accordance with the second embodiment.

FIG. 18 is a diagram showing the schematic configuration of a single storage device in accordance with the second embodiment. In FIG. 18, a storage device 1320 has a single RP, single switch 1300, and single EP 1301. The EP 1301 has one or more of the functions of the FE I/F, CM I/F, and BE I/F. As FIG. 18 shows only a single EP, PCI functions provided by the EP 1301 are represented as F0, F1, and F2.

P01 and P02 of the switch 1300 are connected with a cross-link 3701. The RP0 accesses a PCI function 1302 in the EP 1301 via a VS0 and P03, using the VH0 (on a link that connects the P03 and EP 1301). In addition, the RP0 accesses a PCI function 1303 in the EP 1301 via the VS0, P02, cross-link 3701, P01, VS1, and P03, using the VH1 on the link that connects the P03 and EP 1301. In such a case, the VH1 is used on the cross-link 3701. Further, the RP0 accesses a PCI function 1304 in the EP 1301 via the VS0, P01, cross-link 3701, P02, VS2, and P03, using the VH2 on the link that connects the P03 and EP 1301. In such a case, the VH0 is used on the cross-link 3701. The RP0 accesses the EP 1301 through the three kinds of access paths.

<Adding Another Storage Device: Configuration with Two Storage Devices>

Figure 19:
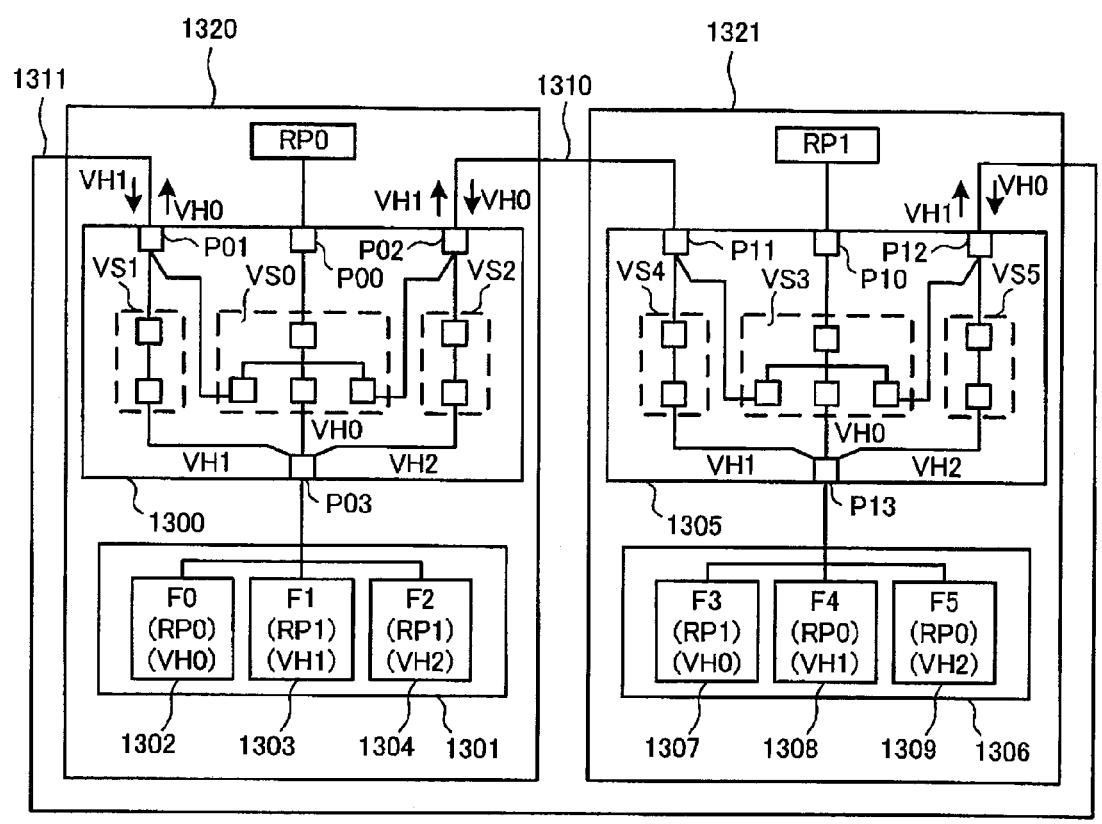
FIG. 19 is a diagram showing an exemplary schematic configuration of the expanded storage device (a configuration with two storage devices) in accordance with the second embodiment.

FIG. 19 is a diagram showing a configuration with a total of two storage devices which is obtained by adding a storage device 1321 to the storage device 1320. The storage device 1321 only differs from the storage device 1320 in that ports P11 and P12 are not connected with a cross-link.

In order to add the storage device 1321, the cross-link 3701 between the P01 and P02 of the storage device 1320 (FIG. 18) is removed first. Next, the P01 of the storage device 1320 and the P12 of the storage device 1321 are connected with a cross-link 1311. Further, the P02 of the storage device 1320 and the P11 of the storage device 1321 are connected with a cross-link 1310. Accordingly, a total of two storage devices can be mutually connected.

Figure 20:
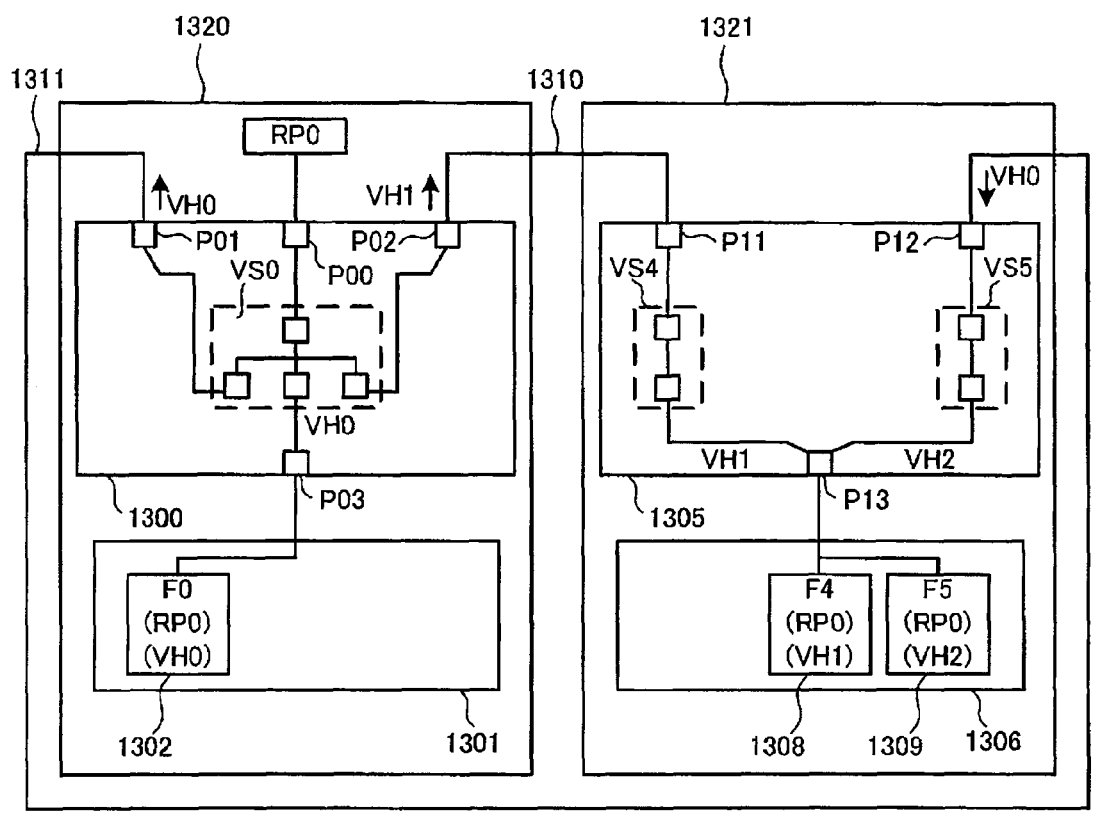
FIG. 20 is a diagram showing a virtual hierarchy (VH (RP0)) of the storage device in accordance with the second embodiment.

FIG. 20 is a diagram showing only the components related to the virtual hierarchy (VH(RP0)) having the RP0 as the root port, in the expanded storage device in FIG. 19. Described below is a path in which the RP0 accesses the PCI function in each end-point (1301 and 1306). The RP0 is connected to an upstream bridge of the virtual switch VS0 via a port P00 of the switch 1300. One of downstream bridges of the VS0 is connected to the port P03 of the switch 1300. The port P03 is connected to the EP 1301. In the VH(RP0), when the EP 1301 is to be accessed only via the VS0, the PCI function 1302 in the EP 1301 is accessed using the VH0 on the link that connects the P03 and EP1301. This is the same as when the storage device 1320 operates alone.

One of the downstream bridges of the VS0 is connected to the port P01 of the switch 1300. In the VH(RP0), the port P01 of the switch 1300 functions as a downstream port and the port P12 of the switch 1305 functions as an upstream port, and they are connected with the link 1311. In the VH(RP0), data is transferred using the VH0 on the link 1311.

In the storage device 1321, an upstream bridge of a virtual switch VS5 of the switch 1305 is connected to the P12 so that data can be transferred using the VH0 on the link 1311. In addition, a single downstream bridge of the VS5 is connected to a P13 of the switch 1305. The port P13 is connected to the EP 1306. In the VH(RP0), when the EP 1306 is to be accessed via the VS0, cross-link 1311, and VS5, a PCI function 1309 in the EP 1306 is accessed using the VH2 on the link that connects the P13 and EP1306.

One of the downstream bridges of the VS0 is connected to the port P02 of the switch 1300. In the VH(RP0), the P02 of the switch 1300 functions as a downstream port and the P11 of the switch 1305 functions as an upstream port, and they are connected with the link 1310. In the VH(RP0), data is transferred using the VH1 on the link 1310.

In the storage device 1321, an upstream bridge of a virtual switch VS4 of the switch 1305 is connected to the P11, and data is transferred using the VH1 on the link 1310. In addition, a single downstream bridge of the VS4 is connected to the P13 of the switch 1305. In the VH(RP0), when the EP 1036 is to be accessed via the VS0, cross-link 1310, and VS4, a PCI function 1308 in the EP 1306 is accessed using the VH1 on the link that connects the P13 and EP1306.

Accordingly, the RP0 accesses the PCI function 1302 in the EP 1301 and the PCI functions 1308 and 1309 in the EP 1306. Likewise, the RP1 can, in the VH(RP1), access the PCI functions 1303 and 1304 in the EP 1301 and a PCI function 1307 in the EP 1306.

<Adding Another Storage Device: Configuration with Three Storage Devices>

Figure 21:
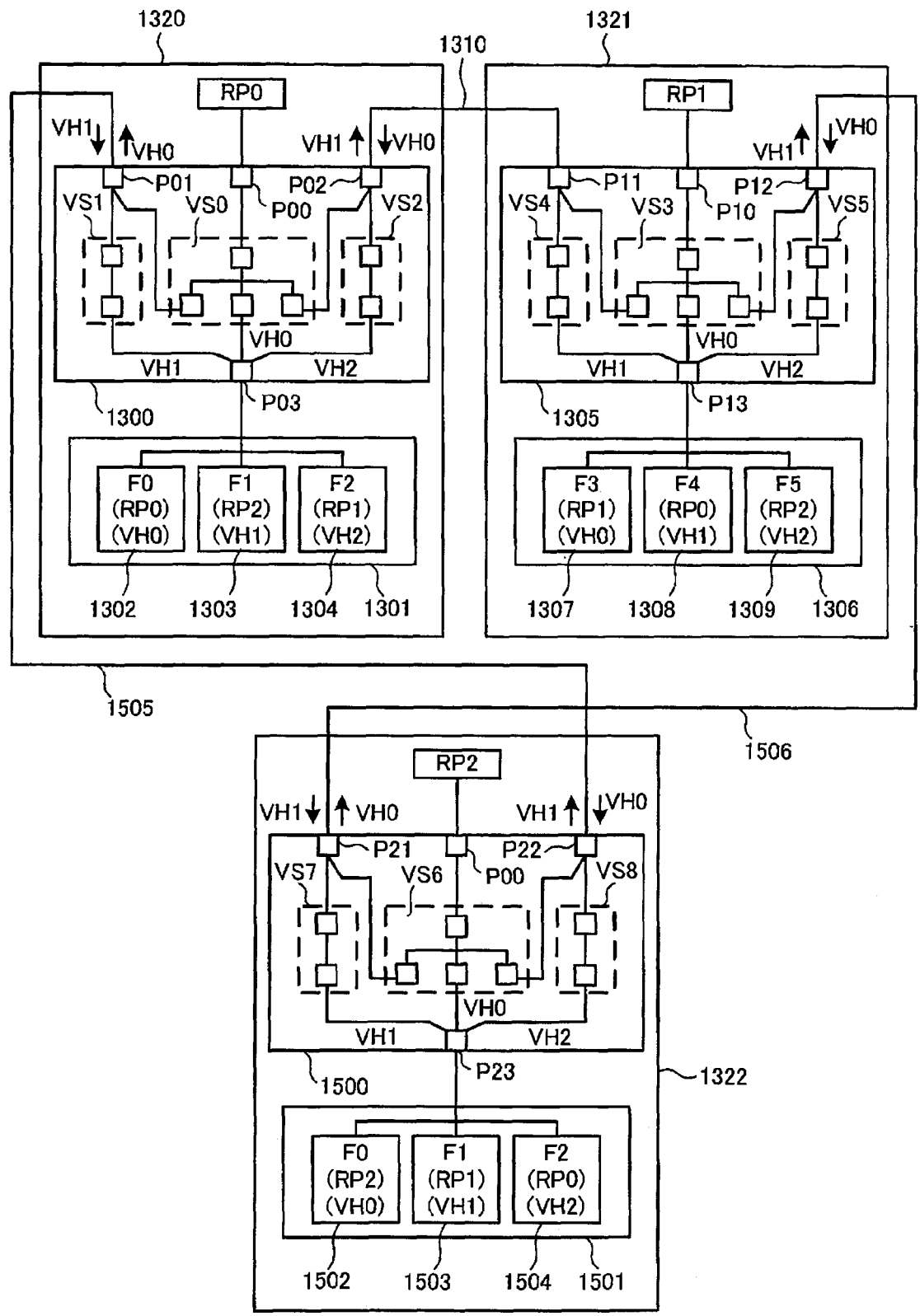
FIG. 21 is a diagram showing an exemplary schematic configuration of the expanded storage device (a configuration with three storage devices) in accordance with the second embodiment.

FIG. 21 is a diagram showing a configuration with a total of three storage devices which is obtained by adding a storage device 1322 to the storage device in FIG. 19.

First, in FIG. 19, the cross-link 1311 that connects the P01 of the storage device 1320 and the P12 of the storage device 1321 is removed. Next, the port P01 of the storage device 1320 and a P22 of the storage device 1322 are connected with a cross-link 1505. Further, the P12 of the storage device 1321 and a P21 of the storage device 1322 are connected with a cross-link 1506. Accordingly, a total of three storage devices can be mutually connected.

Figure 22:
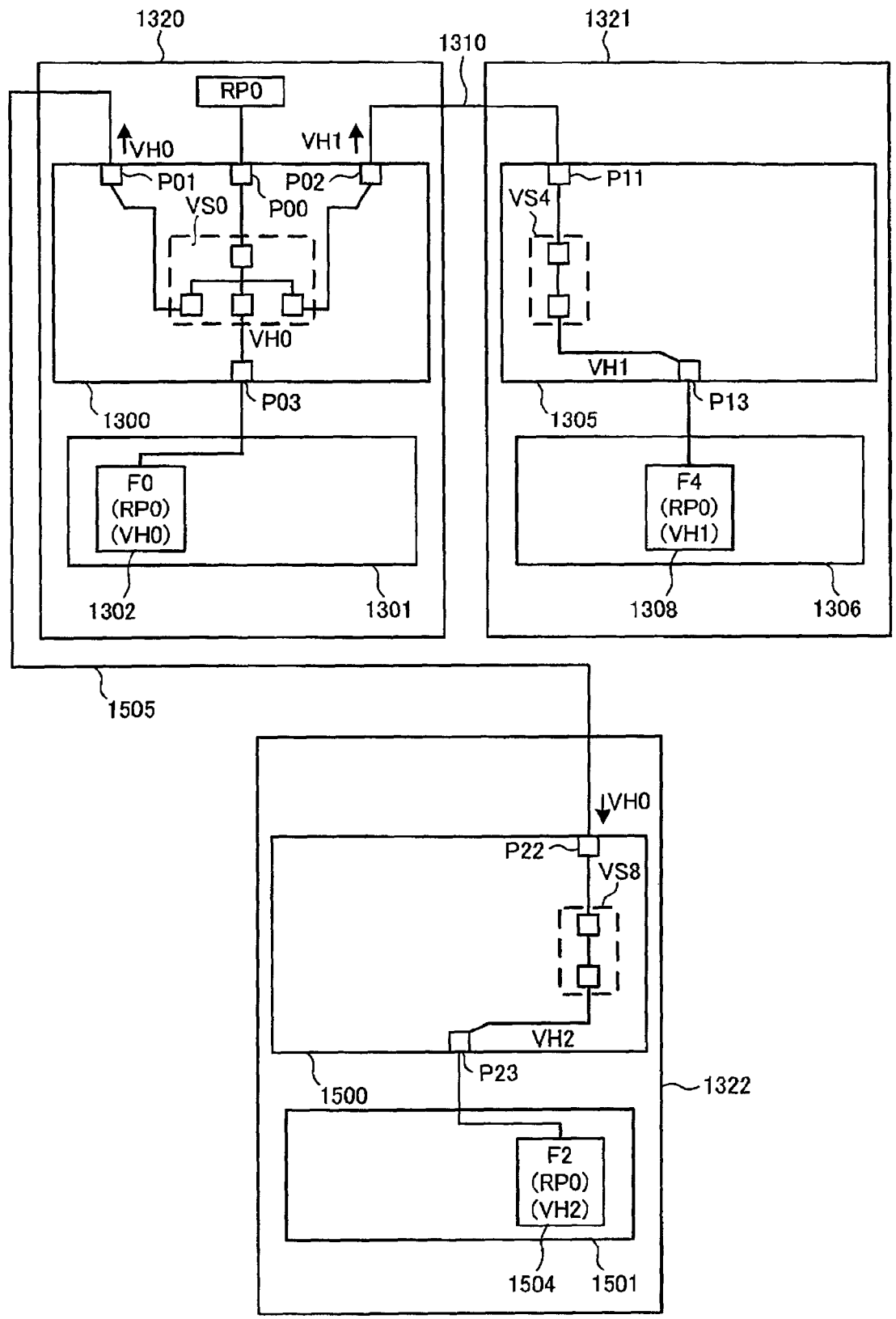
FIG. 22 is a diagram showing a virtual hierarchy (VH (RP0)) of the storage device in accordance with the second embodiment.

FIG. 22 is a diagram showing only the components related to the virtual hierarchy VH(RP0) having the RP0 as the root port, in the storage device in FIG. 21. Described below is a path in which the RP0 accesses the PCI function in each endpoint (EPs 1301, 1306, and 1501). The path in which the RP0 accesses the PCI function 1302 in the EP 1301 and the path in which the RP0 accesses the PCI function 1308 in the EP 1306 are the same as those in FIG. 20. The RP0 accesses a PCI function 1504 in the EP 1501 instead of accessing the PCI function 1309 in the EP1306.

One of the downstream bridges of the VS0 in the switch 1300 is connected to the P01 of the switch 1300. In the VH(RP0), the P01 of the switch 1300 functions as a downstream port, and the P22 of a switch 1500 functions as an upstream port, and they are connected with the link 1505. In the VH(RP0), data is transferred using the VH0 on the link 1505.

In the storage device 1322, an upstream bridge of a virtual switch VS8 in the switch 1500 is connected to the P22 so that data can be transferred using the VH0 on the link 1505. In addition, a single downstream bridge of the VS8 is connected to a P23 of the switch 1500. The port P23 is connected to the EP1501. In the VH(RP0), when the EP 1501 is to be accessed via the VS0, cross-link 1505, and VS8, the PCI function 1504 in the EP 1501 is accessed using the VH2 on the link that connects the P23 and EP1501.

Accordingly, the RP0 accesses the PCI function F0_1302 in the EP 1301, the PCI function F4_1308 in the EP 1306, and the PCI function F2_1504 in the EP 1501. Likewise, the RP1, in the VH(RP1), accesses the PCI function F2_1304 in the EP 1301, the PCI function F3_1307 in the EP 1306, and the PCI function F1_1503 in the EP 1501. The RP2 can, in the VH(RP2), access the PCI function F1_1303 in the EP 1301, the PCI function F5_1309 in the EP 1306, and the PCI function F0_1502 in the EP 1501.

(3) Third Embodiment

Figure 23:
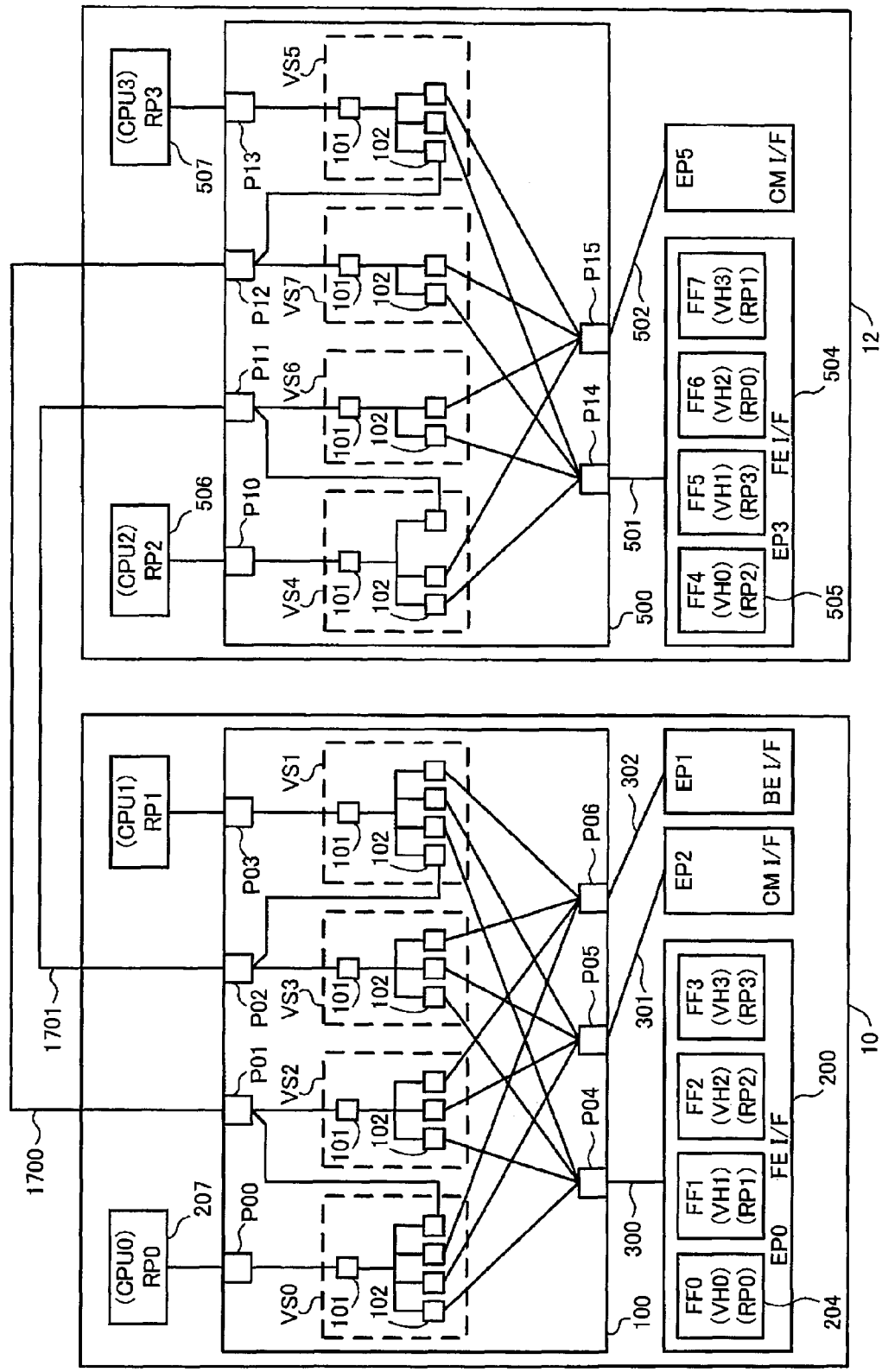
FIG. 23 is a diagram showing an exemplary schematic configuration of the expanded storage device (a configuration with two storage devices) in accordance with the third embodiment.

Hereinafter, a storage device in accordance with the third embodiment will be described with reference to FIG. 23. FIG. 23 is a diagram showing a configuration with a total of two storage devices which is obtained by mutually connecting the storage device 10 and a storage device 12 with different configurations.

In comparison with the storage device 10, the storage device 12 includes a less number of connectable EPs. Although the storage device 12 has an EP3 corresponding to the FE I/F and an EP5 corresponding to the CM I/F, it does not have an EP corresponding to the BE I/F, and such BE I/F cannot be added later. Therefore, the number of the downstream ports of a switch 500 and the number of the downstream bridges of each virtual switch (VS4 to VS7) are less than those of the switch 100 in the storage device 10 by one. The other configurations of the storage device 12 are the same as those of the aforementioned storage devices 10 and 11.

As in the first embodiment, in this embodiment, the two storage devices are connected by connecting the port P01 of the storage device 10 and a port P12 of the storage device 12 with a cross-link 1700 and connecting the port P02 of the storage device 10 and a port P11 of the storage device 12 with a cross-link 1701, whereby the size of the storage device can be expanded. After the size expansion, each processor in the storage device can access each EP.

As described above, it is obvious that the configuration of the storage device to be added need not have the totally same configuration as the storage device as a connection target, and thus, even a storage device with a different configuration can be added.

(4) Fourth Embodiment

Figure 24:
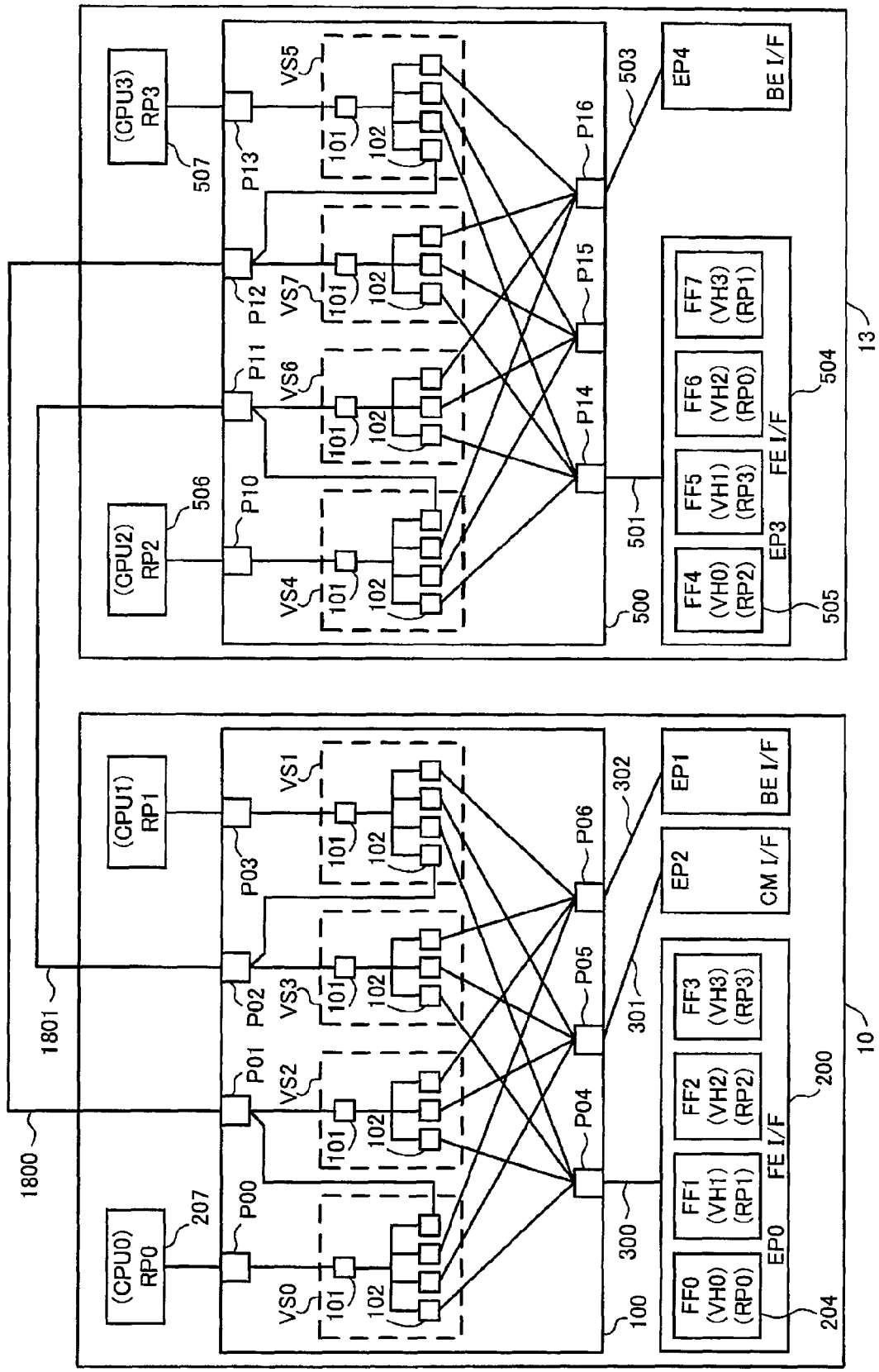
FIG. 24 is a diagram showing an exemplary schematic configuration of the expanded storage device (a configuration with two storage devices) in accordance with the fourth embodiment.

A storage device in accordance with the fourth embodiment will be described with reference to FIG. 24. FIG. 24 is a diagram showing a configuration with a total of two storage devices which is obtained by mutually connecting the storage device 10 and a storage device 13 with different configurations.

In comparison with the storage device 10, the storage device 13 includes a less number of connected EPs. Although the storage device 13 has an EP3 corresponding to the FE I/F and an EP4 corresponding to the BE I/F, it does not have an EP corresponding to the CM I/F. However, unlike with the storage device 12, the storage device 13 is configured such that the CM I/F can be added later. Therefore, the number of the downstream ports of a switch 500 and the number of the downstream bridges of each virtual switch (VS4 to VS7) are the same as those of the switch 100 in the storage device 10. The configuration of the storage device 13 only differs from those of the aforementioned storage devices 10 and 11 in that the CM I/F is not connected.

As in the first embodiment, in this embodiment, the two storage devices are connected by connecting the port P01 of the storage device 10 and a port P12 of the storage device 13 with a cross-link 1800 and connecting the port P02 of the storage device 10 and a port P11 of the storage device 13 with a cross-link 1801, whereby the size of the storage device can be expanded. After the size expansion, each processor in the storage device can access each EP.

(5) Fifth Embodiment

Figure 25:
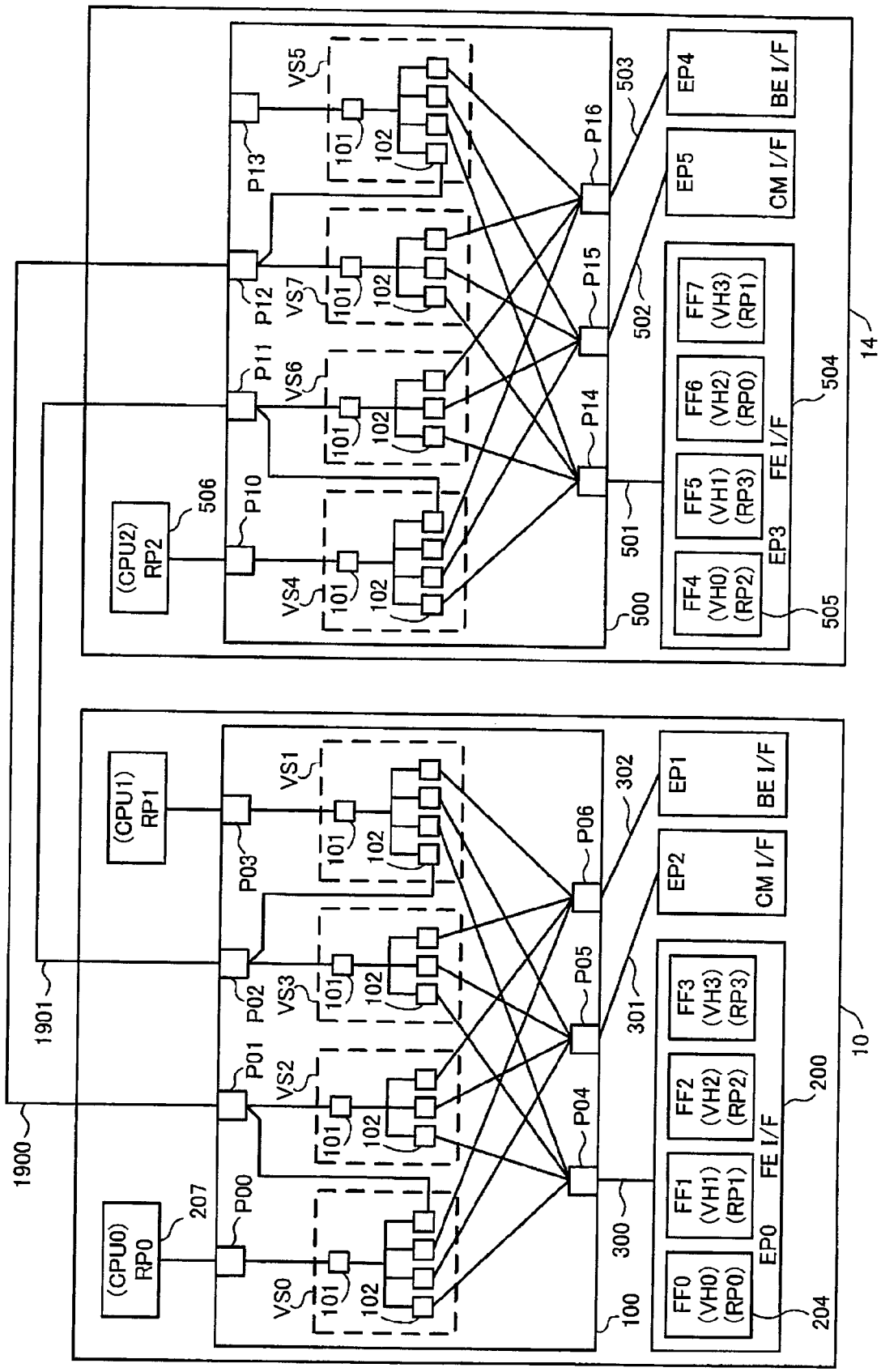
FIG. 25 is a diagram showing an exemplary schematic configuration of the expanded storage device (a configuration with two storage devices) in accordance with the fifth embodiment.

A storage device in accordance with the fifth embodiment will be described with reference to FIG. 25. FIG. 25 is a diagram showing a configuration with a total of two storage devices which is obtained by mutually connecting the storage device 10 and a storage device 14 with different configurations. In comparison with the storage device 10, the storage device 14 includes a less number of connected RPs. That is, although the storage device 14 has a single RP 506 (RP2), it does not have an RP corresponding to the RP3. However, the storage device 14 is configured such that the RP3 can be added later to a port P13. Therefore, the configuration of the storage device 14 only differs from those of the storage devices 10 and 11 in that the RP3 is not connected.

As in the first embodiment, in this embodiment, the two storage devices are connected by connecting the port P01 of the storage device 10 and a port P12 of the storage device 14 with a cross-link 1900 and connecting the port P02 of the storage device 10 and a port P11 of the storage device 14 with a cross-link 1901, whereby the size of the storage device can be expanded. After the size expansion, each processor in the storage device can access each EP. However, when such two storage devices are connected, one of the PCI functions in each EP cannot be used until the RP3 is added to the storage device 14.

(6) Sixth Embodiment

A storage device in accordance with the sixth embodiment will be described with reference to FIGS. 26 and 27. The sixth embodiment relates to a generalized configuration of a storage device that is a connection unit.

Figures 26, 27:
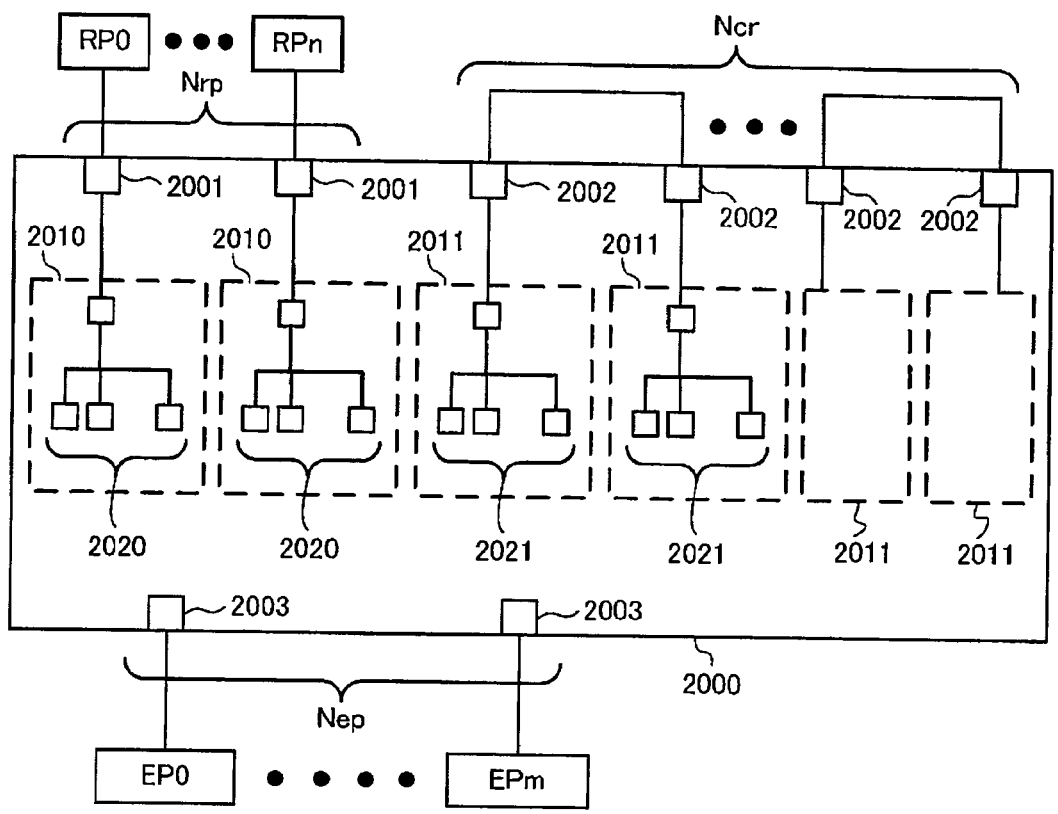
FIG. 26 is a diagram showing an exemplary internal configuration (generalized configuration) of a switch in the storage device in accordance with the sixth embodiment.
FIG. 27 is a diagram showing the number (generalized number) of switch components in the storage device in accordance with the sixth embodiment.

FIG. 26 is a diagram for describing the configuration of a switch used in the internal network of a storage controller that is necessary to connect a maximum of N storage devices. FIG. 27 is a table that collectively indicates the number of switch components.

It is assumed that a storage device that is an expansion unit includes Nrp root ports (Nrp is an integer not less than 1) and Nep endpoints (Nep is an integer not less than 1). As each EP is accessed from N×Nrp RPs included in the N storage devices (N is an integer not less than 2) connected together, each EP has PCI functions corresponding to N×Nrp VHs.

In a switch 2000 of each storage device that is an expansion unit, a total of Nrp root ports are connected to RP-connection switch ports (2001 in FIG. 26) in each storage device that is an expansion unit. In that case, the number of RP-connection ports that the switch 2000 should have is Nrp (2101 in FIG. 27).

In addition, in the switch 2000 of each storage device that is an expansion unit, a total of Nep EPs are connected to EP-connection switch ports (2003 in FIG. 26). In that case, the number of EP-connection ports that the switch 2000 should have is Nep (2102 in FIG. 27).

In addition, it is assumed that the number of cross-link ports (2002 in FIG. 26) that are necessary when a maximum of N storage devices are connected is Ncr (Ncr is an even integer not less than 2). Ncr is given by the following formula (2103 in FIG. 27).

$$Ncr=(N-1)\times Nrp \quad \text{(Formula 1)}$$

It should be noted that as a storage device that is an expansion unit can operate alone, the number of cross-link-connection ports Ncr is set to an even number. That is, when Npr is an even number, N storage devices (N is two or more) can be mutually connected. Meanwhile, when Npr is an odd number, N should also be set to an odd number.

The switch 2000 has virtual switches (2010 in FIG. 26) whose upstream bridges are connected to the RP-connection switch ports, and virtual switches (2011 in FIG. 26) whose upstream bridges are connected to the cross-link-connection switch ports. The number of the virtual switches for connection to the RP is Nrp (2104 in FIG. 27) which is equal to the number of RP-connection switch ports. The number of virtual switches for connection to the cross-link is Ncr (2105 in FIG. 27) which is equal to the number of the cross-link-connection switch ports.

The number of the downstream bridges (2020 in FIG. 26) of each virtual switch for connection to the RP is given by the sum of Nep and Ncr/2 (2106 in FIG. 27).

The number of the downstream bridges (2021 in FIG. 26) of each virtual switch for connection to the cross-link is Nep (2107 in FIG. 27).

With the switch configuration of FIGS. 26 and 27 according to this embodiment, it is possible to mutually connect a maximum of N storage devices whose quantity (Nrp and Nep) of the switch components can be set freely.

It should be noted that such a generalized expression can also be applied to the configuration with a redundant network (see FIG. 33) described below.

(7) Seventh Embodiment

A storage device in accordance with the seventh embodiment will be described with reference to FIGS. 28 to 32. This embodiment relates to a connection configuration of a scalable storage device to which a maximum of three additional storage devices can be connected by adding a storage device one by one.

<Configuration of Each Storage Device>

Figure 28:
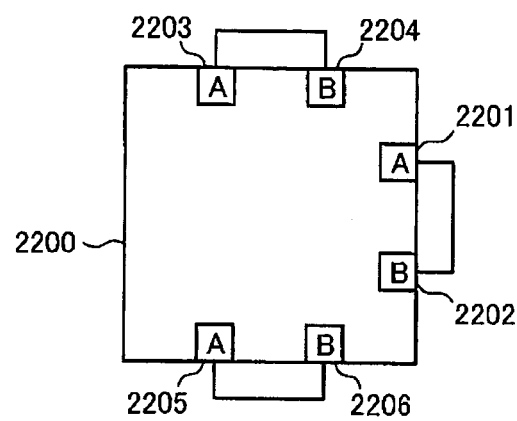
FIG. 28 is a diagram showing the unit of the initial operation of the storage device (a storage device to be expanded) in accordance with the seventh embodiment.

FIG. 28 shows the configuration of a single storage device. A storage device 2200 that is an expansion unit includes two root ports as with the storage device in FIG. 4. The storage device 2200 has six ports (2201 to 2206) for connecting three additional storage devices. Such add-on ports of the storage device are divided into two types depending on the way in which the VH0 is assigned. Specifically, an add-on port to which the VH0 is assigned in a downstream direction is referred to as an A-type port, whereas an add-on port to which the VH0 is assigned in an upstream direction is referred to as a B-type port. The ports 2201, 2203, and 2205 are A-type ports and the ports 2202, 2204, and 2206 are B-type ports. An each pair of the A-type port and B-type port is connected with a cross-link.

<Expanded Storage Device: Configuration with Two Storage Devices>

Figure 29:
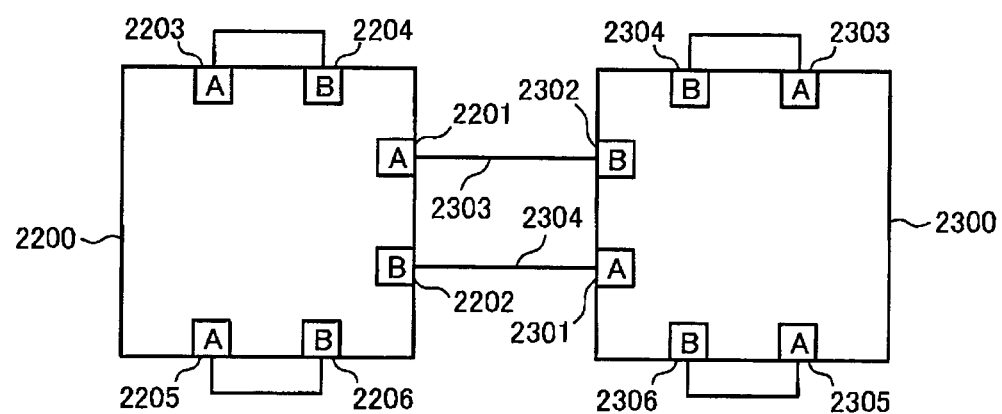
FIG. 29 is a diagram showing the configuration of the expanded storage device (a configuration with two storage devices) in accordance with the seventh embodiment.

FIG. 29 is a diagram showing a configuration with a total of two storage devices which is obtained by adding a storage device 2300 to the storage device 2200.

First, the cross-link of the ports 2201 and 2202 of the storage device 2200 are removed. Next, the port 2201 (A-type) of the storage device 2200 and a port 2302 (B-type) of the storage device 2300 are connected with a cross-link 2303. Further, the port 2202 (B-type) of the storage device 2200 and a port 2301 (A-type) of the storage device 2300 are connected with a cross-link 2304. The other ports (2303 to 2306) of the storage device 2300 are cross-link connected within the storage device 2300. Accordingly, a total of two storage devices can be mutually connected.

<Expanded Storage Device: Configuration with Three Storage Devices>

Figure 30:
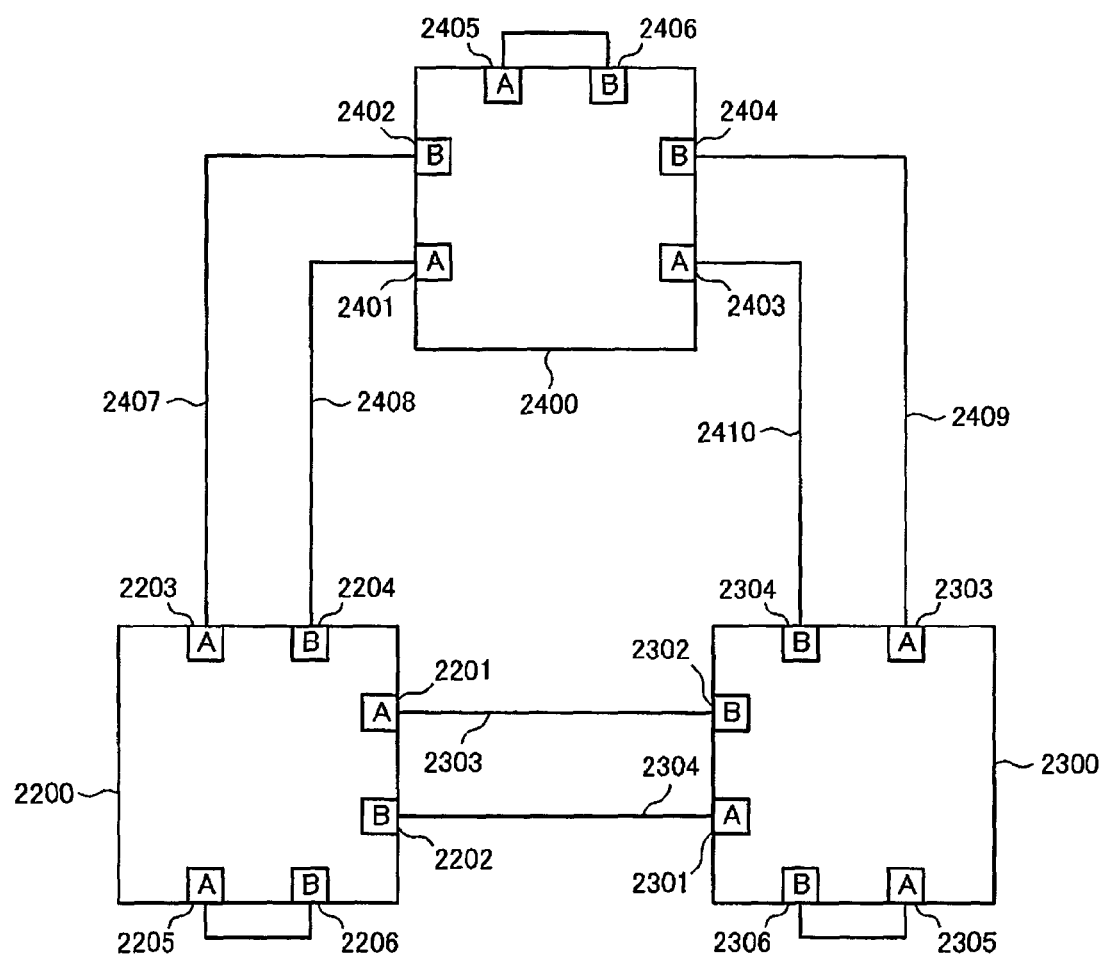
FIG. 30 is a diagram showing the configuration of the expanded storage device (a configuration with three storage devices) in accordance with the seventh embodiment.

FIG. 30 is a diagram showing a configuration with a total of three storage devices which is obtained by adding a storage device 2400 to the storage device in FIG. 29.

First, the cross-link of the ports 2203 and 2204 of the storage device 2200 is removed. Next, the port 2203 (A-type) of the storage device 2200 and a port 2402 (B-type) of the storage device 2400 are connected with a cross-link 2407. Further, the port 2204 (B-type) of the storage device 2200 and a port 2401 (A-type) of the storage device 2400 are connected with a cross-link 2408.

In addition, the cross-link of the ports 2303 and 2304 of the storage device 2300 is removed. Next, the port 2303 (A-type) of the storage device 2300 and a port 2404 (B-type) of the storage device 2400 are connected with a cross-link 2409. Further, the port 2304 (B-type) of the storage device 2300 and a port 2403 (A-type) of the storage device 2400 are connected with a cross-link 2410. The other ports (2405 and 2406) of the storage device 2400 are cross-link connected within the storage device 2400. Accordingly, a total of three storage devices can be mutually connected.

<Expanded Storage Device: Configuration with Four Storage Devices>

Figure 31:
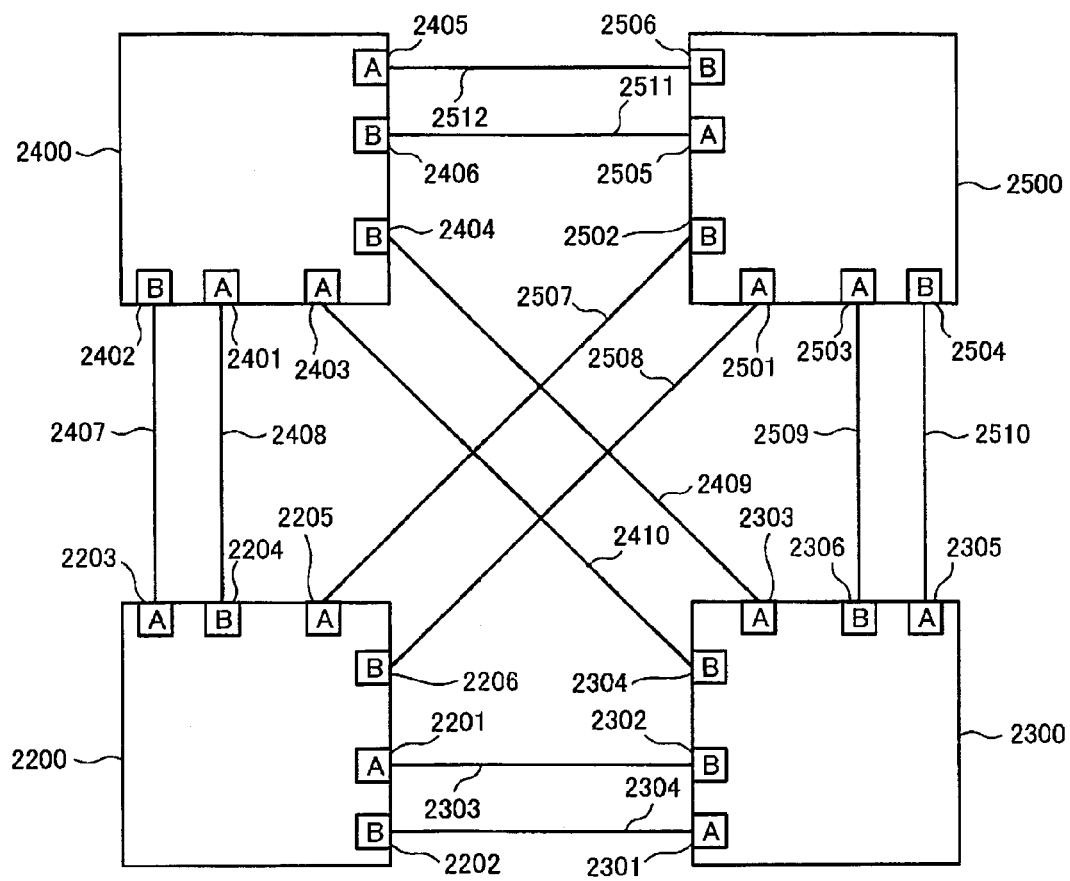
FIG. 31 is a diagram showing the configuration of the expanded storage device (a configuration with four storage devices) in accordance with the seventh embodiment.

FIG. 31 is a diagram showing a configuration with a total of four storage devices which is obtained by adding a storage device 2500 to the storage device in FIG. 30.

First, the cross-link of the ports 2205 and 2206 of the storage device 2200 is removed. Next, the port 2205 (A-type) of the storage device 2200 and a port 2502 (B-type) of the storage device 2500 are connected with a cross-link 2507. Further, the port 2206 (B-type) of the storage device 2200 and a port 2501 (A-type) of the storage device 2500 are connected with a cross-link 2508.

In addition, the cross-link of the ports 2305 and 2306 of the storage device 2300 is removed. Next, the port 2305 (A-type) of the storage device 2300 and a port 2504 (B-type) of the storage device 2500 are connected with a cross-link 2510. Further, the port 2306 (B-type) of the storage device 2300 and a port 2503 (A-type) of the storage device 2500 are connected with a cross-link 2509.

Further, the cross-link of the ports 2405 and 2406 of the storage device 2400 is removed. Next, the port 2405 (A-type) of the storage device 2400 and a port 2506 (B-type) of the storage device 2500 are connected with a cross-link 2512. Furthermore, the port 2406 (B-type) of the storage device 2400 and a port 2505 (A-type) of the storage device 2500 are connected with a cross-link 2511. Accordingly, a total of four storage devices can be mutually connected.

<Expanded Storage Device: Another Configuration with Three Storage Devices>

Figure 32:
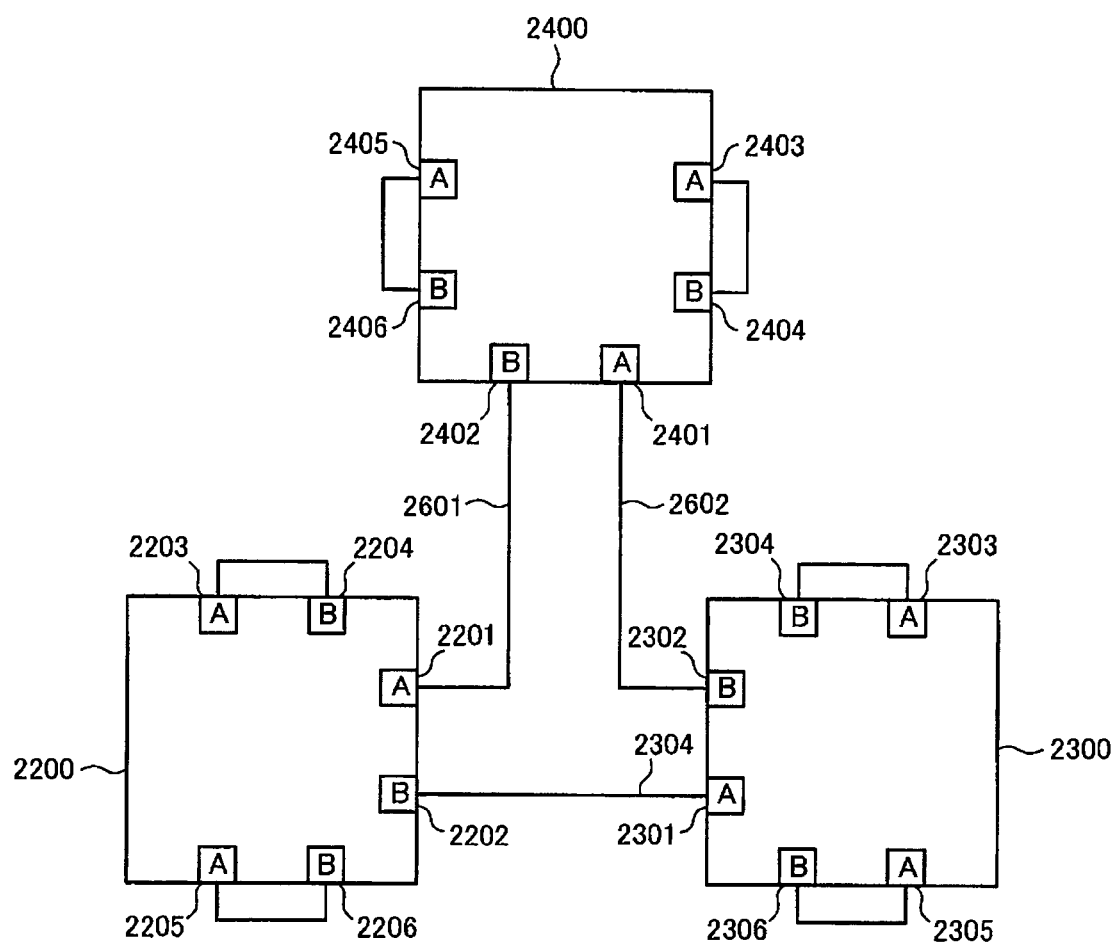
FIG. 32 is a diagram showing the configuration of the expanded storage device (a configuration with three storage devices) in accordance with the seventh embodiment.

FIG. 32 shows another connection configuration of storage devices in which a total of three storage devices are mutually connected. As with FIG. 30, FIG. 32 is a diagram showing a configuration with a total of three storage devices which is obtained by connecting the storage device 2400 to the storage device in FIG. 31.

First, in FIG. 29, the cross-link 2303 that connects the port 2201 of the storage device 2200 and the port 2302 of the storage device 2300 is removed. Next, the port 2201 (A-type) of the storage device 2200 and the port 2402 (B-type) of the storage device 2400 are connected with a cross-link 2601. Further, the port 2302 (B-type) of the storage device 2300 and the port 2401 (A-type) of the storage device 2400 are connected with a cross-link 2602. Accordingly, a total of three storage devices can be mutually connected.

As described above, according to this embodiment, the size of a storage device can be expanded by connecting thereto a maximum of three additional storage devices. It should be noted that the maximum number of the connectable storage devices can be arbitrarily set by changing the number of the switch internal components in accordance with Embodiment 6.

(8) Eighth Embodiment

A storage device in accordance with the eighth embodiment will be described with reference to FIGS. 33 to 37.

<Configuration of a Storage Device that is an Expansion Unit>

Figure 33:
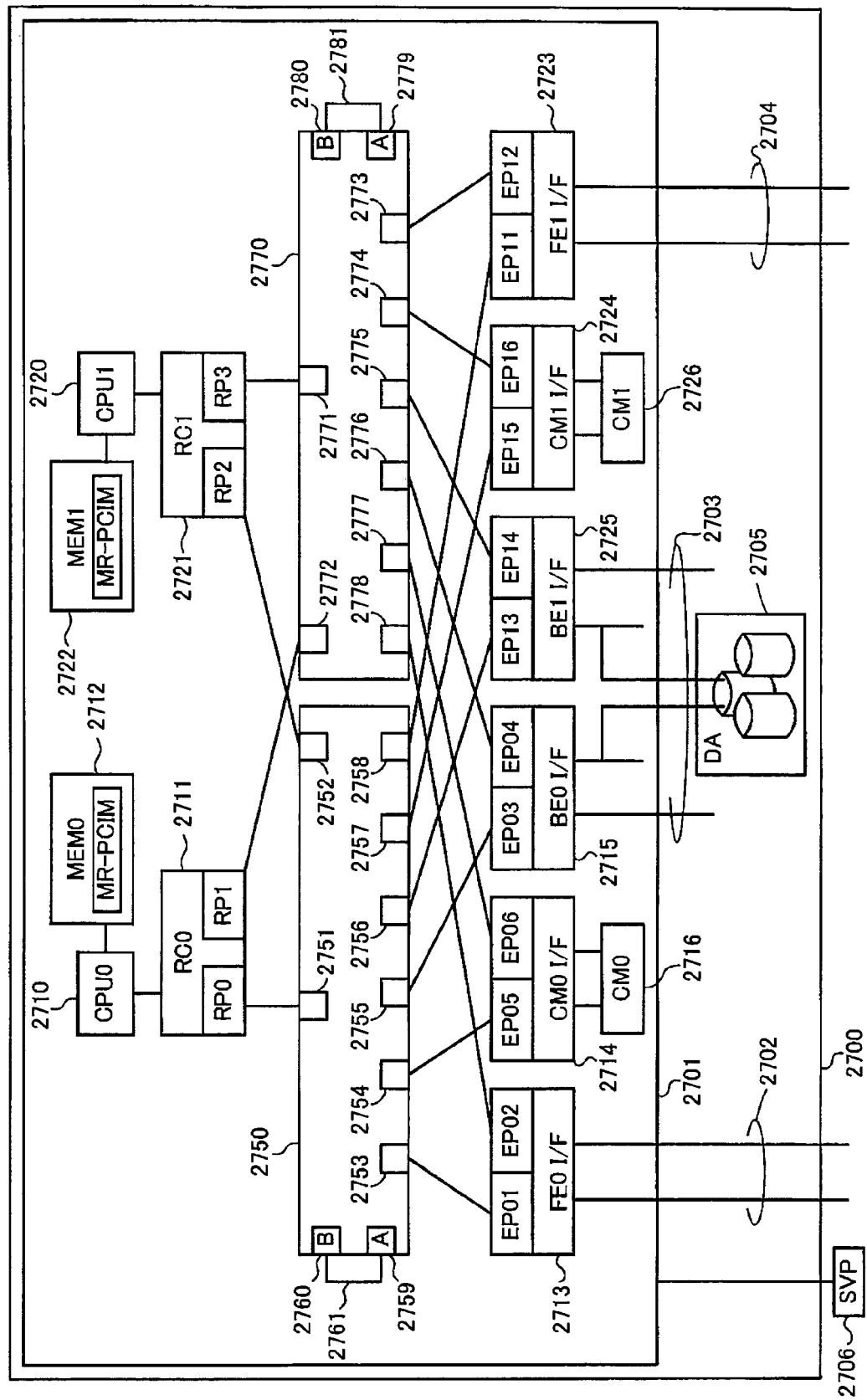
FIG. 33 is a diagram showing the unit of the initial operation of the storage device (a configuration with a redundant network) in accordance with the eighth embodiment.

FIG. 33 is a diagram showing a storage device 2700 that is an expansion unit in accordance with the eighth embodiment. The storage device 2700 is characterized in that its storage controller has redundant components. The storage device 2700 has a storage controller 2701 and disk array 2705, and an administrative terminal SVP 2706 for an administrator is connected thereto.

The storage controller 2701 has a processor (CPU0) 2710; processor (CPU1) 2720; memory 2712 and 2722; and RCs 2711 and 2721. The RC 2711 has two RPs (RP0 and RP1), and the RC 2721 has two RPs (RP2 and RP3). Further, the storage controller 2701 has switches 2750 and 2770, various interface devices 2713 to 2715, and various interface devices 2723 to 2725. In this embodiment, a plurality of RPs is provided in each RC.

The switches 2750 and 2770 are MRA switches. The switch 2750 has RP-connection ports 2751 and 2752, EP-connection ports 2753 to 2758, and cross-link-connection ports 2759 and 2760. Likewise, the switch 2770 has RP-connection ports 2771 and 2772, EP-connection ports 2773 to 2778, and cross-link-connection ports 2779 and 2780. In this embodiment, the RP1 of the RC0_2711 is connected to the RP-connection port 2772 of the switch 2770, and the RP2 of the RC1_2721 is connected to the RP-connection port 2752 of the switch 2750, so that a cross-coupled configuration between the networks is provided. That is, the RP0 and RP1 are connected to different networks, and the RP2 and RP3 are also connected to different networks.

In this embodiment, as with the storage device 2200 in accordance with the seventh embodiment, an add-on port to which the VH0 is assigned in a downstream direction is referred to as an A-type port, whereas an add-on port to which the VH0 is assigned in an upstream direction is referred to as a B-type port. The ports 2759 and 2779 are A-type ports and the ports 2760 and 2780 are B-type ports. An each pair of the A-type port and B-type port is connected with a cross-link 2761 or 2781.

The FE I/F 2713 has two EPs (EP01 and EP02), the CM I/F 2714 has two EPs (EP0S and EP06), and the BE I/F 2715 has two EPs (EP03 and EP04). In addition, the FE I/F 2723 has two EPs (EP11 and EP12), the CM I/F 2724 has two EPs (EP15 and EP16), and the BE I/F 2725 has two EPs (EP13 and EP14).

The FE I/F 2713 is connected to a host system (not shown) via a channel 2702. The FE I/F 2723 is also connected to a host system (not shown) via a channel 2704. The BE I/Fs 2715 and 2725 are connected to the disk array 2705 via a channel 2703. The CM I/F 2714 is connected to CM 2716. The CM I/F 2724 is connected to CM 2726.

The internal network of the storage controller 2701 includes two MR-IOV networks. One of the networks is a network that mutually connects the RP0, RP2, switch 2750, EP01, EP03, EP0S, EP11, EP13, and EP15. The other network is a network that mutually connects the RP1, RP3, switch 2770, EP02, EP04, EP06, EP12, EP14, and EP16. As the two MR-IOV networks are independent networks, they are managed by different MR-PCIMs. That is, the former network is managed by an MR-PCIM executed by the processor 2710, and the latter network is managed by an MR-PCIM executed by the processor 2720.

Figure 34:
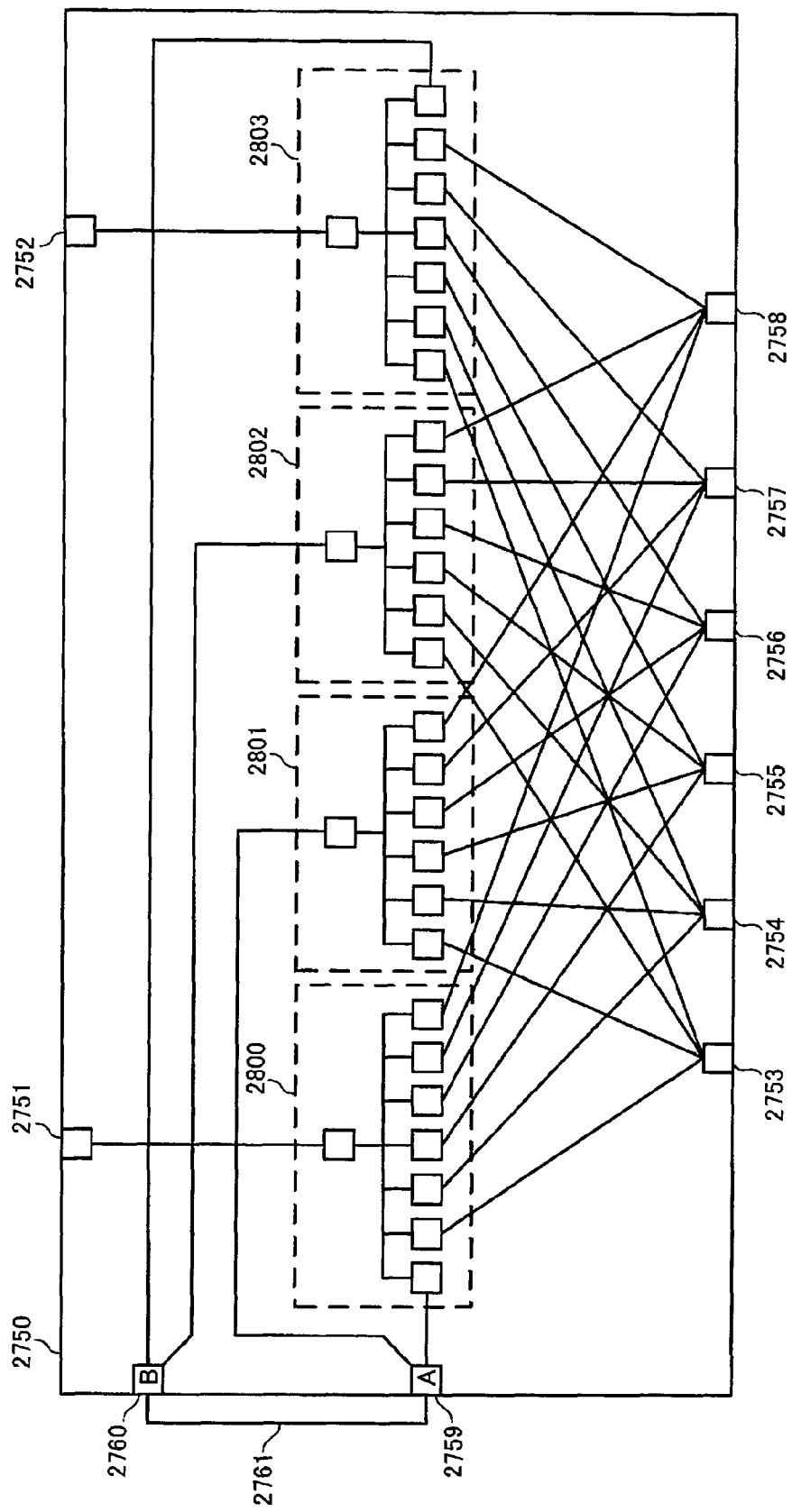
FIG. 34 is a diagram showing an exemplary internal configuration of a switch in the storage device in accordance with the eighth embodiment.

FIG. 34 is a diagram showing the internal configuration of the switch 2750. The switch 2750 differs from the switch 100 in FIG. 4 in the number of connectable EPs. The switch 2750 has virtual switches 2800 and 2803 whose upstream bridges are connected to the RP-connection ports 2751 and 2752, respectively, and virtual switches 2801 and 2802 whose upstream bridges are connected to the cross-link-connection ports 2759 and 2760, respectively. Each of the virtual switches 2801 and 2802 has the same number of downstream bridges (6) as the number of EPs connected thereto. Each of the virtual switches 2800 and 2803 has downstream bridges (6+1) for connection to the EPs and to the cross-link-connection port. The switch 2770 has a similar configuration to the switch 2750.

<Configuration of the Expanded Storage Device: Configuration with Two Storage Devices>

Figure 35:
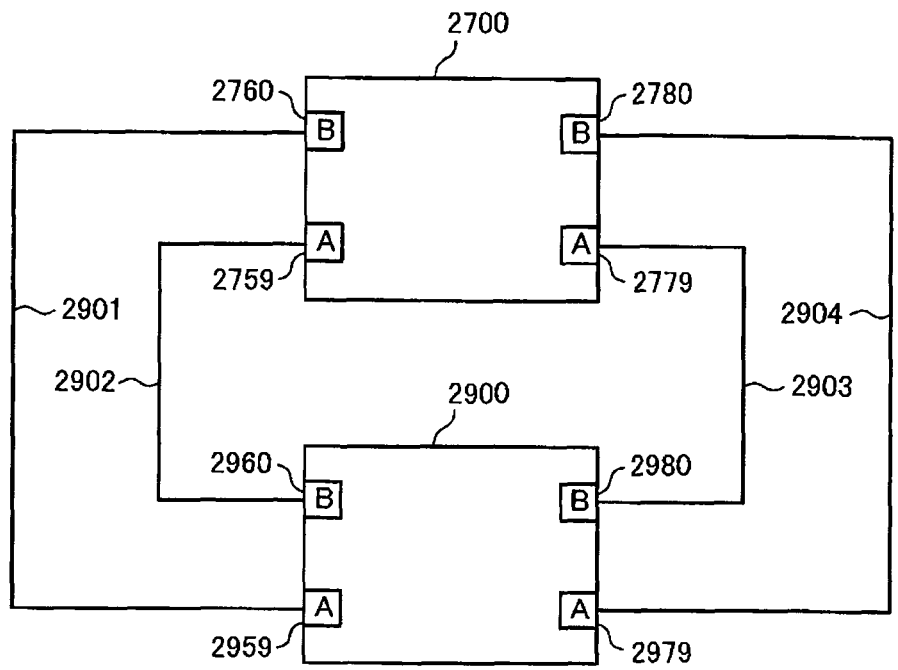
FIG. 35 is a diagram showing an exemplary configuration of the expanded storage device (a configuration with two storage devices) in accordance with the eighth embodiment.

FIG. 35 is a diagram showing a configuration with a total of two storage devices which is obtained by adding to the storage device 2700 shown in FIG. 33 another storage device 2900 with the same configuration.

The storage device 2900 has ports 2959, 2960, 2979, and 2980 for connection to the storage device 2700. When the storage device 2900 operates alone, the ports 2959 and 2960 are cross-link connected and also the ports 2979 and 2980 are cross-link connected. The ports 2959 and 2979 of the storage device 2900 are A-type ports, and the ports 2960 and 2980 thereof are B-type ports.

First, the cross-link 2761 between the ports 2759 and 2760 of the storage device 2700 and the cross-link 2781 between the ports 2779 and 2780 thereof are removed. Next, the port 2759 (A-type) of the storage device 2700 and the port 2960 (B-type) of the storage device 2900 are connected with a cross-link 2902. Further, the port 2760 (B-type) of the storage device 2700 and the port 2959 (A-type) of the storage device 2900 are connected with a cross-link 2901. Next, the port 2779 (A-type) of the storage device 2700 and the port 2980 (B-type) of the storage device 2900 are connected with a cross-link 2903. Further, the port 2780 (B-type) of the storage device 2700 and the port 2979 (A-type) of the storage device 2900 are connected with a cross-link 2904. Accordingly, a total of two storage devices can be mutually connected.

Figure 36:
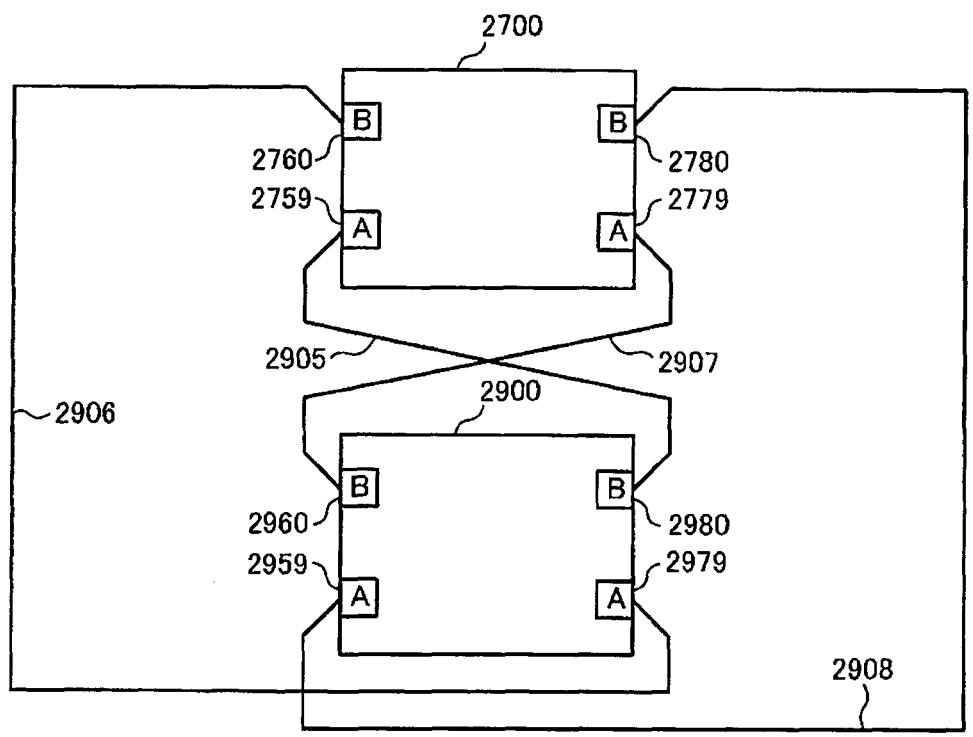
FIG. 36 is a diagram showing an exemplary configuration of the expanded storage device (a configuration with two storage devices) in accordance with the eighth embodiment.

FIG. 36 is a diagram showing another connection configuration of the storage device 2700 and storage device 2900. The port 2759 (A-type) of the storage device 2700 and the port 2980 (B-type) of the storage device 2900 are connected with a cross-link 2905. Further, the port 2760 (B-type) of the storage device 2700 and the port 2979 (A-type) of the storage device 2900 are connected with a cross-link 2906. Next, the port 2779 (A-type) of the storage device 2700 and the port 2960 (B-type) of the storage device 2900 are connected with a cross-link 2907. Further, the port 2780 (B-type) of the storage device 2700 and the port 2959 (A-type) of the storage device 2900 are connected with a cross-link 2908. With the aforementioned connection configuration, a total of two storage devices can be mutually connected.

<Configuration of the Expanded Storage Device: Configuration with Three Storage Devices>

Figure 37:
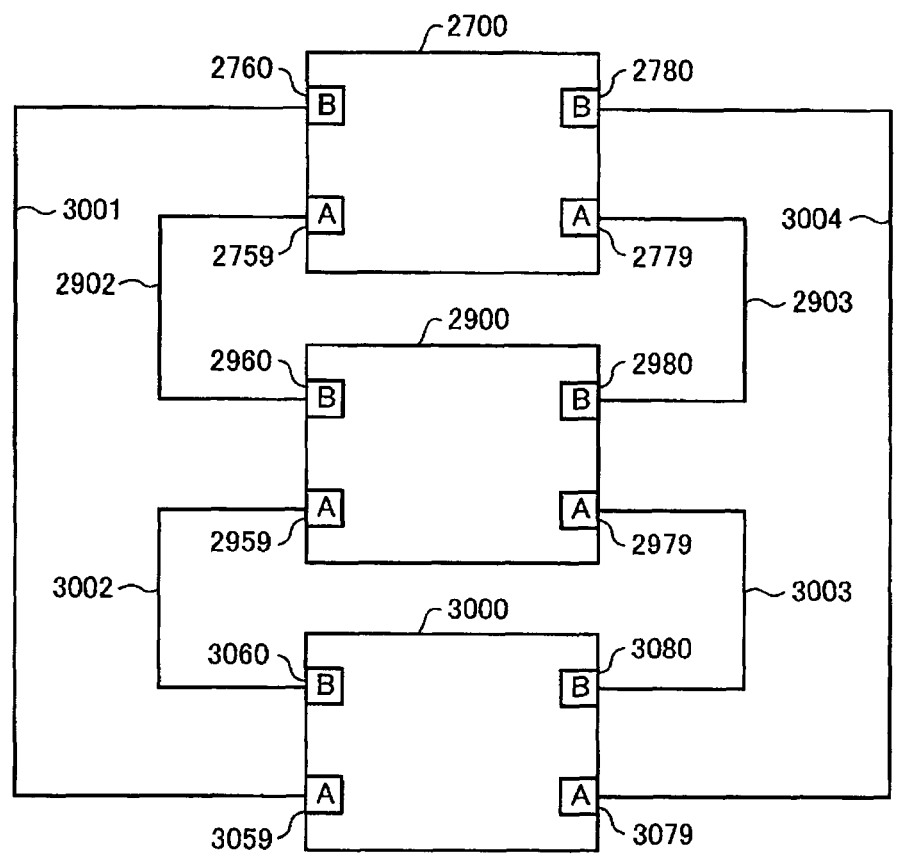
FIG. 37 is a diagram showing an exemplary configuration of the expanded storage device (a configuration with three storage devices) in accordance with the eighth embodiment.

FIG. 37 is a diagram showing a configuration with a total of three storage devices which is obtained by further adding a storage device 3000 to the storage device in FIG. 35.

The storage device 3000 has ports 3059, 3060, 3079, and 3080 for connection to the storage device 2700 or storage device 2900. When the storage device 3000 operates alone, the ports 3059 and 3060 are cross-link connected and also the ports 3079 and 3080 are cross-link connected. The ports 3059 and 3079 of the storage device 3000 are A-type ports, and the ports 3060 and 3080 thereof are B-type ports.

First, in FIG. 35, the cross-link 2901 that connects the port 2760 of the storage device 2700 and the port 2959 of the storage device 2900 and the cross-link 2904 that connects the port 2780 of the storage device 2700 and the port 2979 of the storage device 2900 are removed. Next, the port 2959 (A-type) of the storage device 2900 and the port 3060 (B-type) of the storage device 3000 are connected with a cross-link 3002. Further, the port 2760 (B-type) of the storage device 2700 and the port 3059 (A-type) of the storage device 3000 are connected with a cross-link 3001. In addition, the port 2979 (A-type) of the storage device 2900 and the port 3080 (B-type) of the storage device 3000 are connected with a cross-link 3003. Further, the port 2780 (B-type) of the storage device 2700 and the port 3079 (A-type) of the storage device 3000 are connected with a cross-link 3004. Accordingly, a total of three storage devices can be mutually connected.

As described above, according to this embodiment, the size of a storage device can be expanded by connecting thereto a maximum of two additional storage devices each with a redundant internal configuration. It should be noted that the maximum number of the connectable storage devices can be arbitrarily set by changing the number of the switch internal components in accordance with Embodiment 6.

(9) Ninth Embodiment

A storage device in accordance with the ninth embodiment will be described with reference to FIGS. 38 to 40.

<Configuration of the Expanded Storage Device: Configuration with Two Storage Devices>

Figure 38:
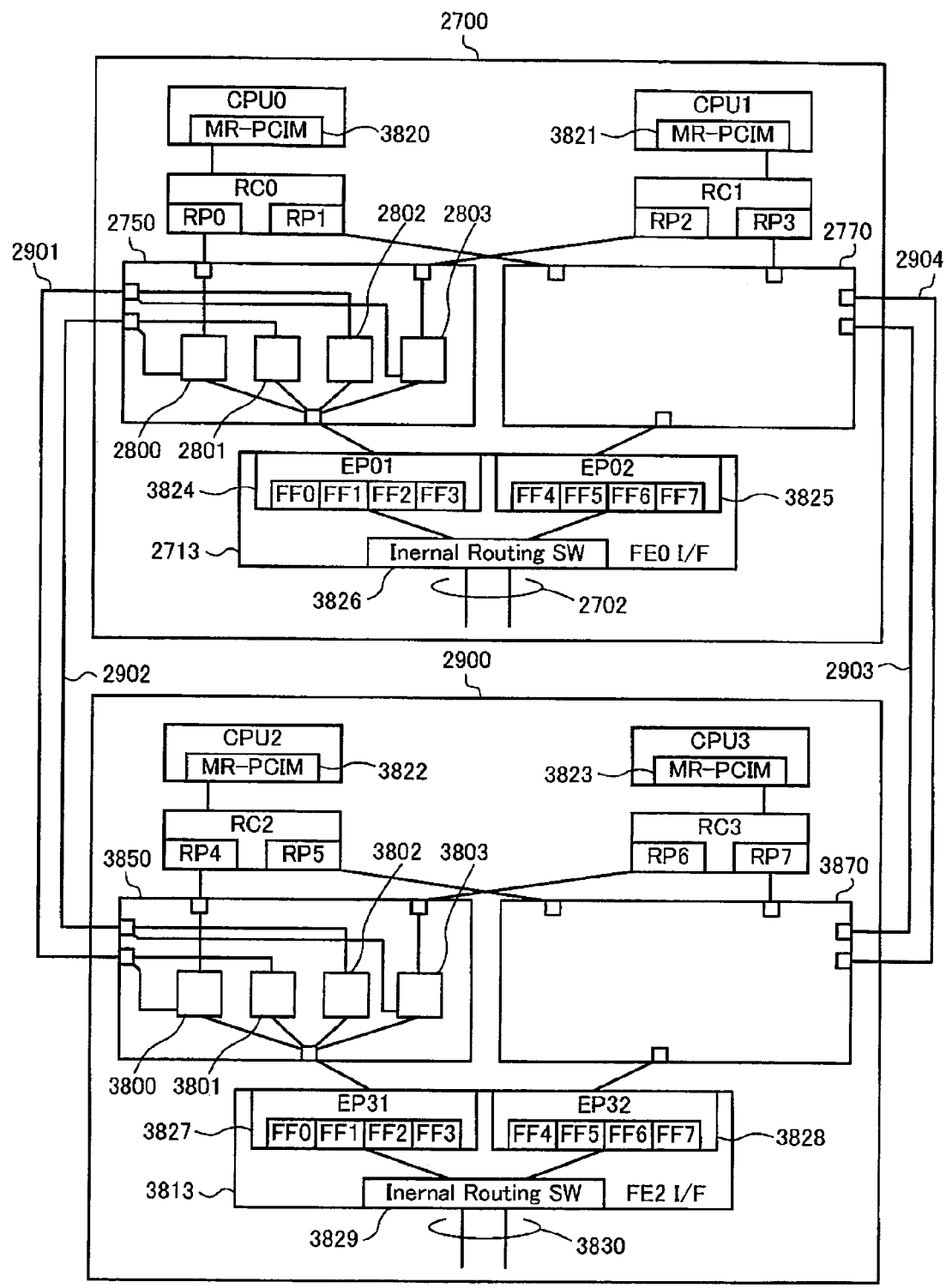
FIG. 38 is a diagram showing the configuration of the storage device (an internal configuration when two storage devices each with a redundant network are connected) in accordance with the ninth embodiment.

FIG. 38 is a diagram showing a configuration with a total of two storage devices which is obtained by adding the storage device 2900 to the storage device 2700 as in FIG. 35. In FIG. 38, FE interface devices are shown representatively among the FE, CM, BE interfaces, and the other CM and BE interface devices are omitted. However, such omitted interface devices have a similar configuration to the FE interface device.

An FE (Front-End) interface device 2713 has an EP01 (3824) that is accessible from an RP0, RP2, RP4, and RP6, and an EP02 (3825) that is accessible from an RP1, RP3, RP5, and RP7. The EP01 has PCI functions FF0 to FF3. The EP02 has PCI functions FF4 to FF7. An internal switch 3826, with a protocol IC (not shown), switches a data transfer path of data transmitted/received over a channel 2702, between the protocol IC and PCI functions (FF0 to FF7).

The FE interface device 3813 has an EP31 (3827) that is accessible from the RP0, RP2, RP4, and RP6, and an EP32 (3828) that is accessible from the RP1, RP3, RP5, and RP7. The EP31 has PCI functions FF0 to FF3. The EP32 has PCI functions FF4 to FF7. An internal switch 3829, with a protocol IC (not shown), switches a data transfer path of data transmitted/received over a channel 3830, between the protocol IC and PCI functions (FF0 to FF7). Although only the FE (Front-End) interface devices are described herein, it is needless to mention that each of the storage devices 2700 and 2900 includes a CM (Cache Memory) interface device and BE (Back-End) interface device.

As described in Embodiment 8, the internal network of the storage controller includes two MR-IOV networks. One of the networks is a network that mutually connects the RP0, RP2, RP4, RP6, switches 2750 and 3850, EP01, and EP31 (interfaces other than the FE interface are omitted herein). The other network is a network that mutually connects the RP1, RP3, RP5, RP7, switches 2770 and 3870, EP02, and EP32 (interfaces other than the FE interface are omitted). As the two MR-IOV networks are independent networks, they are managed by different MR-PCIMs. That is, the former network is managed by MR-PCIMs 3820 and 3822, and the latter network is managed by MR-PCIMs 3821 and 3823. The MR-PCIM 3820 handles the management of the switches 2750 and 3850 and the EP (e.g., EP01) in each interface that is accessible from the RP0 in the storage device 2700. The MR-PCIM 3822 handles the management of the EP (e.g., EP31) in each interface that is accessible from the RP4 in the storage device 2900. Meanwhile, the MR-PCIM 3821 handles the management of the switches 2770 and 3870 and the EP (e.g., EP02) in each interface that is accessible from the RP3 in the storage device 2700. Further, the MR-PCIM 3823 handles the management of the EP (e.g., EP32) in each interface that is accessible from the RP7 in the storage device 2900.

The switch 2750 has four VSs (2800 to 2803). Initially, the VS 2800 and VS 2802 are set as the authorized VSs, and the VS 2800 is set as the management VS. The switch 3850 has four VSs (3800 to 3803). Initially, the VS 3800 and VS 3802 are set as the authorized VSs, and the VS3802 is set as the management VS.

<Management Table for Switching Data Transfer Path>

FIG. 39 is a diagram showing a management table 3900 for controlling the switching of a data transfer path with the internal switches 3826 and 3829. This management table 3900 is, as with the management table 3200 (see FIG. 17) of the first embodiment, stored in memory in the front-end interface and is referred to by an embedded processor in the front-end interface. Accessing the management table 3900 from the processor (e.g., CPU0) in the internal network of the storage controller or from the administrative terminal SVP allows the setting of the table to be changed.

The management table 3900 has stored therein information 3901 on the data write target or data read target included in a packet header transmitted/received over the channel 2702 or 3830, and setting of the PCI function (3902 to 3906) that is the transmission source/destination of the data. Specifically, the management table 3900 has stored therein setting of the PCI functions FF0 to FF3 of the EP01 (EP31) and the PCI functions FF4 to FF7 of the EP02 (EP3). As the information 3901 on the data write target or data read target, a logical unit number is stored, for example. The PCI function setting 3902 is the setting when the storage device operates normally. The PCI functions FF0 to FF7 are assigned to the logical unit numbers 0 to 7, respectively.

The PCI function setting 3903 is the setting when only the two PCI functions FF2 and FF3 or FF6 and FF7 are used in each EP. The PCI function setting 3904 is the setting when only the two PCI functions FF0 and FF1 or FF4 and FF5 are used in each EP. Case 1_3903 and case 2_3904 are related to the assignment of PCI functions used when a storage device is added or removed.

The PCI function setting 3905 is the setting when only the four PCI functions FF0 to FF3 of the EP01 (EP31) are used. The PCI function setting 3906 is the setting when only the four PCI functions FF4 to FF7 of the EP02 (EP32) are used. Case 3_3905 and case 4_3906 are related to the assignment of PCI functions when all tasks are distributed to only one of the networks.

<Fail-over Processing>

FIG. 40 is a flow chart for describing the fail-over processing of the MR-PCIM. Herein, processing when a software error has occurred in the MR-PCIM 3820 in the storage device shown in FIG. 38 will be described. During the normal operation, the MR-PCIM 3820 handles the management of the switches 2750 and 3850 and the management of the EP (e.g., EP01) in each interface that is accessible from the RP0 in the storage device 2700. Meanwhile, the MR-PCIM 3822 handles the management of the EP (e.g., EP31) in each interface that is accessible from the RP4 in the storage device 2900.

First, the MR-PCIM 3822, upon detecting an error in the MR-PCIM 3820, changes the setting of the internal switch path for each interface device in the storage device (S4001). For example, the MR-PCIM 3822 changes the data transfer path of the internal switch 3826 (3829) from 3902 to 3906 of the management table 3900. As a result, only the PCI functions F4 to F7 in the EP of each interface device will be used, and thus the storage devices 2700 and 2900 will not transfer data via the switches 2750 and 3850.

Next, the MR-PCIM 3822 changes the setting of the management VS in the switch 2750 from the VS 2800 to the VS 2802. In addition, the MR-PCIM 3822 also changes the setting of the management VS in the switch 3850 from the VS 3802 to the VS 3800 (S4002). It should be noted that such procedures for changing the management VS can be omitted if an MR-PCIM, which does not manage the switches, is reset.

Then, the MR-PCIM 3822 instructs the processor CPU0 to reset and reboot the MR-PCIM 3820 (S4003).

Next, the MR-PCIM 3822 changes the setting of the internal switch path back to the original setting for each interface device in the storage device (S4004). For example, the MR-PCIM 3822 changes the data transfer path of the internal switch 3826 (3829) from 3906 to 3902 of the management table 3900.

After the execution of the aforementioned MR-PCIM failover, the MR-PCIM 3820 handles the management of the EP (e.g., EP01) in each interface that is accessible from the RP0 in the storage device 2700. Meanwhile, the MR-PCIM 3822 handles the management of the switches 2750 and 3850 and the EP (e.g., EP31) in each interface that is accessible from the RP4 in the storage device 2900.

(10) Conclusion

The present invention can be widely applied, not only to storage devices with internal networks, but also to computers such as a blade server, its internal network technique, and the like.

In the switch of the storage device in accordance with the present invention, a plurality of ports other than those connected to the RPs, FE I/F, BE I/F, and CM I/F are connected with a cross-link. Each processor is allowed to control the FE I/F, BE I/F, or CM I/F either via a path that passes through the cross-link or via a path that does not pass through the cross-link. In such a case, the connection relationship between the downstream bridges of each virtual switch in the switch and each interface device (FE I/F, BE I/F, and CM I/F) will not be changed by the change in the number of added storage devices or by the attachment/detachment of the cross-link. Accordingly, PCI functions provided by each EP can be effectively used in a single MR-IOV network. In addition, as a plurality of storage devices can be easily connected by removing the cross-link, the size of the storage device can be easily expand or reduced.

In addition, in the expanded storage device (a configuration with a plurality of unit devices connected together), if an error has occurred in an MR-PCIM which manages a switch in the expanded storage device in one of the unit devices, an MR-PCIM in another unit device resets and reboots the error occurred MR-PCIM. After the execution of such fail-over processing, the functions for management of the switch of the MR-PCIMs are switched before and after the occurrence of the error. Accordingly, in the expanded storage device, an MR-PCIM in any unit device can initialize and manage the MR-IOV network.

In addition, when the cross-link is removed in changing the size of the storage device (in adding or removing a storage device), assignment of PCI functions in each EP that is accessible from each processor is temporarily changed to limit the usable PCI functions (see FIG. 17). Accordingly, even when some of the PCI functions are hotremoved, the storage device will continue to operate adequately, and thus, the operation of the storage device need not be completely stopped while another storage device is being added or removed. Accordingly, adverse effect on the operation of the storage device can be minimized.

REFERENCE SIGNS LIST

10 Storage Device
20 Controller
30 Disk Array (DA)
40 SVP
100 Switch
200 Front-End Interface (FE I/F)
201 Back-End Interface (BE I/F)
202 Cache Memory Interface (CM I/F)
203 Cache Memory (CM)
204 PCI Function
205 Processor
206 Root Complex (RC)
207 Root Port
208 Memory
300 to 303 Links
C00 Channel
D00 Channel
P00 to P06 Ports
VS0 to VS3 Virtual Switches

The invention claimed is:

1. A storage device, comprising:
a processor;
a root complex connected to the processor and including a first root port;
an interface device;
a first switch that mutually connects the first root port and the interface device, wherein
the interface device includes a first endpoint;
the first switch includes a first port connected to the first root port, a second port connected to the first endpoint, and a third port and a fourth port that are mutually connected with a first cross-link; and
the processor is configured to control the interface device by accessing the first endpoint using a path that passes through the first root port, the first port, and the second port, and a path that passes through the first root port, the first port, the first cross-link, and the second port; and
a second storage device connected to a first storage device that is the storage device, wherein
the second storage device has the same configuration as the first storage device except that a third port and a fourth port thereof are not connected with a cross-link; and
after removal of the first cross-link of the first storage device, the third port of the first storage device and the fourth port of the second storage device are connected with a second cross-link different from the first cross-link, and the fourth port of the first storage device and the third port of the second storage device are connected with a third cross-link different from the first and second cross-links, so that a configuration in which the second storage device is added to the first storage device is provided.

2. The storage device according to claim 1, wherein
the processor of the first storage device is configured to control an interface device of the second storage device by accessing a first endpoint of the second storage device using a path that passes through the first root port and the first port of the first storage device, the second cross-link or the third cross-link, and a second port of the second storage device; and
a processor of the second storage device is configured to control the interface device of the first storage device by accessing the first endpoint of the first storage device using a path that passes through a first root port and a first port of the second storage device, the second cross-link or the third cross-link, and the second port of the first storage device.

3. The storage device according to claim 2, wherein
a first MR-PCIM that operates in the first storage device is configured to manage the first endpoint of the first storage device, the first switch of the first storage device, and a first switch of the second storage device;
a second MR-PCIM that operates in the second storage device is configured to manage the first endpoint of the second storage device; and
the second MR-PCIM, upon occurrence of an error in the first MR-PCIM, is configured to change a setting of the first switch of the first storage device and the first switch of the second storage device, so that the second MR-PCIM is configured to manage the first endpoint of the second storage device, the first switch of the first storage device, and the first switch of the second storage device.

4. A storage device, comprising:
a processor;
a root complex connected to the processor and including a first root port;
an interface device; and
a first switch that mutually connects the first root port and the interface device, wherein
the interface device includes a first endpoint;
the first switch includes a first port connected to the first root port, a second port connected to the first endpoint, and a third port and a fourth port that are mutually connected with a first cross-link; and
the processor is configured to control the interface device by accessing the first endpoint using a path that passes through the first root port, the first port, and the second port, and a path that passes through the first root port, the first port, the first cross-link, and the second port; and
wherein
the storage device further includes a second switch, the root complex further includes a second root port, and the interface device further includes a second endpoint;
the second switch includes a fifth port connected to the second root port, a sixth port connected to the second endpoint, and a seventh port and an eighth port that are mutually connected with a second cross-link; and
the processor is configured to control the interface device by accessing the second endpoint using a path that passes through the second root port, the fifth port, and the sixth port, and a path that passes through the second root port, the fifth port, the second cross-link, and the sixth port.

5. The storage device according to claim 4, further comprising a second storage device connected to a first storage device that is the storage device,
wherein
the second storage device has the same configuration as the first storage device except that a third port and a fourth port thereof are not connected with a cross-link, and that a seventh port and an eighth port thereof are not connected with a cross-link; and after removal of the first cross-link and the second cross-link of the first storage device, the third port of the first storage device and the fourth port of the second storage device are connected with a third cross-link, the fourth port of the first storage device and the third port of the second storage device are connected with a fourth cross-link, the seventh port of the first storage device and the eighth port of the second storage device are connected with a fifth cross-link, and the eighth port of the first storage device and the seventh port of the second storage device are connected with a sixth cross-link, so that a configuration in which the second storage device is added to the first storage device is provided.

6. The storage device according to claim 5, wherein the processor of the first storage device is configured to:
   control an interface device of the second storage device by accessing a first endpoint of the second storage device using a path that passes through the first root port of the first storage device, the first port of the first storage device, the third cross-link or the fourth cross-link, and a second port of the second storage device; and
   control the interface device of the second storage device by accessing a second endpoint of the second storage device using a path that passes through the second root port of the first storage device, the fifth port of the first storage device, the fifth cross-link or the sixth cross-link, and a sixth port of the second storage device; and
a processor of the second storage device is configured to:
   control the interface device of the first storage device by accessing a first endpoint of the first storage device using a path that passes through a first root port of the second storage device, a first port of the second storage device, the third cross-link or the fourth cross-link, and the second port of the first storage device; and
   control the interface device of the first storage device by accessing a second endpoint of the first storage device using a path that passes through a second root port of the second storage device, a fifth port of the second storage device, the fifth cross-link or the sixth cross-link, and the sixth port of the first storage device.

7. The storage device according to claim 6, wherein a first MR-PCIM that operates in the first storage device is configured to manage the first endpoint of the first storage device, the first switch of the first storage device, and a first switch of the second storage device;
a second MR-PCIM that operates in the second storage device is configured to manage the first endpoint of the second storage device; and
the second MR-PCIM, upon occurrence of an error in the first MR-PCIM, is configured to change a setting of the first switch of the first storage device and the first switch of the second storage device, so that the second MR-PCIM is configured to manage the first endpoint of the second storage device, the first switch of the first storage device, and the first switch of the second storage device.

8. A method for managing the size of a storage device, comprising:
   providing the storage device that has a processor, a root complex connected to the processor and including a root port, an interface device including an endpoint, and a switch that mutually connects the root port and the interface device, wherein
   the switch includes:
      a first port connected to the root port, a second port connected to the endpoint, a plurality of cross-link ports that are mutually connected with a cross-link;
      a virtual switch for connection to the root port, the virtual switch having an upstream bridge connected to the root port; and
      a virtual switch for connection to the cross-link, the virtual switch having an upstream bridge connected to the cross-link;
   the method being adapted to add, to the storage device in operation in which the processor is configured to control the interface device by accessing the endpoint using a path that passes through the root port, the first port, and the second port, and a path that passes through the root port, the first port, the cross-link, and the second port; one or more add-on storage devices each having the same configuration as the storage device and having the same number of, or a different number of, endpoints as/from the storage device, the method comprising:
   causing the processor of the storage device to, in response to an instruction to add the storage device, hot-remove a PCI function of the endpoint that is accessed from the virtual switch for connection to the cross-link;
   causing an MR-PCIM of the storage device to, in response to an instruction to remove the cross-link connection of the storage device, update a global key, which contains information to identify a virtual hierarchy, of the virtual switch for connection to the cross-link whose cross-link has been removed, and a global key of the PCI function that has been hot-removed with a global key representing a virtual hierarchy used in the add-on storage device;
   causing the MR-PCIM of the storage device to, in response to a connection between the cross-link ports of the storage device and cross-link ports of the add-on storage device, recognize a switch and an end-point of the add-on storage device;
   causing the processor of the storage device to hot-add a PCI function of the endpoint that is accessed using a virtual switch for connection to the cross-link of the add-on storage device; and
   causing a processor of the add-on storage device to hot-add the PCI function of the endpoint that is accessed using a virtual switch for connection to a root port of the add-on storage device and to hot-add the PCI function of the endpoint that is accessed using the virtual switch for connection to the cross-link of the storage device.

9. The method according to claim 8, further comprising:
   causing the processors of the storage device and the add-on storage device to hot-remove the PCI functions that have been hot-added;
   causing the MR-PCIM of the storage device to, in response to an instruction to disconnect the add-on storage device from the storage device, update the global key of the virtual switch for connection to the cross-link of the storage device and the global key of the PCI function of the endpoint that is accessed using the virtual switch for connection to the cross-link; and
   causing the processor of the storage device to, in response to a connection of the cross-link ports of the storage device, hot-add the PCI function whose global key has been updated in disconnecting the add-on storage device from the storage device.

10. The method according to claim 8, further comprising causing the processor of the storage device to, in a state in which the connection of the cross-link is removed, access the endpoint of the storage device using a path other than a path that passes through the virtual switch for connection to the cross-link until the add-on storage device is connected.

11. The method according to claim 9, further comprising causing the processor of the storage device to, in a state in which the add-on storage device is disconnected, access the endpoint of the storage device using a path other than a path that passes through the virtual switch for connection to the cross-link until the cross-link of the storage device is reconnected.

12. The method according to claim 8, wherein
the storage device has connected thereto an administrative terminal with a display device; and
the administrative terminal is capable of displaying a connection state of the ports of the switch of the storage device on a display screen of the display device;
the method further comprising:
causing the administrative terminal to, prior to a removal of the cross-link connection, display information of the ports associated with the cross-link connection on the display screen; and
causing the administrative terminal to, prior to a connection of the add-on storage device, display information of the cross-link ports of the add-on storage device and the cross-link ports the storage device.

13. The method according to claim 9, wherein
the storage device has connected thereto an administrative terminal with a display device; and
the administrative terminal is capable of displaying a connection state of the ports of the switch of the storage device on a display screen of the display device;
the method further comprising:
causing the administrative terminal to, prior to a disconnection of the add-on storage device, display information of the ports associated with the disconnection on the display screen; and
causing the administrative terminal to, prior to a reconnection of the cross-link, display information of the cross-link ports of the storage device on the display screen.

* * * * *